(12) United States Patent
Kim et al.

(10) Patent No.: US 10,855,099 B2
(45) Date of Patent: Dec. 1, 2020

(54) ELECTRONIC DEVICE AND METHOD FOR WIRE AND WIRELESS CHARGING IN ELECTRONIC DEVICE

(71) Applicant: Samsung Electronics Co., Ltd., Suwon-si (KR)

(72) Inventors: Yusu Kim, Suwon-si (KR); Kyoungwon Kim, Suwon-si (KR); Kyounghoon Kim, Suwon-si (KR); Byungwook Kim, Suwon-si (KR); Jeongmin Moon, Suwon-si (KR); Kyungmin Park, Suwon-si (KR); Jungmin Lee, Suwon-si (KR); Juhyang Lee, Suwon-si (KR); Kuchul Jung, Suwon-si (KR); Sungjoon Cho, Suwon-si (KR); Chihyun Cho, Suwon-si (KR); Hansol Choi, Suwon-si (KR); Youngmi Ha, Suwon-si (KR); Yongsang Yun, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/653,469

(22) Filed: Oct. 15, 2019

(65) Prior Publication Data
US 2020/0119581 A1 Apr. 16, 2020

(30) Foreign Application Priority Data

Oct. 15, 2018 (KR) .................. 10-2018-0122627
Feb. 18, 2019 (KR) .................. 10-2019-0018837
(Continued)

(51) Int. Cl.
*H02J 7/00* (2006.01)
*H02J 7/02* (2016.01)
(Continued)

(52) U.S. Cl.
CPC .............. *H02J 7/025* (2013.01); *H02J 7/342* (2020.01); *H02J 50/10* (2016.02); *H02J 50/80* (2016.02); *H02J 7/0047* (2013.01)

(58) Field of Classification Search
CPC ........ H02J 7/025; H02J 50/10; H02J 2310/22; H02J 7/342; H02J 2207/40; H02J 50/80; H02J 7/0047
(Continued)

(56) References Cited

U.S. PATENT DOCUMENTS

2011/0050164 A1    3/2011   Partovi et al.
2012/0281547 A1   11/2012   Kim et al.
(Continued)

FOREIGN PATENT DOCUMENTS

JP      2016-144560 A    8/2016
KR   10-2012-0052517 A   5/2012
(Continued)

OTHER PUBLICATIONS

Yummy999, Mate 20 Pro wireless reverse charging function test[disc], reddit.com, r/Huawui, Jan. 2019, screenshot taken Oct. 15, 2019, https://www.reddit.com/r/Huawei/comments/a0fpti/mate_20_pro_wireless_reverse_charging_function/.
(Continued)

*Primary Examiner* — Zixuan Zhou
(74) *Attorney, Agent, or Firm* — Jefferson IP Law, LLP

(57) ABSTRACT

According to various embodiments, an electronic device comprises a battery, a wireless interface including a coil and configured to wirelessly transmit electric power from the battery via the coil, and at least one processor configured to: perform a wireless charging function of wirelessly transmitting electric power to an external device via the wireless interface, while neither the electronic device nor the external device is being supplied with electric power from an exter-
(Continued)

nal power source via a wire, and based on identifying that the external device starts being supplied with electric power from an external power source via a wire while performing the wireless charging function, stop performing the wireless charging function of wirelessly transmitting electric power to the external device.

25 Claims, 23 Drawing Sheets

(30) Foreign Application Priority Data

Feb. 19, 2019 (KR) .................. 10-2019-0019520
Oct. 14, 2019 (KR) .................. 10-2019-0127247

(51) Int. Cl.
*H02J 50/10* (2016.01)
*H02J 7/34* (2006.01)
*H02J 50/80* (2016.01)

(58) Field of Classification Search
USPC .................. 320/103, 108; 307/104
See application file for complete search history.

(56) References Cited

U.S. PATENT DOCUMENTS

| | | |
|---|---|---|
| 2013/0005252 A1 | 1/2013 | Lee et al. |
| 2014/0009120 A1 | 1/2014 | Kim |
| 2014/0159655 A1 | 6/2014 | Kim et al. |
| 2015/0015180 A1 | 1/2015 | Miller et al. |
| 2015/0236539 A1 | 8/2015 | Park et al. |
| 2015/0364943 A1 | 12/2015 | Vick et al. |
| 2016/0268833 A1 | 9/2016 | Lee et al. |
| 2017/0346340 A1 | 11/2017 | Vitali et al. |
| 2018/0069358 A1 | 3/2018 | Miller et al. |
| 2018/0123379 A1 | 5/2018 | Ha et al. |
| 2018/0175672 A1 | 6/2018 | Yoden |
| 2018/0337560 A1 | 11/2018 | Beckman |
| 2019/0214852 A1 | 7/2019 | Park |

FOREIGN PATENT DOCUMENTS

| | | |
|---|---|---|
| KR | 10-2012-0125182 A | 11/2012 |
| KR | 10-2014-0076486 A | 6/2014 |
| KR | 10-1476103 B1 | 12/2014 |
| KR | 10-2015-0011448 A | 2/2015 |
| KR | 10-2016-0001611 A | 1/2016 |
| KR | 10-2018-0106217 A | 10/2018 |
| WO | 2018/004117 A1 | 1/2018 |

OTHER PUBLICATIONS

Zendure Team, How to Use Huawei Mate 20 Pro's Reverse Wireless Charging, zendure.com, Dec. 5, 2017, screenshot taken Oct. 15, 2019, https://zendure.com/blogs/how-to/how-to-use-huawei-mate-20-pro-reverse-wireless-charging.
Szeszo, Huawei Mate 20 Pro works as a Wireless Charger Pad (worth to charge with it?), YouTube.com, Nov. 17, 2018, screenshot taken Oct. 15, 2019, https://youtu.be/izhgnCdtDV4.
Extended European Search Report dated Dec. 10, 2019, issued in European Application No. 19203162.3-1202.
International Search Report dated Jan. 23, 2020, issued in International Application No. PCT/KR2019/013531.
Written Opinion dated Jan. 23, 2020, issued in International Application No. PCT/KR2019/013531.
Extended European Search Report dated Jul. 7, 2020, issued in European Application No. 20176893.4-1202.

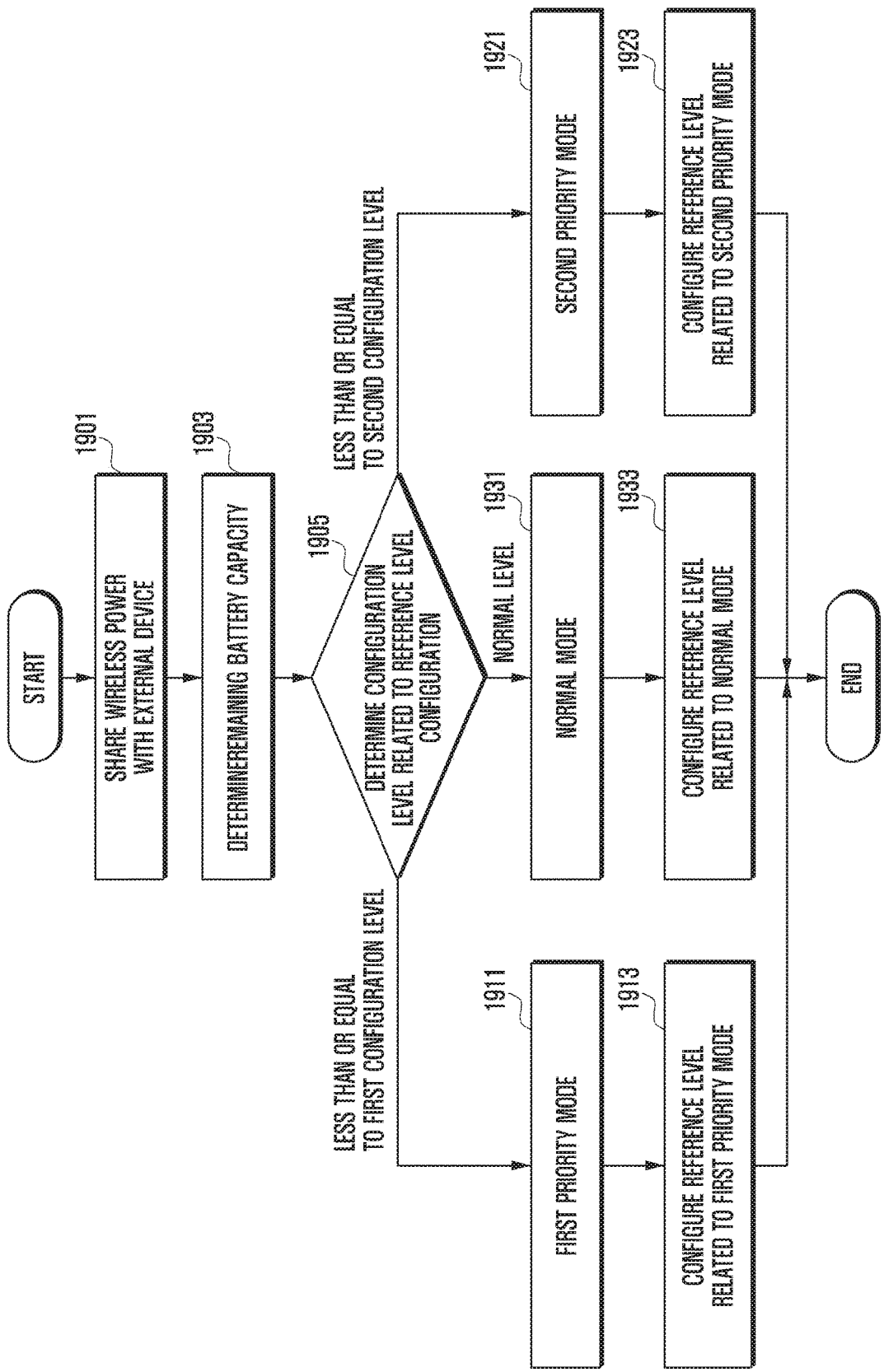

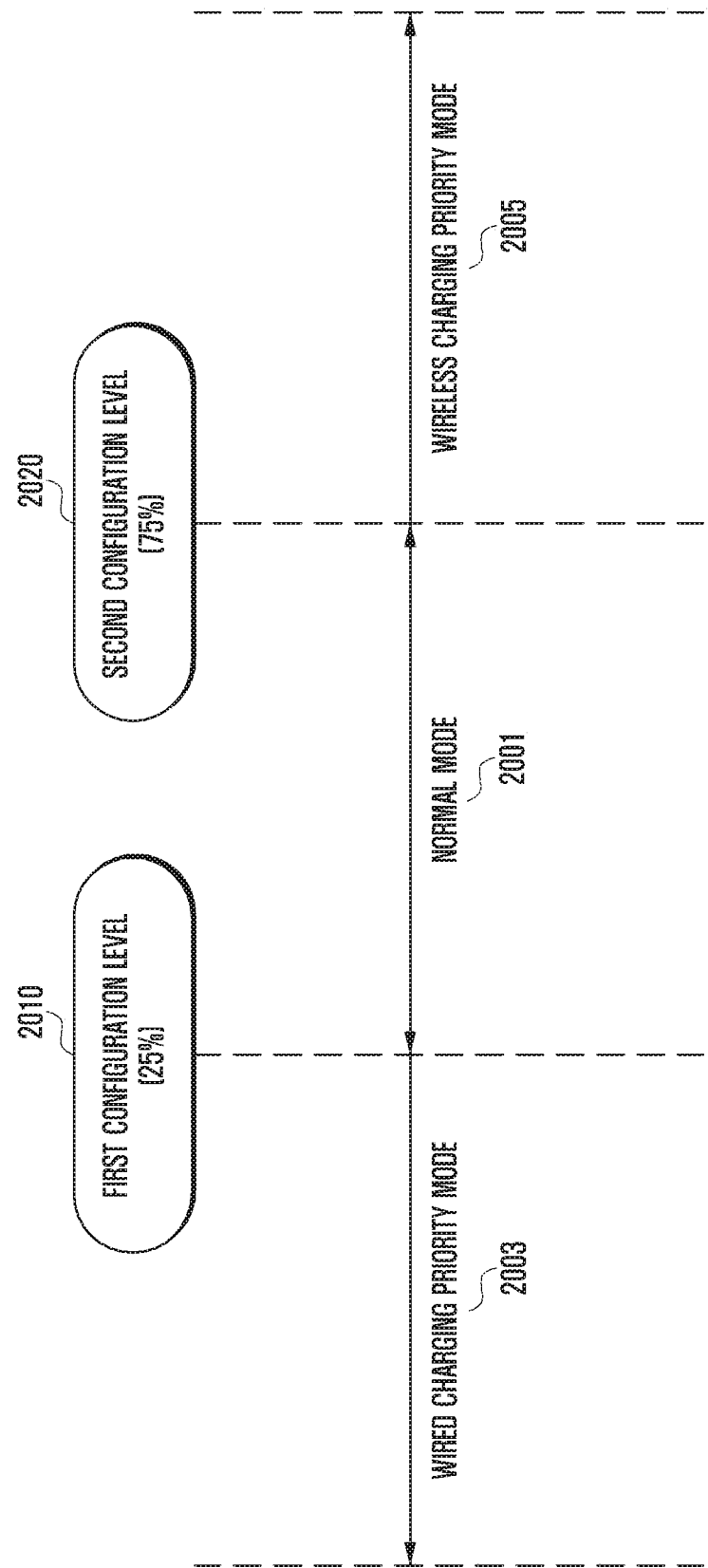

ELECTRONIC DEVICE AND METHOD FOR WIRE AND WIRELESS CHARGING IN ELECTRONIC DEVICE

CROSS-REFERENCE TO RELATED APPLICATION(S)

This application is based on and claims priority under 35 U.S.C. § 119(a) of a Korean patent application number 10-2018-0122627 filed on Oct. 15, 2018, a Korean patent application number 10-2019-0018837 filed on Feb. 18, 2019, a Korean patent application number 10-2019-0019520 filed on Feb. 19, 2019, and a Korean patent application number 10-2019-0127247 filed on Oct. 14, 2019, the disclosure of each of which is incorporated by reference herein in its entirety.

BACKGROUND

1 Field

The disclosure relates to an electronic device and a wired/wireless charging method in an electronic device.

2 Description of Related Art

Recently, proliferation of electronic devices that can be wiredly and wirelessly charged has increased.

An electronic device, if a wired charging device is connected thereto according to the related art, may charge a battery by receiving electric power from the wired charging device by wire, and if a wireless charging device is connected thereto, may produce an induction current through a coil by a magnetic induction method, thereby charging the battery.

The above information is presented as background information only to assist with an understanding of the disclosure. No determination has been made, and no assertion is made, as to whether any of the above might be applicable as prior art with regard to the disclosure.

SUMMARY

In electronic devices, a charging circuit of a battery is simply configured to charge the battery by receiving a charging current from a wired charging device or to charge the battery by means of an induction current generated by a wireless charging device, but cannot wirelessly supply electric power of the battery to an external device according to the related art.

Aspects of the disclosure are to address at least the above-mentioned problems and/or disadvantages and to provide at least the advantages described below. Accordingly, an aspect of the disclosure is to provide an electronic device and a method capable of transmitting electric power stored in a battery to an external device.

Another aspect of the disclosure is to provide an electronic device and a method capable of supplying a designated electric power to an external device using electric power supplied from a charging device in the case where the charging device is connected thereto and charging a battery with the remaining electric power.

Additional aspects will be set forth in part in the description which follows and, in part, will be apparent from the description, or may be learned by practice of the presented embodiments.

In accordance with an aspect of the disclosure, an electronic device is provided. The electronic device comprises a battery, a wireless interface including a coil and configured to wirelessly transmit electric power from the battery via the coil, and at least one processor configured to: perform a wireless charging function of wirelessly transmitting electric power to an external device via the wireless interface, while neither the electronic device nor the external device is being supplied with electric power from an external power source via a wire, and based on identifying that the external device starts being supplied with electric power from an external power source via a wire while performing the wireless charging function, stop performing the wireless charging function of wirelessly transmitting electric power to the external device.

In accordance with another aspect of the disclosure, another electronic device is provided. The electronic device comprises a battery, a wireless interface including a coil and configured to wirelessly transmit electric power from the battery via the coil, and at least one processor configured to: identify that the electronic device starts being supplied with electric power from an external power source via a wire while an external device is not being supplied with electric power from an external power source via a wire, and start performing a wireless charging function of wirelessly transmitting electric power to the external device regardless of whether a remaining capacity of the battery is above or below a threshold when the electronic device starts being supplied with electric power from the external power source via the wire.

In accordance with another aspect of the disclosure, another electronic device is provided. The electronic device comprises a battery, a wireless interface including a coil and configured to wirelessly transmit electric power from the battery via the coil, and at least one processor configured to: receive a request for performing a wireless charging function of wirelessly transmitting electric power to an external device while the electronic device is being supplied with electric power from an external power source via a wire, and the external device is not being supplied with electric power from an external power source via a wire, and start performing the wireless charging function of wirelessly transmitting electric power to the external device despite a remaining capacity of the battery being below a threshold when the request is received.

In accordance with another aspect of the disclosure, another electronic device is provided. The electronic device comprises a battery, a wireless interface including a coil and configured to wirelessly transmit electric power from the battery via the coil, and at least one processor configured to: identify a remaining capacity of the battery while neither the electronic device nor an external device is not being supplied with the electric power from an external power source via a wire, activating a user interface for performing a wireless charging function of wirelessly transmitting the electric power from the electronic device to the external device via the wireless interface based on identifying that the remaining capacity of the battery is above or equal to a threshold, and disregarding the user input on the user interface by deactivating the user interface based on identifying that the remaining capacity of the battery is below the threshold.

In accordance with an aspect of the disclosure, an electronic device and a method are provided. The electronic device and the method include an electric power stored in a battery to an external device.

In accordance with another aspect of the disclosure, an electronic device and a method are provided. The electronic device and the method include a designated electric power to an external device using electric power supplied from a charging device in the case where the charging device is connected thereto and charging a battery with the remaining electric power, thereby simultaneously charging two electronic devices using a single charging device.

In accordance with another aspect of the disclosure, an electronic device and a method are provided. The electronic device and the method include a method for alternately performing a wired charging operation of charging a battery in the electronic device and a wireless charging operation of transmitting a designated wireless power to an external device.

In accordance with another aspect of the disclosure, an electronic device and a method are provided. The electronic device and the method include a wired charging operation of charging a battery by receiving a designated electric power from a wired charging device and a wireless power transmission operation of supplying (or sharing) a designated electric power to (or with) an external device using electric power stored in the battery of the electronic device in the case where the wired charging device is connected to the electronic device.

Other aspects, advantages, and salient features of the disclosure will become apparent to those skilled in the art from the following detailed description, which, taken in conjunction with the annexed drawings, discloses various embodiments of the disclosure

BRIEF DESCRIPTION OF THE DRAWINGS

The above and other aspects, features, and advantages of certain embodiments of the disclosure will be more apparent from the following description taken in conjunction with the accompanying drawings, in which:

FIG. 19 is a flowchart illustrating a method of operating an electronic device according to an embodiment of the disclosure; and FIG. 20 is a diagram for explaining an example of adaptively configuring a reference level, based on a remaining battery capacity in an electronic device according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
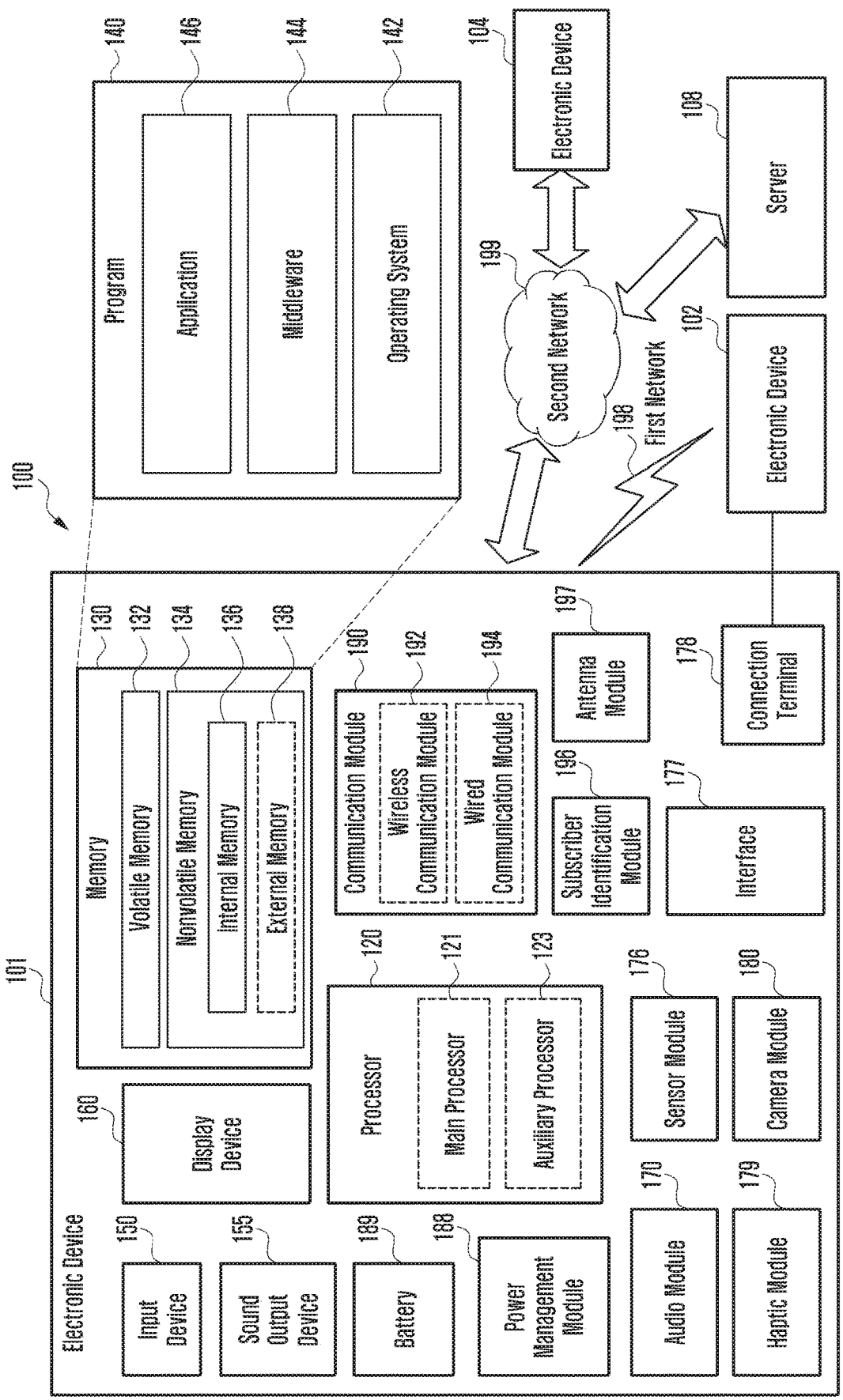
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, or projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
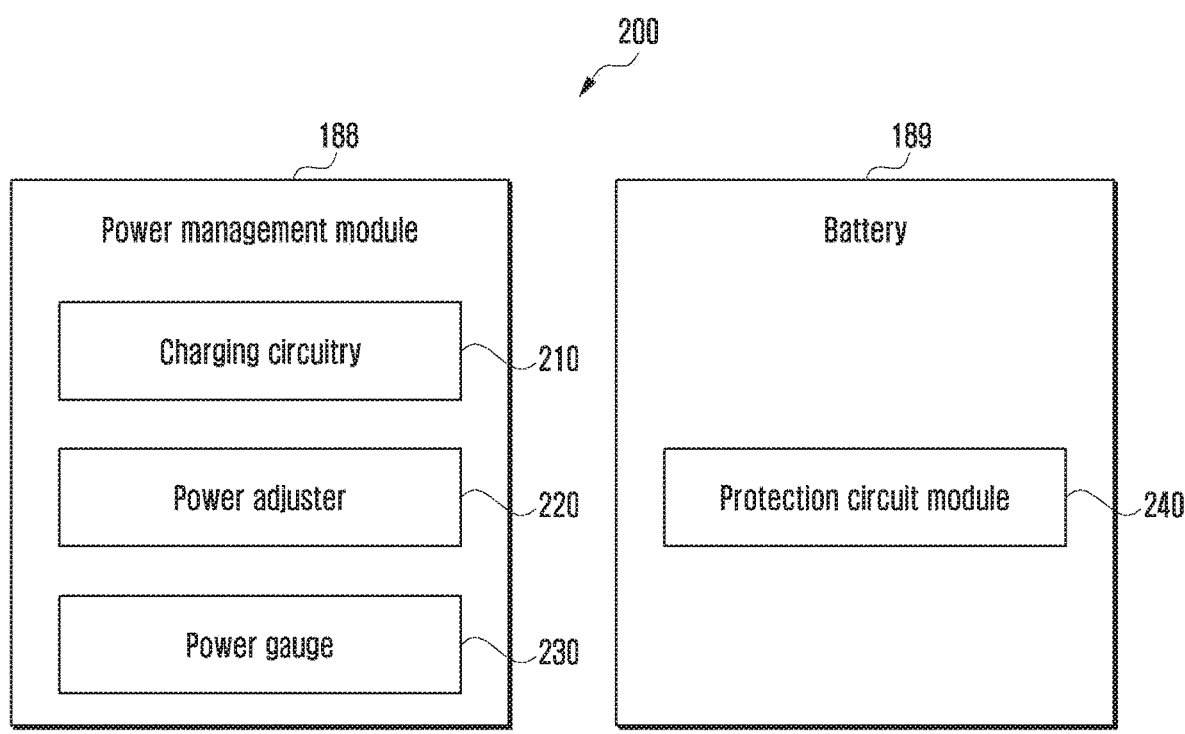
FIG. 2 is a block diagram of a power management module and a battery according to an embodiment of the disclosure.

FIG. 2 is a block diagram 200 illustrating the power management module 188 and the battery 189 according to an embodiment of the disclosure.

Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connection terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The expression "remaining battery capacity", which is used in this document, may refer to the remaining capacity of a battery. The expression "remaining battery capacity" used in this document may be interpreted as "remaining capacity of a battery", "battery level", "state of charge (SOC)", or the like. For example, the expression "remaining battery capacity" used in this document may be replaced with "remaining capacity of a battery", "battery level", "state of charge (SOC)", or the like.

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Various embodiments of the disclosure may relate to a method of sharing (transmitting) electric power between an electronic device and an electronic device using a wireless power transmission technology. According to various embodiments, an electronic device may adjust transmission power by controlling a charging circuit, based on the amount of charging power of an external electronic device receiving wireless power. According to various embodiments, the electronic device may transmit electric power to an external electronic device (e.g., a smart phone) that uses a relatively high power during the wireless charging, or may transmit electric power to an external electronic device (e.g., a wearable device) that uses a relatively low power during the wireless charging, and may adjust transmission power, based on the type of the external electronic device.

Various embodiments of the disclosure relate to an electronic device and a method for sharing (or transmitting) electric power stored in a battery 189 of an electronic device 101 with (or to) another electronic device (hereinafter, referred to as an "external electronic device") (e.g., wireless power transmission or wireless power sharing) using wireless power transmission technology. According to various embodiments, in the case of sharing wireless power between the electronic device 101 and an external electronic device (e.g., another electronic device or a wearable device), a wired charging device {a wired power supply device or an external power source (e.g., a travel adapter (TA))} may also be connected to the electronic device 101, which supplies electric power, by the user. According to an embodiment, in the case where a wired charging device is connected to the electronic device 101, the electronic device 101 may alternately perform a wired charging operation of charging the battery 189 in the electronic device 101 and a wireless charging operation of wirelessly supplying (or sharing) electric power to (or with) an external electronic device (e.g., a designated wireless power transmission operation), thereby eliminating instability due to bypass or power loss through voltage regulation.

For example, in the case where the electronic device 101 regulates a voltage input from a wired charging device to the voltage used for wireless power sharing between the electronic device 101 and an external device and outputs the same, power loss may occur. Accordingly, the electronic device 101 may be designed so as to bypass the voltage of the wired charging device to the charging circuit 210 {e.g., a power management integrated circuit (PMIC)} in order to avoid power loss, and a circuit therefor, such as a regulator, may be added thereto. According to an embodiment, most of the PMICs supporting wired and wireless charging, which are mounted to the electronic device 101, are designed to bypass a voltage input through a wired path because of power efficiency in the case of using both wired charging and wireless charging so that a wired voltage is transmitted, regardless of a voltage configured in the wireless path. For example, in the case of bypassing the voltage of the wired charging device as the voltage output for wireless power sharing between the electronic device 101 and an external device, since the wired charging device uses various voltages such as 5V, 9V, or 12V, it may be difficult to reliably share wireless power and to configure and tune additional circuits to maximize the efficiency of wireless power sharing. Various embodiments may relate to a device and a method capable of stably sharing electric power with an external device while minimizing power loss when wired charging is provided from the wired charging device connected to the electronic device 101 transmitting electric power in the case of attempting to share wireless power between the electronic device 101 and the external device.

Figure 3:
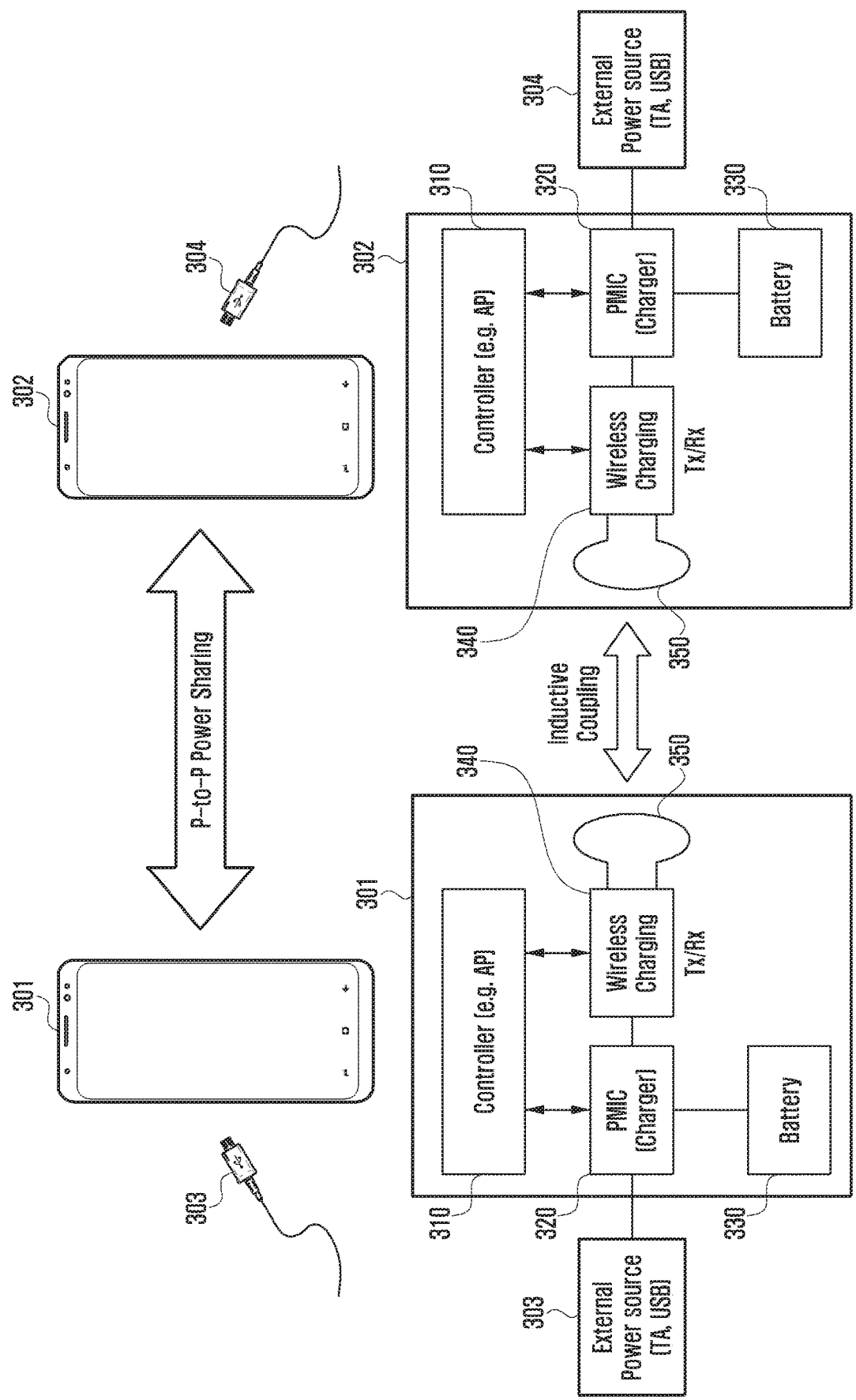
FIG. 3 is a basic conceptual diagram for wirelessly sharing electric power between a first electronic device and a second electronic device according to an embodiment of the disclosure.

FIG. 3 is a basic conceptual diagram for wirelessly sharing electric power between a first electronic device and a second electronic device according to an embodiment of the disclosure.

Referring to FIG. 3 that both a first electronic device 301 (e.g., the electronic device 101 in FIG. 1) and a second electronic device 302 (e.g., the electronic device 102 in FIG. 1) are capable of transmitting/receiving wireless power, one of them may be an electronic device capable of only receiving wireless power. In this document, a description will be made based on the first electronic device 301, and the second electronic device 302 will be described as an external electronic device. In addition, the second electronic device 302 may have the same configuration as the first electronic device 301, or may have a configuration obtained by excluding only a wireless power transmission function from the first electronic device 301.

According to an embodiment, the first electronic device 301 may include a coil 350, a wireless charger IC 340, a power management IC (PMIC) 320, a battery 330 (e.g., the battery 189 in FIG. 1), an external power source 303 (e.g., a USB), and/or a controller 310 (e.g., the processor 120 in FIG. 1).

According to an embodiment, the coil 350 may be configured as a spiral form on an FPCB.

According to an embodiment, the wireless charger IC 340 may include a full-bridge circuit. For example, the wireless charger IC 340 may perform control such that the full-bridge circuit operates as an inverter (DC→AC) in a wireless power transmission operation and operates as a rectifier (AC→DC) in a wireless power reception operation.

According to an embodiment, the wireless charger IC 340 may exchange information used for wireless power transmission with the second electronic device 302 through in-band communication according to the WPC standards (or non-standards). For example, in-band communication may allow the first electronic device 301 and the second electronic device 302 to exchange data with each other through frequency modulation or amplitude modulation of a wireless power transmission signal in the wireless power transmission between the coil 350 and the coil 350. According to various embodiments, the communication between the first electronic device 301 and the second electronic device 302 may be performed using out-band communication. For example, the out-band communication is different from wireless power signals, and may be short-range communication such as near-field communication (NFC), Bluetooth, or Wi-Fi.

According to an embodiment, the PMIC 320 may include a charger function of charging the battery 330 by means of wired and wireless input power, a function of communication with an external electric power source (e.g., a travel adapter) connected to a USB terminal {e.g., USB battery charging specifications, USB power delivery (PD) communication, AFC communication, and/or quick charge (QC) communication}, a function of supplying electric power to a system and supplying electric power corresponding to a voltage level used for each device, and/or a function of supplying electric power to the wireless charger IC 340 in a wireless power transmission mode.

According to an embodiment, external power sources 303 and 304 may conform to USB standards. For example, the external connection terminals 303 and 304 may be interfaces for USB charging and/or on-the-go (OTG) power supply. According to an embodiment, the external connection terminals 303 and 304 may be connected to external power sources (a TA, a battery pack, or the like).

According to an embodiment, the controller 310 may control overall functions of wired and wireless charging of the first electronic device, USB communication with the second electronic device 302, and/or communication with the second electronic device 302 (e.g., USB PD, BC1.2, AFC, and/or QC) according to the state of the first electronic device 301. For example, BC1.2, PD or the like may be an interface for communication with an external power source (TA), and the controller 310 may control communication with the external power source. For example, the state of the first electronic device 301 may include the temperature of the first electronic device 301 and/or the remaining capacity of the battery 330 of the first electronic device 301.

According to various embodiments, the first electronic device 301 may operate in a wireless power transmission (Tx) mode using the battery 330. Alternatively, if a wired charging device is connected to the first electronic device 301, the first electronic device 301 may preferentially use external electric power in the Tx mode, and may charge the battery 330 with the remaining electric power.

In this document, the operation in which the electronic device (e.g., the first electronic device 301 in FIG. 3) operates in a wireless power Tx mode may denote the state in which the electronic device transmits wireless power to an external electronic device (e.g., the second electronic device in FIG. 3) using the coil 350. Alternatively, in this document, the operation in which the first electronic device 301 operates in a wireless power reception (Rx) mode may denote the state in which the first electronic device 301 receives wireless power from an external electronic device (e.g., the second electronic device 302 in FIG. 3) through the coil 350 and charges the battery 330 using the received wireless power.

Figure 4:
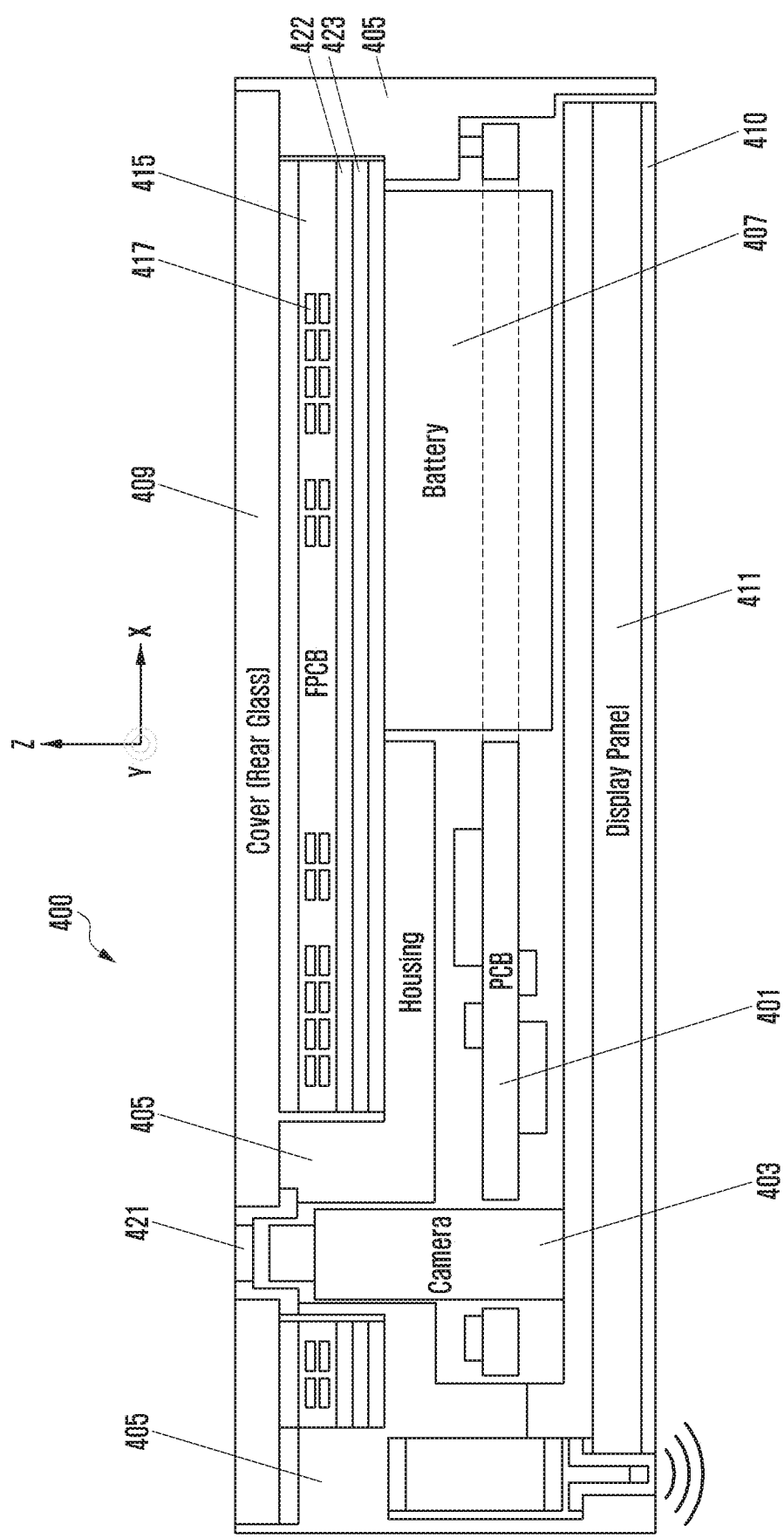
FIG. 4 is a cross-sectional view schematically illustrating an electronic device according to an embodiment of the disclosure.

FIG. 4 is a cross-sectional view schematically illustrating an electronic device according to an embodiment of the disclosure.

Referring to FIG. 4, an electronic device 400 (e.g., the electronic device 101 in FIG. 1) may include a housing 405 for receiving and fixing one or more components or a cover 409 that is coupled to the housing 405 on the back surface of the electronic device 400. For example, the components may include a display panel 411, a substrate 401, a battery 407 (e.g., the battery 189 in FIG. 1), a camera 403, or an FPCB 415, which are provided inside the housing 405.

According to an embodiment, the display panel 411 may be located on the front surface of the electronic device, and may have a glass (window cover) 410 attached to the top surface thereof. According to an embodiment, the display panel 411 may be configured integrally with a touch sensor or a pressure sensor. According to another embodiment, the touch sensor or the pressure sensor may be separate from the display panel 411. For example, the touch sensor may be interposed between the glass 410 and the display panel 411.

According to an embodiment, the substrate 401 may have components, such as a communication module (e.g., the communication module 190 in FIG. 1) or a processor (e.g., the processor 120 in FIG. 1), which are mounted thereon. According to an embodiment, the substrate 401 may be implemented using at least one of a printed circuit board (PCB) or a flexible printed circuit board (FPCB). According to an embodiment, the substrate 401 may operate as a ground plate capable of grounding the loop antenna 417.

According to an embodiment, the cover 409 may be divided into a conductive area made of a conductive material and a nonconductive area made of a nonconductive material. For example, the cover 409 may be divided into a conductive area and a nonconductive area located at one side or both sides of the conductive area. According to an embodiment, the cover 409 may have one or more openings 421 through which some components of the electronic device 400 are exposed to the outside. For example, the cover 409 may have one or more openings 421 through which a camera 403, a flash, or a sensor (e.g., a fingerprint sensor) is exposed.

According to an embodiment, the FPCB 415 may be attached to the lower surface of the cover 409. According to an embodiment, the FPCB 415 may have one or more loop antennas 417 mounted thereto, and may be positioned to be electrically insulated from the conductive area of the cover 409.

According to an embodiment, one or more loop antennas 417 may be configured in the same type with each other. For example, one or more loop antennas 417 may be configured in the form of a planar coil. According to another embodiment, some of the one or more loop antennas 417 may be configured in the form of a planar coil, and others thereof may be configured in the form of a solenoid coil.

According to an embodiment, one or more loop antennas 417 may include a wireless charging coil, and the wireless charging coil may be configured in a spiral pattern.

According to an embodiment, magnetic-field shielding layers (e.g., a shielding sheet 422 and a graphite sheet 423) may be provided to one side of one or more loop antennas 417. For example, the magnetic-field shielding layers 422 and 423 may concentrate the magnetic field generated from the coil in the rear direction of the electronic device 400 (e.g., a "Z" direction in FIG. 4), and may suppress generation of the magnetic field inside the electronic device 400, thereby preventing abnormal operation of other electronic components.

Figure 5:
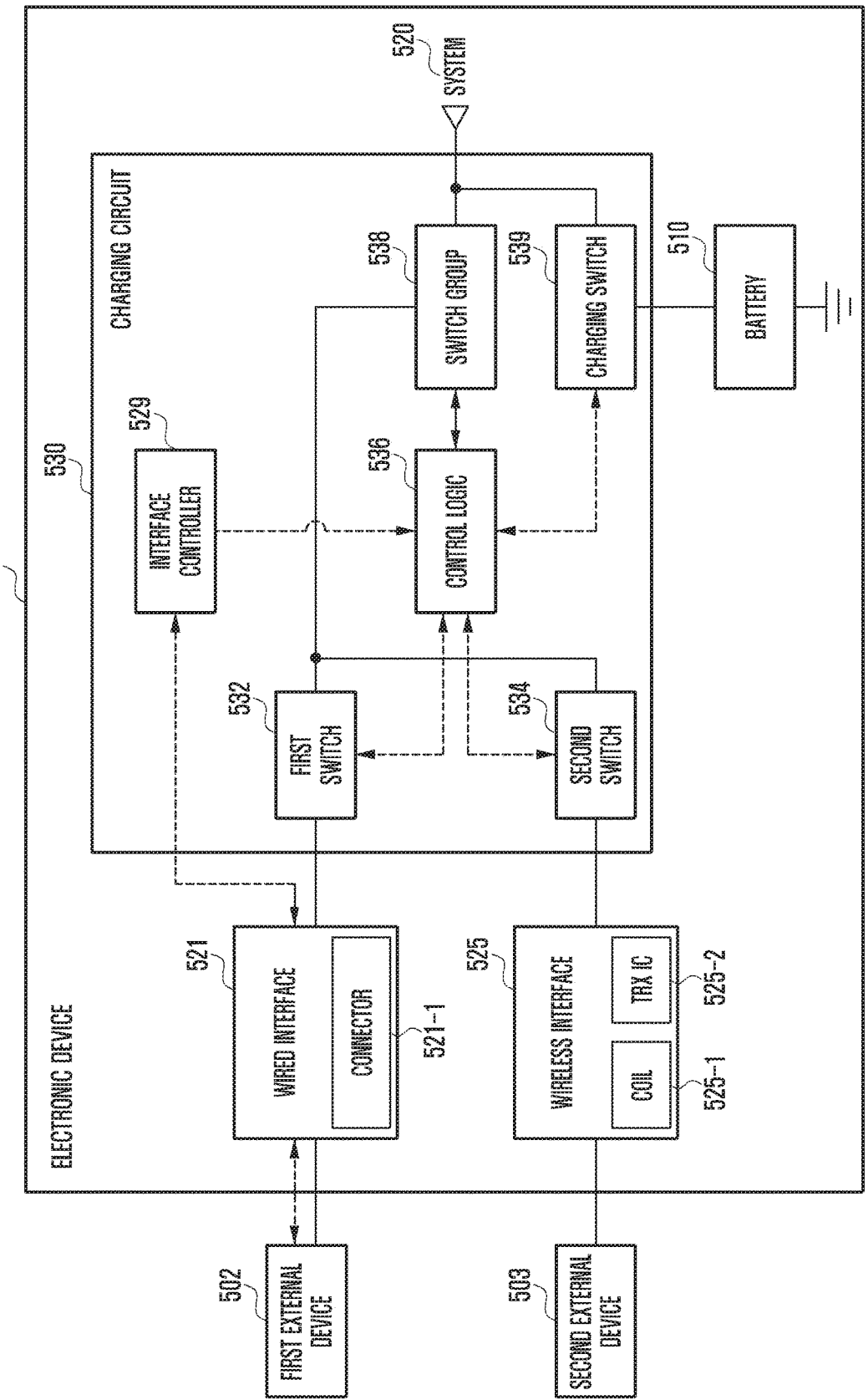
FIG. 5 is a conceptual diagram for explaining the concept of a charging circuit in an electronic device according to various embodiments of the disclosure.

FIG. 5 is a conceptual diagram illustrating the concept of a charging circuit in an electronic device according to an embodiment of the disclosure.

Referring to FIG. 5, an electronic device 501 (e.g., the electronic device 101 in FIG. 1) according to various embodiments may include a battery 510 (e.g., the battery 189 in FIG. 1), a wired interface 521, a wireless interface 525, and/or a charging circuit 530.

According to an embodiment, the battery 510 may be mounted inside a housing (e.g., the housing 405 in FIG. 4) of the electronic device 501, and may be charged. The battery 510 may include, for example, a lithium-ion battery, a rechargeable battery, and/or a solar battery.

According to an embodiment, the wired interface 521 and the wireless interface 525 may be mounted to a part of a housing of the electronic device 501, and may be connected to external devices, respectively. The wired interface 521 may include, for example, a universal serial bus (USB) connector 521-1, may be wiredly connected to the first external device 502 via the connector 521-1, and may be intended for USB charging and/or on-the-go (OTG) power supply, or an external power source (such as a TA, a battery pack, or the like) may be connected thereto. The wireless interface 525 may include a coil 525-1 (also referred to as a "conductive pattern") (e.g., one or more loop antennas 417 in FIG. 4) and a transmit/receive integrated chip (TRX IC) 525-2, and may wirelessly transmit and receive electric power to and from the second external device 503 through the coil 525-1 and the TRX IC 525-2. Electric power may be wirelessly transmitted and received using a magnetic-field inductive coupling method, a resonance coupling method, or a combination thereof. According to an embodiment, the coil 525-1 may include a first conductive pattern for wirelessly transmitting electric power and a second conductive pattern for wirelessly receiving electric power.

According to an embodiment, the first external device 502, which is an external device that can connected by wire, may be a wired charging device or a wired power receiving device. The wired power receiving device may be an on-the-go (OTG) device. The OTG device may be a device connected to the electronic device 501 and supplied with power, such as a mouse, a keyboard, a USB memory, and an accessory. The electronic device 501 may operate in an OTG mode so as to supply external electric power to a USB terminal. The wired charging device may be connected by wire, such as a travel adapter (TA), thereby supplying electric power to the electronic device 501. The wired power receiving device may be connected by wire to receive electric power from the electronic device 501, thereby using the same as internal power, and may charge another battery provided in the wired power receiving device. According to an embodiment, the first external device connected to the electronic device 501 through the wired interface 521 may include a wired high-voltage (HV) device {e.g., a device supporting adaptive fast charge (AFC) or quick charge (QC)}. If the wired HV device is connected to the connector, electric power having a voltage (e.g., 9 v) higher than the voltage (e.g., 5 v) supplied from the battery 510 may be supplied to the wired HV device or received therefrom.

According to an embodiment, the second external device 503 may include a wireless power supply device or a wireless power receiving device. According to various embodiments, the wireless power supply device may supply wireless power to the electronic device 501 using a first conductive pattern such as a wireless charging pad. The wireless power receiving device may receive wireless power supplied from the electronic device 501 using a second conductive pattern, and may charge another battery included in the wireless power receiving device using the received electric power. According to an embodiment, the second external device 503 connected to the electronic device 501 through the wireless interface 525 may include a wireless high-voltage (HV) device {e.g., a device supporting adaptive fast charge (AFC) or quick charge (QC)}. According to an embodiment, the wireless HV device may include a wireless charging pad that supports fast charging. The wireless charging pad may communicate with the TRX IC 525-2 through in-band communication, thereby determining whether or not to perform fast charging, or may determine whether or not to perform fast charging using a separate communication module (e.g., Bluetooth or Zigbee). For example, the electronic device 501 may make a request to the wireless charging pad for high voltage (HV) charging of, for example, 9V through the TRX IC 525-2, and the wireless charging pad may identify whether or not fast charging is possible through communication with the electronic device 501 according to a request for HV charging from the electronic device 501. If it is identified that fast charging is possible, the wireless charging pad may supply an electric power of 9V to the electronic device 501.

According to an embodiment, the charging circuit 530 may be electrically connected to the battery 510, and may be configured so as to connect the wired interface 521 and the wireless interface 525, the battery 510 and the wired interface 521, and the battery 510 and the wireless interface 525, respectively. The charging circuit 530 may be configured to electrically connect the battery 510 and the conductive pattern (e.g., the first conductive pattern), thereby wirelessly transmitting electric power to the second external device 503 (e.g., the wireless power receiving device), and may be configured to electrically connect the battery 510 and the connector while wirelessly transmitting electric power to the outside, thereby wiredly transmitting electric power to the first external device 502 (e.g., the wired power receiving device). For example, the charging circuit 530 may convert a first power generated by the battery 510 into a second power higher than the first power, may transmit a third power, which is at least part of the second power, to a wireless power receiving device through the first conductive pattern, and may transmit a fourth power, which is at least other part of the second power, to the OTG device or the wired power receiving device through the connector.

According to an embodiment, the charging circuit 530 may include an interface controller 529, a first switch 532, a second switch 534, a control logic 536, a switch group 538, and/or a charging switch 539.

According to an embodiment, the interface controller 529 may determine the type of the first external device 502 connected to the wired interface 521, and may determine whether or not fast charging is supported through adaptive fast charge (AFC) communication with the first external device 502. According to an embodiment, the interface controller 529 may include a micro USB interface IC (MUIC) or a fast charging {e.g., adaptive fast charge (AFC) or quick charge (QC)} interface. For example, the MUIC may determine whether the first external device 502 connected to the wired interface 521 is a wired charging device or a wired power receiving device. For example, the fast charging interface may determine whether or not fast charging is supported through communication with the first external device 502. If fast charging is supported, the first external device 502 may increase transmission and reception power. For example, in the case where the first external device 502 is a wired charging device that typically transmits about 10 W (5V/2 A) power, if fast charging is supported, it is possible to transmit about 15 W (9V/1.6V) {or about 18 W (e.g., 9V/2 A)} power.

According to an embodiment, the first switch 532 may include one or more switches, and may control electric power output to a device (e.g., the OTG device) connected via the wired interface 521 or to a wired power receiving device and electric power input from a wired charging device. For example, the first switch 532 may be turned on to output electric power to the OTG device or the wired power receiving device and to receive electric power from the wired charging device, or may be turned off to interrupt the power output to the OTG device or the wired power receiving device and the power input from the wired charging device.

According to an embodiment, the second switch 534 may include one or more switches, and may control electric power input/output from/to the wireless power supply device and the wireless power receiving device through the wireless interface 525 such as the coil 525-1 and the TRX IC 525-2. For example, the second switch 534 may be turned on to allow power input/output from/to the wireless power supply device or the wireless power receiving device, or may be turned off to interrupt power input/output from/to the wireless power supply device or the wireless power receiving device.

According to an embodiment, the control logic 536 may be part of controller 310, or may communicate with the controller 310. According to an embodiment, the control logic 536 may perform control so as to convert the electric power input from at least one of the first switch 532 and the second switch 534 into a charging voltage and a charging current suitable for charging the battery 510, may perform control so as to convert the electric power from the battery 510 into a charging voltage and a charging current suitable for charging another battery of an external device connected to each of the first switch 532 and the second switch 534, and may perform control so as to convert the electric power from the battery 510 into a voltage and a current suitable for use in an external device.

According to various embodiments, the control logic 536 may perform control such that the charging circuit 530 selectively transmits electric power from the battery 510 to the outside wirelessly or wiredly. In addition, the control logic 536 may perform control such that electric power is transmitted to the first external device 502 and/or the second external device 503 via the charging circuit 530 or such that electric power is received from the first external device 502 and/or the second external device 503.

According to various embodiments, if a wired charging device is connected, the control logic 536 may perform control such that the battery 510 is charged using electric power received from the wired charging device. In addition, if an OTG device is connected, the control logic 536 may perform control so as to perform an OTG function. In addition, if a wireless power supply device is connected, the control logic 536 may perform control such that the battery 510 is charged by receiving electric power from the wireless power supply device. In addition, if a wireless power supply device and an OTG device are connected, the control logic 536 may perform control so as to execute an OTG function while charging the battery 510 by receiving electric power from the wireless power supply device. If a wireless power receiving device is connected, the control logic 536 may perform control so as to supply electric power to the wireless power receiving device using electric power of the battery 510. In addition, if a wired charging device and a wireless power receiving device are connected, the control logic 536 may perform control so as to supply electric power to the wireless power receiving device while charging the battery 510 by receiving electric power from the wired charging device. If an OTG device and a wireless power receiving device are connected, the control logic 536 may perform control so as to supply electric power to the wireless power receiving device using electric power of the battery 510 while executing an OTG function.

According to an embodiment, the switch group 538 may provide a constant current to the system 520 (e.g., the system 520 for supplying electric power to respective modules of the electronic device), may boost (↑) or buck (↓) a voltage of the battery 510 in order to provide a constant current to the external devices 502 and 503, or may boost (↑) or buck (↓) a supplied charging voltage in order to provide a constant charging current to the battery 510. According to an embodiment, the switch group 538 may include a buck/boost converter.

According to an embodiment, the charging switch 539 may detect the amount of charging current, and may interrupt the charging of the battery 510 in the case of overcharging or overheating.

According to an embodiment, the electronic device 501 may include a display (e.g., the display device 160 in FIG. 1). The display device 160 may display a user interface configured to control at least a part of the charging circuit 530. The display device 160 may receive a user input for wirelessly or wiredly transmitting electric power from the battery 510 to the external devices 502 and 503. The display device 160 may display one or more external devices 502 and 503 connected to the electronic device 501, and may display the remaining battery capacity of the connected external devices 502 and 503, or may display whether electric power is being supplied to the connected external device 502 or 503 or is being received from the connected external device 502 or 503. If a plurality of external devices 502 and 503 is connected and provided with electric power, the display device 160 may display a screen for adjusting distribution of electric power to be provided to the respective external devices 502 and 503, and may display a screen for selecting power supply priority with respect to the plurality of external devices 502 and 503. In addition, the display device 160 may display a screen indicating information on the display devices 160 of the connected external device 502 or 503. At least some of the content displayed on the display device 160 may vary according to signals received from the connected external devices 502 and 503.

Figure 6A:
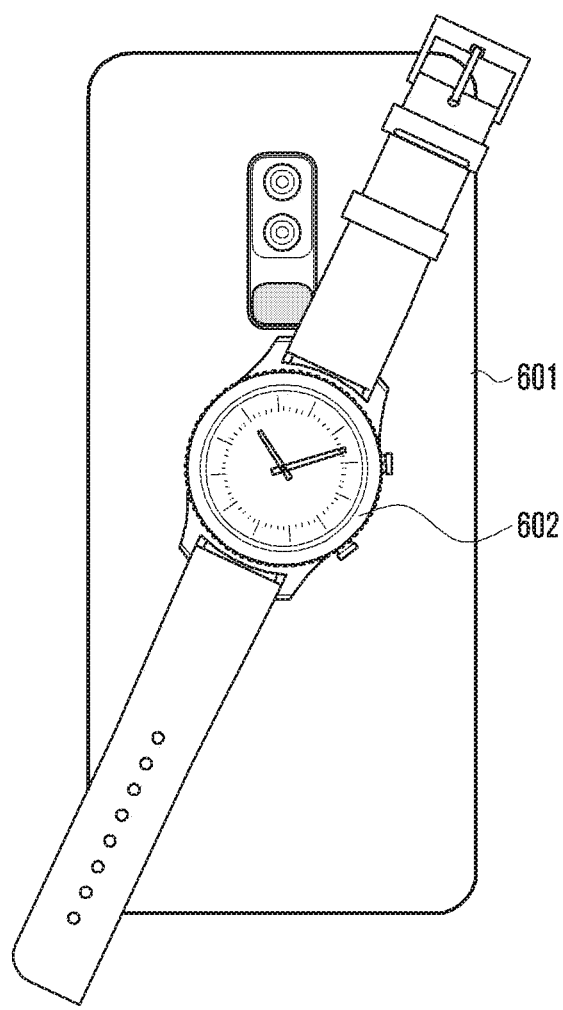
FIG. 6A illustrates an example of a user scenario of wirelessly charging a wearable device using a wireless charging function of an electronic device according to an embodiment of the disclosure.
Figure 6B:
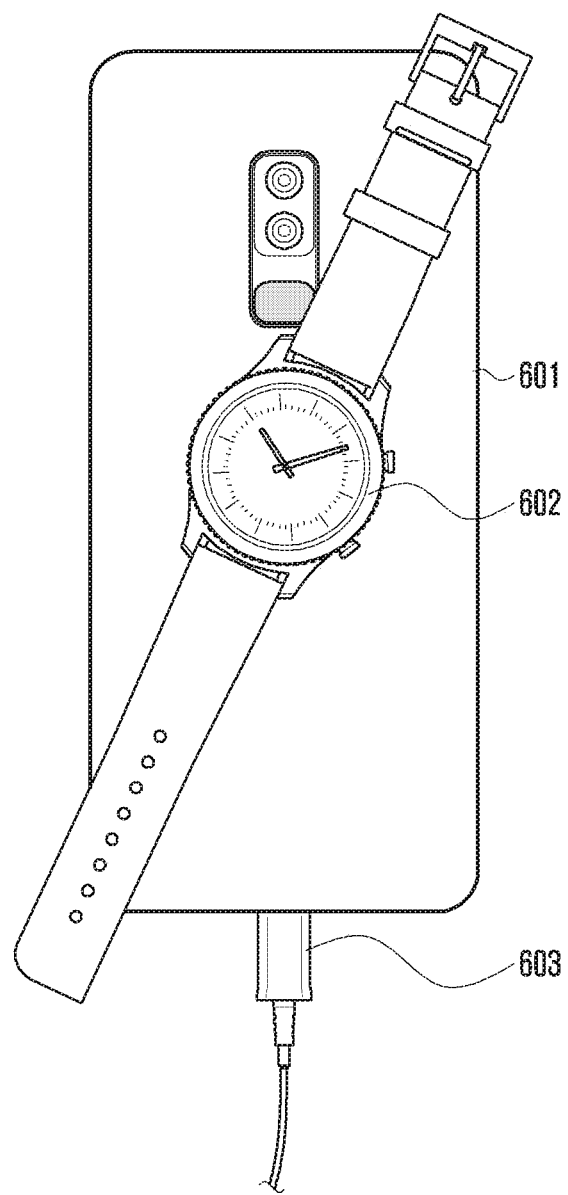
FIG. 6B illustrates an example of a user scenario of wirelessly charging a wearable device using a wireless charging function of an electronic device according to an embodiment of the disclosure.

FIG. 6A illustrates an example of a user scenario of wirelessly charging a wearable device 602 using a wireless charging function of an electronic device according to an embodiment of the disclosure, and FIG. 6B illustrates an example of a user scenario of wirelessly charging a wearable device 602 using a wireless charging function of an electronic device according to an embodiment of the disclosure. Although the wireless power receiving device 602 is illustrated as a wearable device 602 (e.g., a smart watch, wireless earphones, or a wireless headset) in the examples shown in FIGS. 6A and 6B, the wireless power receiving device 602 may be any of various electronic devices that can be wirelessly charged by receiving a relatively low electric power.

Referring to FIG. 6A, an electronic device 601 (e.g., the electronic device 101 in FIG. 1) according to various embodiments may activate a wireless power Tx mode, based on user input, and, if the wireless power Tx mode is activated, may wirelessly supply electric power to the wearable device 602 using electric power of the battery (e.g., the battery 510 in FIG. 5). For example, the user input may include a user's touch input through a display (e.g., the display device 160 in FIG. 1), manipulation of physical buttons provided on the outer side of a housing (e.g., the housing 405 in FIG. 4), or an approach of an external device (e.g., the wearable device 602 in FIG. 6A or 6B) to the electronic device 601.

Referring to FIG. 6B, the electronic device 601 according to various embodiments, if a wired charging device 603 (e.g., a travel adapter) is connected thereto, may charge the battery 510 while supplying electric power to the wearable device 602 by receiving electric power from the wired charging device 603.

Referring to FIG. 6B, the electronic device 601 according to various embodiments, if a wired charging device 603 (or an external power source) (e.g., a TA) is connected thereto, may charge the battery 510 while (or in parallel with) supplying electric power to the wearable device 602 by receiving electric power from the wired charging device 603.

According to an embodiment, as shown in FIG. 6A, if a wireless power Tx mode (e.g., a Tx mode) is activated in a stand-alone state, the electronic device 601 may generate a designated electric power (e.g., about 5V/3.75 W) using electric power of the battery 510, and may transmit the designated electric power through a coil (e.g., the coil 525-1 in FIG. 5). For example, the stand-alone state may denote the state in which the electronic device 601 is not connected to the wired charging device 603.

According to an embodiment, as shown in FIG. 6B, if a wireless power Tx mode is activated while the wired charging device 603 is connected to the electronic device 601, or if the wired charging device 603 is connected to the electronic device 601 while the wireless power Tx mode is active in a stand-alone state, the electronic device 601 may use part of the external electric power received from the wired charging device 603 in wireless power transmission, and may charge the battery 510 with the remaining electric power. According to various embodiments, if a wireless power Tx mode is activated while the wired charging device 603 is connected to the electronic device 601, or if the wired charging device 603 is connected to the electronic device 601 while the wireless power Tx mode is active in a stand-alone state, the electronic device 601 may use the external electric power in wireless power transmission in a designated first period, and may charge the battery 510 using the external electric power in a designated second period. According to an embodiment, the first period and the second period may switch to each other according to a predetermined criterion. For example, the electronic device 601 may alternately perform the operation of using the external electric power in wireless power transmission and the operation of using the external electric power in charging the battery 510. This will be described later with reference to the drawings.

According to various embodiments, if the wireless power Tx mode is activated, the electronic device 601 may perform in-band communication with the wireless power receiving device (or an external device) according to designated standards {e.g., wireless power consortium (WPC) standards}, and may exchange information used for wireless power transmission with the wireless power receiving device. For example, wireless charging in accordance with the WPC standards may include a ping step, an identification and configuration step, or a power transfer step. According to an embodiment, it may be determined in the ping step whether or not a wireless power receiving device (e.g., the wearable device 602 in FIG. 6A or 6B) is placed on the electronic device 601, and, for example, it may be determined whether or not the electronic device 601 is in proximity to the wireless power receiving device (e.g., the wearable device 602 in FIG. 6A or 6B). According to an embodiment, the identification and configuration step may be intended to configure the amount of power transmission through the communication between the wireless power supply device (e.g., the electronic device 601 in FIG. 6A or 6B) and the wireless power receiving device (e.g., the wearable device 602 in FIG. 6A or 6B), and, for example, may be the step in which the electronic device 601 determines a designated wireless power to be transmitted to the wireless power receiving device. According to an embodiment, the power transfer step may be intended to transmit the designated wireless power, and, for example, may be the step in which the electronic device 601 transmits the designated wireless power to the wireless power receiving device (e.g., the wearable device 602 in FIG. 6A or 6B). According to an embodiment, the electronic device 601 may perform the three steps above, thereby transmitting the wireless power, if the wireless power Tx mode is activated, and may not perform the three steps above if the wireless power Tx mode is not activated. According to an embodiment, if the wireless power Tx mode is activated, the electronic device 601 may display a notification indicating that the wireless power Tx mode has been activated through the display device 160, and if the wireless power Tx mode is deactivated, the electronic device 601 may display a notification indicating that the wireless power Tx mode has been deactivated through the display device 160.

According to various embodiments, if the wireless power Tx mode is activated while the wired charging device 603 is connected to the electronic device 601, the electronic device 601 may identify a wireless power receiving device (e.g., the wearable device 602 in FIG. 6A or 6B) according to designated standards (e.g., WPC standards), and may determine a designated electric power corresponding to the identified wireless power receiving device. For example, the electronic device 601 may identify that the wireless power receiving device is a wearable device 602, and may determine a designated electric power (e.g., about 5V/3.75 W) corresponding to the wearable device 602.

According to an embodiment, if the connected wired charging device 603 supports fast charging (e.g., AFC, QC, or PD) (e.g., based on about 9V/15 W), the electronic device 601 may charge the wearable device 602 or the battery 510, based on a designated electric power {e.g., fast charging power (e.g., about 9V/15 W)}. According to an embodiment, if the connected wired charging device 603 is a device that does not support fast charging, such as a 5V standard TA (e.g., about 10 W power) or a USB device {e.g., a standard downstream port (SDP) (e.g., about 5 W power), or a charging downstream port (CDP) (e.g., about 7.5 W power)}, the electronic device 601 may charge the wearable device 602 or the battery 510, based on a designated electric power {e.g., normal charging power (e.g., about 5V/3.75 W)}.

According to various embodiments, if the wired charging device 603 is connected, and if the wireless power Tx mode is active, the electronic device 601 may perform a designated operation, based on a designated event. According to an embodiment, the designated event may include detachment of the wired charging device 603, deactivation of the wireless power Tx mode, charging of the battery 510 to a designated level or more, or full charging of the wireless power receiving device (e.g., the wearable device 602 in FIG. 6A or 6B).

According to an embodiment, if the wired charging device 603 is detached in the state in which the wired charging device 603 is connected and the wireless power Tx mode is activated, the electronic device 601 may stop the operation of charging the battery 510, and may maintain the operation of transmitting the designated electric power to the wireless power receiving device (e.g., the wearable device 602 in FIG. 6A or 6B) using electric power of the battery 510.

According to an embodiment, if the wireless power Tx mode is deactivated based on user input in the state in which the wired charging device 603 is connected and the wireless power Tx mode is active, the electronic device 601 may stop the operation of transmitting the designated electric power to the wireless power receiving device (e.g., the wearable device 602 in FIG. 6A or 6B). For example, the electronic device 601 may charge the battery 510 using external electric power if the wired charging device 603 is connected thereto.

According to an embodiment, if the battery 510 is charged to a designated level or more in the state in which the wired charging device 603 is connected and the wireless power Tx mode is active, the electronic device 601 may stop the operation of charging of the battery 510, and may perform an operation of transmitting a designated electric power to the wireless power receiving device (e.g., the wearable device 602 in FIG. 6A or 6B), regardless of a designated period (e.g., the second period) for charging the battery 510. For example, the electronic device 601 may use external electric power in wireless power transmission without switching (or swapping) between a first period for using external electric power received from the wired charging device 603 in wireless power transmission and a second period for using external electric power in charging the battery 510. According to an embodiment, if the remaining capacity of the battery 510 drops below another designated level, the electronic device 601 may resume switching between the first period and the second period, thereby performing an operation of transmitting a designated electric power to the wireless power receiving device in the first period and performing an operation of charging the battery 510 in the second period.

According to an embodiment, the electronic device 601 may operate by changing the remaining battery capacity reference according to the first period or the second period, based on the remaining battery capacity of the battery 510. According to an embodiment, an example in which the first period and the second period are separated based on a remaining battery capacity of about 85% will be described. For example, if the remaining battery capacity of the wireless power receiving device (e.g., the wearable device 602 in FIG. 6A or 6B) is about 85% or less, the electronic device 601 (e.g., a wireless power supply device) may operate, for example, with a remaining battery capacity reference of about 1% for wired charging and a remaining battery capacity reference of about 0.9% for wireless power transmission (e.g., battery sharing) by regarding a wireless power transmission function as more important. As another example, if the remaining battery capacity of the wireless power receiving device exceeds about 85%, the electronic device 601 may operate, for example, with a remaining battery capacity reference of about 3% for wired charging and a remaining battery capacity reference of about 0.9% for wireless power transmission (e.g., battery sharing) by regarding a wired charging function of the electronic device 601 (e.g., a wireless power supply device) as more important. According to an embodiment, after the battery 510 is fully charged to 100%, the electronic device 601 (e.g., a wireless power supply device) may perform wireless power transmission (e.g., battery sharing) to the wireless power receiving device while maintaining the remaining battery capacity to be about 100%.

According to an embodiment, if the wireless power receiving device (e.g., the wearable device 602 in FIG. 6A or 6B) is fully charged in the state in which the wired charging device 603 is connected and the wireless power Tx mode is active, the electronic device 601 may stop transmitting the designated electric power to the wireless power receiving device. For example, the electronic device 601 may receive a designated signal indicating that the wireless power receiving device has been fully charged from the wireless power receiving device receiving wireless power, and may deactivate the wireless power Tx mode in response to the designated signal. For example, if the wired charging device 603 is connected, the electronic device 601 may charge the battery 510 using external electric power.

According to various embodiments, if the remaining capacity of the battery 510 is equal to or less than a designated value, the electronic device 601 may deactivate the wireless power Tx mode. For example, if the remaining capacity of the battery 510 is less than or equal to a designated value {for example, the state of charge (SOC) is less than N % (e.g., 15%, 20%, or 30%)}, the electronic device 601 may automatically deactivate the wireless power Tx mode, or may deactivate a UI icon for activating the wireless power Tx mode. For example, if the remaining capacity of the battery 510 is less than or equal to a designated value, the electronic device 601 may stop transmitting the designated electric power to the wireless power receiving device (e.g., the wearable device 602 in FIG. 6A or 6B). In this case, even if the user touches the UI icon, the wireless power Tx mode may not be activated, and the electronic device 601 may output, to the user, a notification indicating that the wireless power Tx mode cannot be activated due to a low battery 510. According to various embodiments, the electronic device 601 may activate the wireless power Tx mode in the case where the wired charging device 603 is connected thereto even if the remaining capacity of the battery 510 is equal to or less than a designated value. According to an embodiment, if the remaining capacity of the battery 510 is equal to or less than a designated value, the electronic device 601 may preferentially use external electric power of the wired charging device 603 in charging the battery 510.

Table 1 may show examples in which the electronic device 601 receives a relatively low wireless power (e.g., 5V/3.75 W) (e.g., a first charging power) and transmits wireless power to any of various rechargeable electronic devices 601 (e.g., the wearable device 602), as shown in FIGS. 6A and 6B.

TABLE 1

| State of electronic device | Connected wired charging device | Occurrence of event | Wireless power transmission of electronic device | Operation of electronic device |
|---|---|---|---|---|
| Wireless power Tx mode is activated in stand-alone state | — | — | Performed | Transmit wireless power using battery power |
| Wireless power Tx mode is activated during connection of wired charging device | AFC QC PD USB | — — — — | Performed Performed Performed Performed | Use external electric power preferentially in wireless power transmission and charge battery with remaining electric power (Switch from 9 V/15 W charging to 5 V/10 W charging) |
| Wired charging device is connected while wireless power Tx mode is active in stand-alone state | AFC QC PD USB (SDP) USB (CDP) | — — — — — | Performed Performed Performed Performed Performed | |
| Wired charging device is connected and wireless power Tx mode is active | Any wired charging device | Detachment of wired charging device | Performed | Transmit wireless power using battery power |
| | Any wired charging device | Wireless power Tx mode is deactivated | Not performed | Charge battery using external electric power |
| | Any wired charging device | External device is fully charged | Not performed | Charge battery using external electric power |

Case in which Wireless Power Tx Mode is Activated in Stand-Alone State

Referring to Table 1, if a wireless power Tx mode is activated in a stand-alone state, the electronic device 601 according to an embodiment may generate a relatively low second designated electric power (e.g., 5V/3.75 W) using electric power of the battery 510, and may transmit the second designated electric power through a coil (e.g., the coil 525-1 in FIG. 5). For example, the stand-alone state may denote the state in which the electronic device 601 is not connected to the wired charging device 603.

Case in which Wireless Power Tx Mode is Activated During Connection of Wired Charging Device 603

Referring to Table 1, if a wireless power Tx mode is activated while the wired charging device 603 is connected to the electronic device 601, the electronic device 601 according to an embodiment may preferentially use external electric power in wireless power transmission, and may charge the battery 510 by the remaining electric power.

According to various embodiments, if the wireless power Tx mode is activated, the electronic device 601 may perform in-band communication with an external device 602 according to designated standards (e.g., WPC standards), and may exchange information used for wireless power transmission with the external device 602. For example, wireless charging in accordance with the WPC standards may include a ping step, an identification and configuration step, or a power transfer step. According to an embodiment, it may be determined in the ping step whether or not a wireless power receiving device (e.g., the wearable device 602 in FIG. 6A) is placed on a wireless charging pad, and, for example, it may be determined whether or not the electronic device 601 is in proximity to the external device 602 (e.g., the wearable device 602 in FIG. 6A). According to an embodiment, the identification and configuration step may be intended to configure the amount of power transmission through the communication between the wireless power transmitting device (e.g., the electronic device 601 in FIG. 6A) and the wireless power receiving device (e.g., the wearable device 602 in FIG. 6A), and, for example, may be the step in which the electronic device 601 determines a designated wireless power to be transmitted to the external device 602. According to an embodiment, the power transfer step may be intended to transmit the designated wireless power, and, for example, may be the step in which the electronic device 601 transmits the designated wireless power to the external device 602. According to an embodiment, the electronic device 601 may perform the three steps above, thereby transmitting the wireless power, if the wireless power Tx mode is activated, and may not perform the three steps above if the wireless power Tx mode is not activated. According to an embodiment, if the Tx mode is deactivated, the electronic device 601 may display a notification indicating that the wireless power Tx mode has been deactivated through the display device 160.

According to an embodiment, if the wireless power Tx mode is activated while the wired charging device 603 is connected to the electronic device 601, the electronic device 601 may identify an external device 602 according to designated standards (e.g., WPC standards), and may determine a designated electric power corresponding to the identified external device 602. For example, the electronic device 601 may identify that the external device 602 is a wearable device 602, and may determine a second designated electric power (e.g., about 5V/3.75 W) corresponding to the wearable device 602. According to an embodiment, the electronic device 601 may wirelessly transmit the designated electric power using external electric power provided from the wired charging device 603, and may charge the battery 510 by the remaining electric power, excluding the designated electric power. For example, if the connected wired charging device 603 supports fast charging (e.g., AFC, QC, or PD) (based on 9V/15 W), the electronic device 601 may preferentially generate a second designated electric power (e.g., 5V/3.75 W) using the external electric power, thereby transmitting the generated second designated electric power (e.g., 5V/3.75 W) to the wearable device 602, and may provide the remaining electric power of 5V/6.25 W to the system or the battery 510. As another example, if the connected wired charging device 603 supports fast charging, the electronic device 601 may charge the battery with fast charging electric power (e.g., 9V/15 W), and if the Tx mode is activated, the electronic device 601 may switch the charging electric power of the battery from the fast charging electric power (e.g., 9V/15 W) to normal charging electric power (e.g., 5V/10 W), may transmit part (e.g., 5V/3.75) of the switched normal charging electric power (e.g., 5V/10 W), as wireless power, to the wearable device 602, and may charge the battery using the remaining electric power (e.g., 5V/6.25 W).

According to an embodiment, if the connected wired charging device 603 is a device that does not support fast charging, such as a 5V standard travel adapter (TA) (e.g., 10 W power) or a USB device {e.g., a standard downstream port (SDP) (e.g., 5 W power) or a charging downstream port (CDP) (e.g., 7.5 W power)}, the electronic device 601 may transmit a second designated electric power (e.g., 5V/3.75 W) to the wearable device 602, and may provide the system or charge the battery 510 with the remaining electric power.

Case in which Wired Charging Device 603 is Connected while Wireless Power Tx Mode is Active in Stand-Alone State Referring to Table 1, if the wired charging device 603 is connected to the electronic device 601 while the wireless power Tx mode is active in a stand-alone state, the electronic device 601 according to an embodiment may maintain the operation of transmitting a designated electric power to the external device 602, and may further charge the battery 510. According to an embodiment, the electronic device 601 may transmit a designated electric power, as wireless power, using external electric power provided from the wired charging device 603, and may charge the battery 510 by the remaining electric power, excluding the designated electric power. For example, if the connected wired charging device 603 supports fast charging (e.g., AFC, QC, or PD) (based on 9V/15 W), the electronic device 601 may preferentially generate a second designated electric power (e.g., 5V/3.75 W) using the external electric power, thereby transmitting the generated second designated electric power to the wearable device 602, and may provide the remaining electric power of 5V/6.25 W to the battery 510. As another example, if the connected wired charging device 603 supports fast charging, the electronic device 601 may charge the battery with fast charging electric power (e.g., 9V/15 W), and if the Tx mode is activated, the electronic device 601 may switch the charging electric power of the battery from the fast charging electric power (e.g., 9V/15 W) to normal charging electric power (e.g., 5V/10 W), may transmit part (e.g., 5V/3.75) of the switched normal charging power (e.g., 5V/10 W), as wireless power, to the wearable device 602, and may charge the battery using the remaining electric power (e.g., 5V/6.25 W).

According to an embodiment, if the connected wired charging device 603 is a device that does not support fast charging, such as a 5V standard travel adapter (TA) (e.g., 10 W power) or a USB device {e.g., a standard downstream port (SDP) (e.g., 5 W power) or a charging downstream port (CDP) (e.g., 7.5 W power)}, the electronic device 601 may transmit a second designated electric power (e.g., 5V/3.75 W) to the wearable device 602, and may provide the system or charge the battery 510 with the remaining electric power.

Case in which Wired Charging Device 603 is Connected and Wireless Power Tx Mode is Active Referring to Table 1, if the wired charging device 603 is connected and the wireless power Tx mode is active, the electronic device 601 according to an embodiment may perform a designated operation, based on a designated event. According to an embodiment, the designated event may include detachment of the wired charging device 603, deactivation of the wireless power Tx mode, and full charging of the external device 602.

According to an embodiment, if the wired charging device 603 is detached in the state in which the wired charging device 603 is connected and the wireless power Tx mode is active, the electronic device 601 may stop charging the battery 510, and may maintain the operation of transmitting a designated electric power to the external device 602 using electric power of the battery 510.

According to an embodiment, if the wireless power Tx mode is deactivated based on user input in the state in which the wired charging device 603 is connected, in which the wired charging device 603 is connected to the external device 602, or in which the wireless power Tx mode is active, the electronic device 601 may stop the operation of transmitting a designated electric power to the external device 602. For example, if the wired charging device 603 is connected, the electronic device 601 may charge the battery 510 using external electric power. As another example, if the connected wired charging device 603 supports fast charging (e.g., AFC, QC, or PD) (based on 9V/15 W), the electronic device 601 may switch the charging electric power for the battery 510 from 5V/10 W to 9V/15 W.

According to an embodiment, if the external device 602 is fully charged in the state in which the electronic device 601 is connected to the wired charging device 603, in which the wired charging device 603 is connected to the external device 602, or in which the wireless power Tx mode is active, the electronic device 601 may stop the operation of transmitting a designated electric power to the external device 602. For example, the electronic device 601 may receive, from the external device 602 receiving the wireless power, a designated signal indicating that the external device 602 has been fully charged, and may deactivate the wireless power Tx mode in response to the designated signal. For example, if the wired charging device 603 is connected to the electronic device 601, the electronic device 601 may charge the battery 510 using external electric power. As another example, if the connected wired charging device 603 supports fast charging (e.g., AFC, QC, or PD) (based on 9V/15 W), the electronic device 601 may switch the charging electric power for the battery 510 from 5V/10 W to 9V/15 W.

As described in the above scenarios, the wearable device 602 has a small battery 510 having a low charging power. For example, a smart watch is able to be wirelessly charged only by a designated wireless power of about 3.75 W. Accordingly, the electronic device 601 may wirelessly transmit a designated electric power, regardless of whether or not the wired charging device 603 is connected and whether or not the connected wired charging device 603 supports fast charging (e.g., AFC, QC, or PD) (e.g., based on 9V/15 W). However, if the wired charging device 603 is a fast charging device, the electronic device 601 may perform an operation of switching a fast charging mode to a normal charging mode. For example, if the connected wired charging device 603 supports fast charging, the electronic device 601 may charge the battery with fast charging electric power (e.g., 9V/15 W), and if the Tx mode is activated, the electronic device 601 may switch the charging electric power of the battery from the fast charging electric power (e.g., 9V/15 W) to normal charging electric power (e.g., 5V/10 W), may transmit part (e.g., 5V/3.75) of the switched normal charging power (e.g., 5V/10 W), as wireless power, to the wearable device 602, and may charge the battery using the remaining electric power (e.g., 5V/6.25 W).

According to various embodiments, if the remaining capacity of the battery 510 (e.g., the remaining battery capacity, the state of charge (SOC), or a battery level) is equal to or less than a designated value, the electronic device 601 may deactivate the Tx mode. For example, if the remaining capacity of the battery 510 is equal to or less than a designated value, the electronic device 601 may automatically deactivate the wireless power Tx mode, or may deactivate a UI icon for activating the wireless power Tx mode. In this case, even if the user touches the UI icon, the wireless power Tx mode may not be activated, and the electronic device 601 may output, to the user, a notification indicating that the wireless power Tx mode cannot be activated due to a low battery 510.

According to various embodiments, the electronic device 601 may activate the wireless power Tx mode in the case where the wired charging device 603 is connected thereto even if the remaining capacity of the battery 510 is equal to or less than a designated value.

According to various embodiments, since the wearable device 602 is wirelessly charged with electric power of 5V/3.75 W, if the wired charging device 603 connected to the electronic device 601 is a 5V travel adapter (TA) or a USB (SDP), which does not support fast charging, the electronic device 601 may transmit wireless power by wired input power without separate voltage conversion. On the other hand, if the connected wired charging device 603 supports fast charging (e.g., AFC, QC, or PD) (based on 9V/15 W), since the external electric power is a high voltage of 9V or more, the electronic device 601 may reduce the external electric power to a level of 5V suitable for the wearable device 602. For example, if the wired charging device 603 connected to the electronic device 601 is a device that supports fast charging, and if the external device 602 is a wearable device 602, the electronic device 601 may perform PWM switching in a TRX IC (e.g., the TRX IC 525-2 in FIG. 5), or may reduce the external electric power through a separate converter circuit.

Figure 7A:
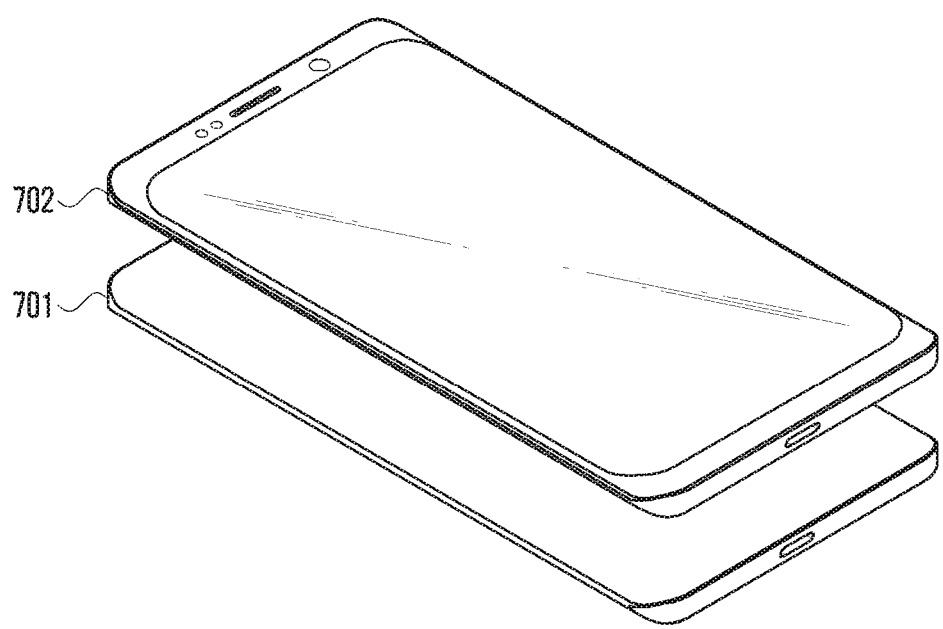
FIG. 7A illustrates an example of a user scenario of wirelessly charging an external electronic device using a wireless charging function of an electronic device according to an embodiment of the disclosure.
Figure 7B:
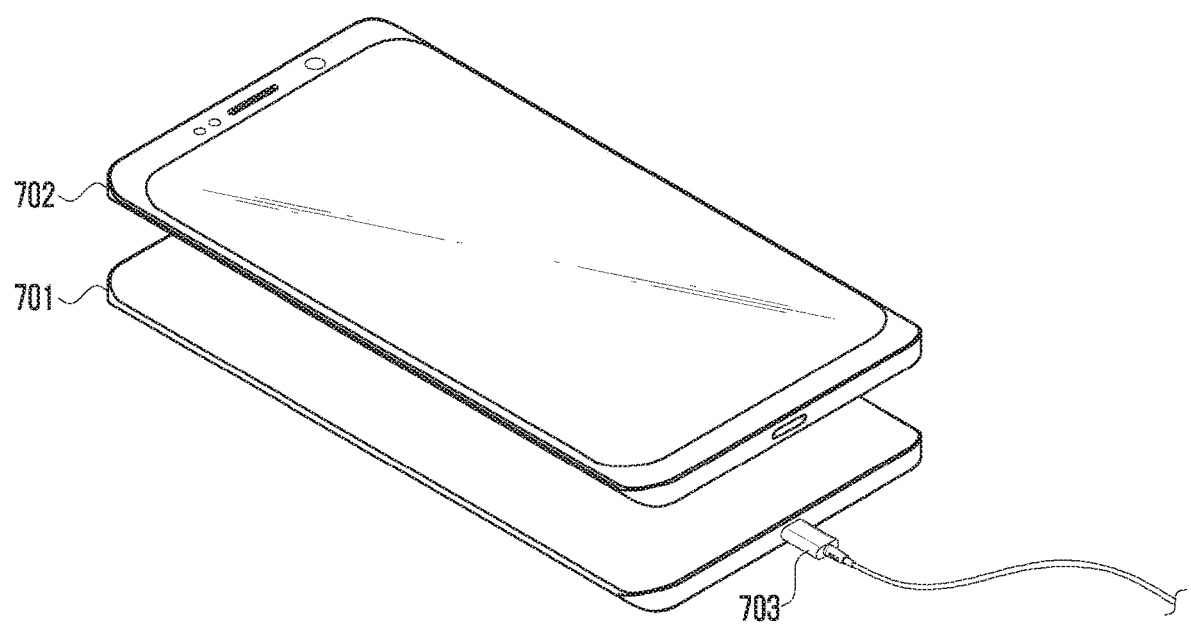
FIG. 7B illustrates an example of a user scenario of wirelessly charging an external electronic device using a wireless charging function of an electronic device according to an embodiment of the disclosure.

FIG. 7A illustrates an example of a user scenario of wirelessly charging an external electronic device using a wireless charging function of an electronic device according to an embodiment of the disclosure, and FIG. 7B illustrates an example of a user scenario of wirelessly charging an external electronic device using a wireless charging function of an electronic device according to an embodiment of the disclosure. Although the wireless power receiving device 702 is illustrated as an electronic device (smart phone) 702 in the examples shown in FIGS. 7A and 7B, the wireless power receiving device 702 may be any of various electronic devices that can be wirelessly charged by receiving a relatively high power.

Referring to FIG. 7A, an electronic device 701 (e.g., the electronic device 101 in FIG. 1) according to various embodiments may activate a wireless power Tx mode, based on user input, and, if the wireless power Tx mode is activated, may wirelessly supply electric power to the external electronic device 702 using electric power of a battery (e.g., the battery 510 in FIG. 5).

Referring to FIG. 7B, an electronic device 701 according to various embodiments, if a wired charging device 703 supporting fast charging (e.g., AFC, QC, or PD) (based on 9V/15 W) is connected thereto, the electronic device 701 may receive electric power from the wired charging device 703, thereby simultaneously supplying electric power to the external electronic device 701 and charging the battery 510.

Referring to FIG. 7A, the electronic device 701 (e.g., the electronic device 101 in FIG. 1) according to various embodiments may activate a wireless power Tx mode (e.g., a Tx mode), based on user input, and, if the wireless power Tx mode is activated, may wirelessly supply electric power to another electronic device 702 using electric power of a battery (e.g., the battery 510 in FIG. 5). According to an embodiment, the user input may include a user's touch input through a display (e.g., the display device 160 in FIG. 1), manipulation of physical buttons provided on the outer side of a housing (e.g., the housing 405 in FIG. 4), or an approach of an external device (e.g., another electronic device 702 in FIG. 7A or 7B) to the electronic device 701.

Referring to FIG. 7B, the electronic device 701 according to various embodiments, if a wired charging device 703 {or an external power source (e.g., a TA)} is connected thereto, may charge the battery 510 while (or in parallel with) supplying electric power to another electronic device 702 by receiving electric power from the wired charging device 703.

According to an embodiment, as shown in FIG. 7A, if a wireless power Tx mode (e.g., a Tx mode) is activated in a stand-alone state, the electronic device 701 may generate a designated electric power (e.g., about 7.5V/7.5 W) using electric power of the battery 510, and may transmit the designated electric power through a coil (e.g., the coil 525-1 in FIG. 5). For example, the stand-alone state may denote the state in which the electronic device 701 is not connected to the wired charging device 703.

According to an embodiment, as shown in FIG. 7B, if a wireless power Tx mode is activated while the wired charging device 703 is connected to the electronic device 701, or if the wired charging device 703 is connected to the electronic device 601 while the wireless power Tx mode is active in a stand-alone state, the electronic device 701 may use part of the external electric power received from the wired charging device 603 in wireless power transmission, and may charge the battery 510 with the remaining electric power. According to various embodiments, if a wireless power Tx mode is activated while the wired charging device 703 is connected to the electronic device 701, or if the wired charging device 703 is connected to the electronic device 701 while the wireless power Tx mode is active in a stand-alone state, the electronic device 701 may use external electric power in wireless power transmission in a designated first period, and may charge the battery 510 with the external electric power in a designated second period. According to an embodiment, the first period and the second period may switch to each other according to a predetermined criterion. For example, the electronic device 701 may alternately perform the operation of using the external electric power in wireless power transmission and the operation of using the external electric power in charging the battery 510. This will be described later with reference to the drawings.

According to various embodiments, if the wireless power Tx mode is activated, the electronic device 701 may perform in-band communication with the wireless power receiving device (or an external device) according to designated standards (e.g., WPC standards), and may exchange information used for wireless power transmission with the wireless power receiving device. For example, if the wireless power Tx mode is activated while the wired charging device 703 is connected to the electronic device 701, the electronic device 701 may identify a wireless power receiving device (e.g., another electronic device 702 in FIG. 7A or 7B) according to designated standards (e.g., WPC standards), and may determine a designated electric power corresponding to the identified wireless power receiving device. For example, the electronic device 701 may identify that the wireless power receiving device is another electronic device 702 (e.g., a smart phone), and may determine a designated electric power (e.g., about 7.5V/7.5 W) corresponding to another electronic device 702.

According to an embodiment, if the connected wired charging device 703 supports fast charging (e.g., AFC, QC, or PD) (e.g., about 9V/15 W), the electronic device 701 may charge the external device 702 or the battery 510, based on the designated electric power {e.g., fast charging power (e.g., about 9V/15 W)}. According to an embodiment, if the connected wired charging device 703 is a device that does not support fast charging, such as a 5V standard TA (e.g., about 10 W power), a USB device {e.g., an SDP (e.g., about 5 W power) or a CDP (e.g., about 7.5 W power)}, the electronic device 701 may charge the external device 702 or the battery 510, based on the designated electric power {e.g., normal charging power (e.g., about 5V/3.75 W)}.

According to various embodiments, if the wired charging device 703 is connected to the electronic device 701 and the wireless power Tx mode is active, the electronic device 701 may perform a designated operation, based on a designated event. According to an embodiment, the designated event may include detachment of the wired charging device 703, deactivation of the wireless power Tx mode, charging of the battery 510 to a designated level or more, or full charging of the wireless power receiving device (e.g., another electronic device 702 in FIG. 7A or 7B). According to an embodiment, the operation of the electronic device 701 according to a designated event may correspond to the operation of the electronic device 601 in relation to a designated event described with reference to FIGS. 6A and 6B.

According to an embodiment, if the battery 510 is charged to a designated level or more in the state in which the wired charging device 703 is connected to the electronic device 701 and the wireless power Tx mode is active, the electronic device 701 may stop charging the battery 510, and may perform an operation of transmitting a designated electric power to the wireless power receiving device (e.g., another electronic device 702 in FIG. 7A or 7B), regardless of a designated period (e.g., a second period) for charging the battery 510. For example, the electronic device 701 may use external electric power in wireless power transmission without switching (or swapping) between a first period for using external electric power received from the wired charging device 703 in wireless power transmission and a second period for using external electric power in charging the battery 510. According to an embodiment, if the remaining capacity of the battery 510 is lowered below another designated level, the electronic device 701 may resume switching between the first period and the second period, thereby performing an operation of transmitting a designated electric power to the wireless power receiving device in the first period and performing an operation of charging the battery 510 in the second period.

According to an embodiment, the electronic device 701 may operate by changing the remaining battery capacity reference according to the first period or the second period, based on the remaining battery capacity of the battery 510. According to an embodiment, an example in which the first period and the second period are separated based on a remaining battery capacity of about 85% will be described. For example, if the remaining battery capacity of the wireless power receiving device (e.g., another electronic device 702 in FIG. 7A or 7B) is about 85% or less, the electronic device 701 (e.g., a wireless power supply device) may operate, for example, with a remaining battery capacity reference of about 1% for wired charging and a remaining battery capacity reference of about 0.9% for wireless power transmission (e.g., battery sharing) by regarding a wireless power transmission function as more important. As another example, if the remaining battery capacity of the wireless power receiving device exceeds about 85%, the electronic device 701 may operate, for example, with a remaining battery capacity reference of about 3% for wired charging and a remaining battery capacity reference of about 0.9% for wireless power transmission (e.g., battery sharing) by regarding a wired charging function of the electronic device 701 (e.g., a wireless power supply device) as more important. According to an embodiment, if the battery 510 is fully charged to 100%, the electronic device 701 (e.g., a wireless power supply device) may perform wireless power transmission (e.g., battery sharing) to the wireless power receiving device while maintaining the remaining battery capacity to be about 100%.

According to various embodiments, if the remaining capacity of the battery 510 is equal to or less than a designated value, the electronic device 701 may deactivate the wireless power Tx mode. For example, if the remaining capacity of the battery 510 is less than or equal to a designated value {for example, the state of charge (SOC) is less than N % (e.g., 15%, 20%, or 30%)}, the electronic device 701 may automatically deactivate the wireless power Tx mode, or may deactivate a UI icon for activating the wireless power Tx mode. For example, if the remaining capacity of the battery 510 is less than or equal to a designated value, the electronic device 701 may stop the operation of transmitting a designated electric power to the wireless power receiving device (e.g., another electronic device 702 in FIG. 7A or 7B). In this case, even if the user touches the UI icon, the wireless power Tx mode may not be activated, and the electronic device 701 may output, to the user, a notification indicating that the wireless power Tx mode cannot be activated due to a low battery 510.

According to various embodiments, the electronic device 701 may activate the wireless power Tx mode in the case where the wired charging device 703 is connected thereto even if the remaining capacity of the battery 510 is equal to or less than a designated value. According to an embodiment, if the remaining capacity of the battery 510 is equal to or less than a designated value, the electronic device 701 may preferentially use external electric power of the wired charging device 703 in charging the battery 510.

Table 2 may show examples in which the electronic device 701 receives a relatively high wireless power (e.g., 7.5V/7.5 W) (e.g., a second charging power) and transmits wireless power to a rechargeable external electronic device 702 (e.g., a smart phone 702), as shown in FIGS. 7A and 7B.

TABLE 2

| State of electronic device | Connected wired charging device | Occurrence of event | Wireless power transmission of electronic device | Operation of electronic device |
| --- | --- | --- | --- | --- |
| Wireless power Tx mode is activated in stand-alone state | — | — | Performed | Transmit wireless power using battery power |

TABLE 2-continued

| State of electronic device | Connected wired charging device | Occurrence of event | Wireless power transmission of electronic device | Operation of electronic device |
|---|---|---|---|---|
| Wireless power Tx mode is activated during connection of wired charging device | 5 V TA and USB | — | Performed | Use external electric power in wireless power transmission, and determine whether or not to transmit wireless power and adjust transmission period, based on remaining battery capacity |
|  | AFC | — | Performed | Use external electric power preferentially in wireless power transmission and charge battery with remaining electric power |
|  | QC | — | Performed |  |
|  | PD | — | Performed |  |
| Wired charging device is connected while wireless power Tx mode is active in stand-alone state | 5 V TA and USB | — | Performed | Use external electric power in wireless power transmission, and determine whether or not to transmit wireless power and adjust transmission period, based on remaining battery capacity |
|  | AFC | — | Performed | Use external electric power preferentially in wireless power transmission and charge battery with remaining electric power |
|  | QC | — | Performed |  |
|  | PD | — | Performed |  |
| Wired charging device is connected and wireless power Tx mode is active | Any wired charging device | Detachment of wired charging device | Performed | Transmit wireless power using battery power |
|  | Any wired charging device | Wireless power Tx mode is deactivated | Not performed | Charge battery using external electric power |
|  | Any wired charging device | External device is fully charged | Not performed | Charge battery using external electric power |
| Wireless power is being transmitted | Any wired charging device | External device is connected to wired charging device | Not performed | Deactivate Tx mode and charge battery using external electric power |

Case in which Wireless Power Tx Mode is Activated in Stand-Alone State

Referring to Table 2, if a wireless power Tx mode is activated in a stand-alone state, the electronic device 701 according to an embodiment may generate a relatively high first designated electric power (e.g., 7.5V/7.5 W) using electric power of the battery 510, and may transmit the first designated electric power through a coil. For example, the stand-alone state may denote the state in which the electronic device 701 is not is connected to the wired charging device 703.

Case in which Wireless Power Tx Mode is Activated During Connection of Wired Charging Device 703

Referring to Table 2, if a wireless power Tx mode is activated while the wired charging device 703 is connected to the electronic device 701, the electronic device 701 may determine whether or not to transmit wireless power, based on whether or not the wired charging device 703 supports fast charging (e.g., AFC, QC, or PD) (based on 9V/15 W).

According to various embodiments, if the wireless power Tx mode is activated, the electronic device 701 may perform in-band communication with the external device 702 according to designated standards (e.g., WPC standards), and may exchange information used for wireless power transmission with the external device 702. For example, if the wireless power Tx mode is activated while the wired charging device 703 is connected to the electronic device 701, the electronic device 701 may identify the external device 702 according to designated standards (e.g., WPC standards), and may determine a designated electric power corresponding to the identified external device 702. For example, the electronic device 701 may identify that the external device 702 is a smart phone 702, and may determine a first designated electric power (e.g., 7.5V/7.5 W) corresponding to the smart phone 702.

According to an embodiment, if the external device 702 is a device that is wirelessly charged with a relatively high electric power, such as a smart phone 702, the electronic device 701 may determine whether or not to transmit wireless power, based on whether the connected wired charging device 703 supports fast charging (e.g., AFC, QC, or PD) (based on 9V/15 W). For example, if the connected wired charging device 703 supports fast charging (e.g., AFC, QC, or PD) (based on 9V/15 W), the electronic device 701 may transmit wireless power. In this case, the electronic device 701 may preferentially generate a first designated electric power (e.g., 7.5V/7.5 W) using the external electric power, thereby transmitting the generated first designated electric power (e.g., 7.5V/7.5 W) to the smart phone 702 that is an external device 702, and may provide the remaining electric power of 7.5 W to the battery 510.

As another example, if the connected wired charging device 703 is a 5V standard travel adapter (TA) or USB, which does not support fast charging, the electronic device 701 may determine whether or not to transmit wireless power, or may adjust transmission period thereof, based on the remaining capacity of the battery 510, thereby transmitting wireless power.

According to an embodiment, as the operation of determining whether or not to transmit wireless power or adjusting transmission period thereof, the electronic device 701 may alternately perform an operation of charging the battery 510 and an operation of transmitting the wireless power. For example, the electronic device 701 may alternately perform an operation of charging the battery 510 during a first designated time and an operation of transmitting the first designated electric power, based on the external electric power supplied from the wired charging device 703, during a second designated time. According to an embodiment, the first designated time and the second designated time may be the same.

According to another embodiment, the electronic device 701 may adjust the first designated time and the second designated time, based on the remaining capacity of the battery 510. For example, if the remaining capacity of the battery 510 is high (e.g., 70% or more), the electronic device 701 may configure the second designated time to be longer than the first designated time. Accordingly, the operation of transmitting the first designated electric power may take more time. As another example, if the remaining capacity of the battery 510 is low (e.g., less than 50%), the electronic device 701 may configure the first designated time to be longer than the second designated time. Accordingly, the operation of charging the battery 510 may take more time.

According to another embodiment, if the wired charging device 703 is a 5V standard travel adapter (TA) or USB, which does not support fast charging, the electronic device 701 may identify the initial remaining battery capacity (e.g., 48%) at the time at which the wired charging device 703 is initially connected, and may adjust the first designated time and the second designated time such that the initial remaining battery capacity (e.g., 48%) is not further lowered while alternately performing the operation of charging the battery 510 and the operation of transmitting wireless power. That is, if it is determined that the remaining battery capacity will become lower than the initial remaining battery capacity (e.g., 48%) due to the transmission of wireless power, the electronic device 701 may reduce the currently configured second designated time, and may increase the currently configured first designated time. Accordingly, the electronic device 701 may maintain the minimum value of the remaining capacity of the battery 510 to be the initial remaining battery capacity (e.g., 48%), or may increase the same even if the first designated electric power is transmitted.

Figure 9:
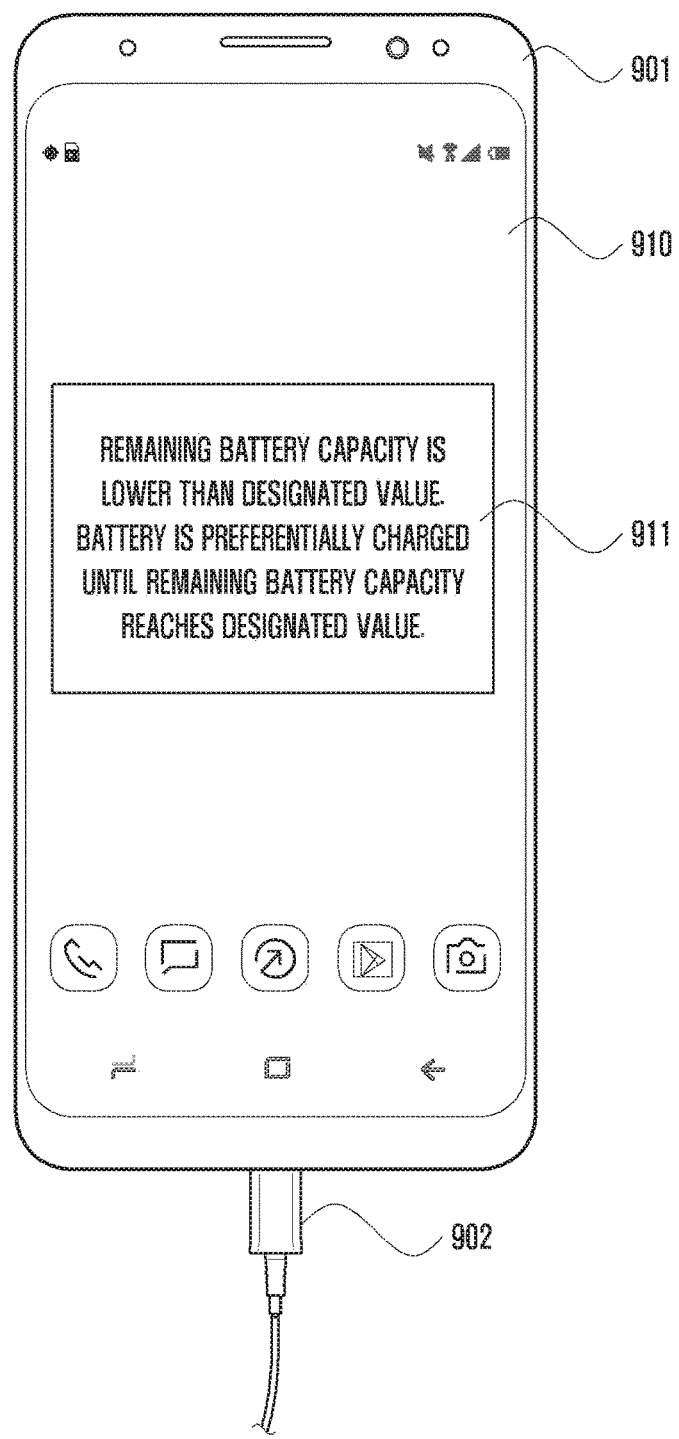
FIG. 9 illustrates an example of a user interface indicating that the battery is preferentially charged according to an embodiment of the disclosure.

According to various embodiments, if the connected wired charging device 703 does not support fast charging, the electronic device 701 may identify the remaining capacity of the battery 510, and may compare the remaining capacity of the battery 510 with a designated value. For example, the designated value may be configured based on user input. For example, the designated value may be 50%, and the electronic device 701 may determine whether or not the remaining capacity of the battery 510 exceeds 50%. If the remaining capacity of the battery 510 is greater than or equal to a designated value (e.g., 50%), the electronic device 701 may transmit the first designated electric power. On the other hand, if the remaining capacity of the battery 510 is less than a designated value (e.g., 50%), the electronic device 701 may charge the battery 510 using the external electric power supplied from the wired charging device, instead of transmitting wireless power. According to an embodiment, in the case where the electronic device 701 charges the battery 510 using the external electric power supplied from the wired charging device without transmitting wireless power, the electronic device 701 may display a designated notification through a display (e.g., the display device 160 in FIG. 1). Referring to FIG. 9, the electronic device 901 (e.g., the electronic device 101 in FIG. 1) may control the display 910 (e.g., the display device 160 in FIG. 1) to display a message 911 indicating that the electronic device 901 is preferentially charging the battery until the remaining battery capacity reaches a designated value. According to various embodiments, the message illustrated in FIG. 9 is only an example, and may be variously changed based on the following scenarios.

According to an embodiment, if the battery 510 is charged such that the remaining capacity of the battery 510 reaches the designated value (e.g., 50%) or more, the electronic device 701 may transmit the first designated electric power through a wireless interface.

According to various embodiments, if the connected wired charging device 703 does not support fast charging, and if the remaining capacity of the battery 510 is less than a designated value (e.g., 50%), the electronic device 701 may adjust a period to transmit wireless power. For example, the electronic device 701 may alternately perform an operation of charging the battery 510 and an operation of transmitting wireless power. For example, if the wired charging device 703 does not support fast charging, and if the remaining capacity of the battery 510 is less than a designated value (e.g., 50%), the electronic device 701 may alternately perform an operation of charging the battery 510 during a first designated time and an operation of transmitting the first designated electric power, based on the external electric power supplied from the wired charging device 703, during a second designated time. According to an embodiment, the first designated time and the second designated time may be the same. According to various embodiments, the first designated time and the second designated time may be configured to be different from each other, based on user input.

According to various embodiments, the electronic device 701 may alternately perform the operation of charging the battery 510 and the operation of transmitting wireless power, thereby charging the battery 510 and a battery of the external electronic device 702.

According to an embodiment, if the connected wired charging device 703 is a USB power delivery (PD), the electronic device 701 may determine whether or not the USB PD is able to supply electric power of 9V. For example, the electronic device 701 may make a request to the USB PD standard wired charging device 703 for boosting the external electric power to 9V, and if the USB PD standard wired charging device 703 supplies electric power of 9V in response to the request, the electronic device 701 may transmit wireless power using the supplied external electric power. If the USB PD standard wired charging device 703 does not support 9V, the electronic device 701 may perform an operation the same as or similar to the operation performed in the case where the 5V standard travel adapter (TA) or USB, which does not support fast charging, is connected to the electronic device, as described above.

Case in which Wired Charging Device 703 is Connected while Wireless Power Tx Mode is Active in Stand-Alone State Referring to Table 2, if the wired charging device 703 is connected while the wireless power Tx mode is active in a stand-alone state, the electronic device 701 according to an embodiment may determine whether or not to transmit wireless power, based on whether or not the wired charging device 703 supports fast charging (e.g., AFC, QC, or PD) (based on 9V/15 W). For example, if the wired charging device 703 supports fast charging, the electronic device 701 may maintain the operation of transmitting a first designated electric power to the external device 702, and may further charge the battery 510. In this case, the electronic device 701 may preferentially generate a first designated electric power (e.g., 7.5V/7.5 W) using the external electric power, thereby transmitting the generated first designated electric power (e.g., 7.5V/7.5 W) to the smart phone 702 corresponding to the external device 702, and may supply the remaining electric power of 7.5 W to the battery 510.

As another example, if the connected wired charging device 703 is a 5V standard travel adapter (TA) or USB, which does not support fast charging, the electronic device 701 may determine whether or not to transmit wireless power, or may adjust transmission period thereof, based on the remaining capacity of the battery 510, thereby transmitting wireless power.

According to an embodiment, as the operation of determining whether or not to transmit wireless power and adjusting transmission period thereof, the electronic device 701 may alternately perform an operation of charging the battery 510 and an operation of transmitting the wireless power. For example, the electronic device 701 may alternately perform an operation of charging the battery 510 during a first designated time and an operation of transmitting the first designated electric power, based on the external electric power supplied from the wired charging device 703, during a second designated time. According to an embodiment, the first designated time and the second designated time may be the same.

According to another embodiment, the electronic device 701 may adjust the first designated time and the second designated time, based on the remaining capacity of the battery 510. For example, if the remaining capacity of the battery 510 is high (e.g., 70% or more), the electronic device 701 may configure the second designated time to be longer than the first designated time. Accordingly, the operation of transmitting the first designated electric power may take more time. As another example, if the remaining capacity of the battery 510 is low (e.g., less than 50%), the electronic device 701 may configure the first designated time to be longer than the second designated time. Accordingly, the operation of charging the battery 510 may take more time.

According to another embodiment, if the wired charging device 703 is a 5V standard travel adapter (TA) or USB, which does not support fast charging, the electronic device 701 may identify the initial remaining battery capacity (e.g., 48%) at the time at which the wired charging device 703 is initially connected, and may adjust the first designated time and the second designated time such that the initial remaining battery capacity (e.g., 48%) is not lowered while alternately performing the operation of charging the battery 510 and the operation of transmitting wireless power. That is, if it is determined that the remaining battery capacity will become lower than the initial remaining battery capacity (e.g., 48%) due to the transmission of wireless power, the electronic device 701 may reduce the currently configured second designated time, and may increase the currently configured first designated time. Accordingly, the electronic device 701 may maintain the minimum value of remaining capacity of the battery 510 to be the initial remaining battery capacity (e.g., 48%), or may increase the same even if the first designated electric power is transmitted.

According to various embodiments, if the connected wired charging device 703 does not support fast charging, the electronic device 701 may identify the remaining capacity of the battery 510, and may compare the remaining capacity of the battery 510 with a designated value. For example, the designated value may be configured based on user input. For example, the designated value may be 50%, and the electronic device 701 may determine whether or not the remaining capacity of the battery 510 exceeds 50%. If the remaining capacity of the battery 510 is greater than or equal to a designated value (e.g., 50%), the electronic device 701 may maintain the transmission of the first designated electric power. On the other hand, if the remaining capacity of the battery 510 is less than a designated value (e.g., 50%), the electronic device 701 may stop transmitting the first designated electric power, and may charge the battery 510 using the external electric power supplied from the wired charging device. According to an embodiment, in the case where the electronic device 701 stops transmitting the first designated wireless power and charges the battery 510 using the external electric power supplied from the wired charging device, the electronic device 701 may display a designated notification through a display (e.g., the display device 160 in FIG. 1). For example, the electronic device 701 may display a message 911 indicating that the electronic device 701 is preferentially charging the battery until the remaining battery capacity reaches a designated value, as shown in FIG. 9. According to various embodiments, the message illustrated in FIG. 9 is only an example, and may be variously changed based on the following scenarios.

According to an embodiment, if the battery 510 is charged such that the remaining capacity of the battery 510 reaches the designated value (e.g., 50%) or more, the electronic device 701 may again transmit the first designated electric power through a wireless interface.

According to various embodiments, if the connected wired charging device 703 does not support fast charging, and if the remaining capacity of the battery 510 is less than a designated value (e.g., 50%), the electronic device 701 may adjust a period to transmit wireless power. For example, the electronic device 701 may alternately perform an operation of charging the battery 510 and an operation of transmitting wireless power. For example, if the wired charging device 703 does not support fast charging, and if the remaining capacity of the battery 510 is less than a designated value (e.g., 50%), the electronic device 701 may alternately perform an operation of charging the battery 510 during a first designated time and an operation of transmitting the first designated electric power, based on the external electric power supplied from the wired charging device 703, during a second designated time. According to an embodiment, the first designated time and the second designated time may be the same. According to various embodiments, the first designated time and the second designated time may be configured to be different from each other, based on user input.

According to various embodiments, the electronic device 701 may alternately perform the operation of charging the battery 510 and the operation of transmitting wireless power, thereby charging the battery 510 and a battery of the external electronic device 702.

According to an embodiment, if the connected wired charging device 703 is a USB power delivery (PD), the electronic device 701 may determine whether or not the USB PD is able to supply electric power of 9V. For example, the electronic device 701 may make a request to the USB PD standard wired charging device 703 for boosting the external electric power to 9V, and if the USB PD standard wired charging device 703 supplies electric power of 9V in response to the request, the electronic device 701 may transmit wireless power using the supplied external electric power. If the USB PD standard wired charging device 703 does not support 9V, the electronic device 701 may perform an operation the same as or similar to the operation performed in the case where the 5V standard travel adapter (TA) or USB, which does not support fast charging, is connected to the electronic device, as described above.

Case in which Designated Event Occurs while Wired Charging Device 703 is Connected and Wireless Power Tx Mode is Active Referring to Table 2, if the wired charging device 703 is connected to the electronic device 701, and if the wireless power Tx mode is active, the electronic device 701 may perform a designated operation, based on a designated event. According to an embodiment, the designated event may include detachment of the wired charging device 703, deactivation of the wireless power Tx mode, full charging of the external device 702, or connection of the external device 702 to the wired charging device 703.

According to an embodiment, if the wired charging device 703 is detached in the state in which the wired charging device 703 is connected to the electronic device 701 and in which the wireless power Tx mode is active, the electronic device 701 may maintain the operation of transmitting a designated electric power to the external device 702, and may stop the operation of charging the battery 510.

According to an embodiment, if the wireless power Tx mode is deactivated based on user input in the state in which the wired charging device 703 is connected to the electronic device 701 and in which the wireless power Tx mode is active, the electronic device 701 may stop the operation of transmitting a designated electric power to the external device 702. For example, if the wired charging device 703 is connected, the electronic device 701 may charge the battery 510 using external electric power. As another example, if the connected wired charging device 703 supports fast charging (e.g., AFC, QC, or PD) (based on 9V/15 W), the electronic device 701 may switch the charging electric power for the battery 510 from 7.5 W to 9V/15 W.

According to an embodiment, if the external device 702 is fully charged in the state in which the wired charging device 703 is connected to the electronic device 701 and in which the wireless power Tx mode is active, the electronic device 701 may stop the operation of transmitting a designated electric power to the external device 702. For example, the electronic device 701 may receive a designated signal indicating that the external device 702 has been fully charged from the external device 702 receiving the wireless power, and may deactivate the wireless power Tx mode in response to the designated signal. For example, if the wired charging device 703 is connected to the electronic device 701 after deactivating the wireless power Tx mode, the electronic device 701 may charge the battery 510 using external electric power. As another example, if the connected wired charging device 703 supports fast charging (e.g., AFC, QC, or PD) (based on 9V/15 W), the electronic device 701 may switch the charging electric power for the battery 510 from 7.5 W to 9V/15 W.

According to an embodiment, if the electronic device 701 detects that the external device 702 is connected to the wired charging device 703, the electronic device 701 may stop transmitting a designated electric power to the external device 702. For example, the electronic device 701 may receive a designated signal indicating that the wired charging device 703 is connected to the external device 702 from the external device 702 receiving the wireless power, and may deactivate the wireless power Tx mode in response to the designated signal. For example, if the wired charging device 703 is connected after deactivating the wireless power Tx mode, the electronic device 701 may charge the battery 510 using external electric power. As another example, if the connected wired charging device 703 supports fast charging (e.g., AFC, QC, or PD) (based on 9V/15 W), the electronic device 701 may switch the charging electric power for the battery 510 from 7.5 W to 9V/15 W.

As in the above scenario, the smart phone 702, which is an external device 702, has a relatively large capacity of the battery 510 and may use a high charging power. For example, the smart phone 702 can be wirelessly charged only by a high electric power of about 7.5V/7.5 W. Accordingly, the electronic device 701 may determine whether or not to transmit wireless power, based on whether or not the connected wired charging device 703 supports fast charging (e.g., AFC, QC, or PD) (based on 9V/15 W).

According to various embodiments, if the remaining capacity of the battery 510 is equal to or less than a designated value, the electronic device 701 may deactivate the Tx mode. For example, if the remaining capacity of the battery 510 is less than or equal to a designated value (for example, the SOC is less than 30%), the electronic device 701 may automatically deactivate the wireless power Tx mode, or may deactivate a UI icon for activating the wireless power Tx mode. In this case, even if the user touches the UI icon, the wireless power Tx mode may not be activated, and the electronic device 701 may output, to the user, a notification indicating that the wireless power Tx mode cannot be activated due to a low battery 510.

According to various embodiments, the electronic device 701 may activate the wireless power Tx mode in the case where the wired charging device 703 is connected thereto even if the remaining capacity of the battery 510 is equal to or less than a designated value.

According to various embodiments, the operations performed by the electronic device 101, which will be described below, may be executed by at least one processor (e.g., at least one processor including a processing circuit) (e.g., the processor 120 in FIG. 1) (hereinafter, referred to as a "processor" 120) of the electronic device 101. According to an embodiment, the operations performed by the electronic device 101 may be executed by instructions that are stored in a memory (e.g., the memory 130 in FIG. 1) (hereinafter, referred to as a "memory" 130) and, when executed, cause the processor 120 to operate.

Figure 8:
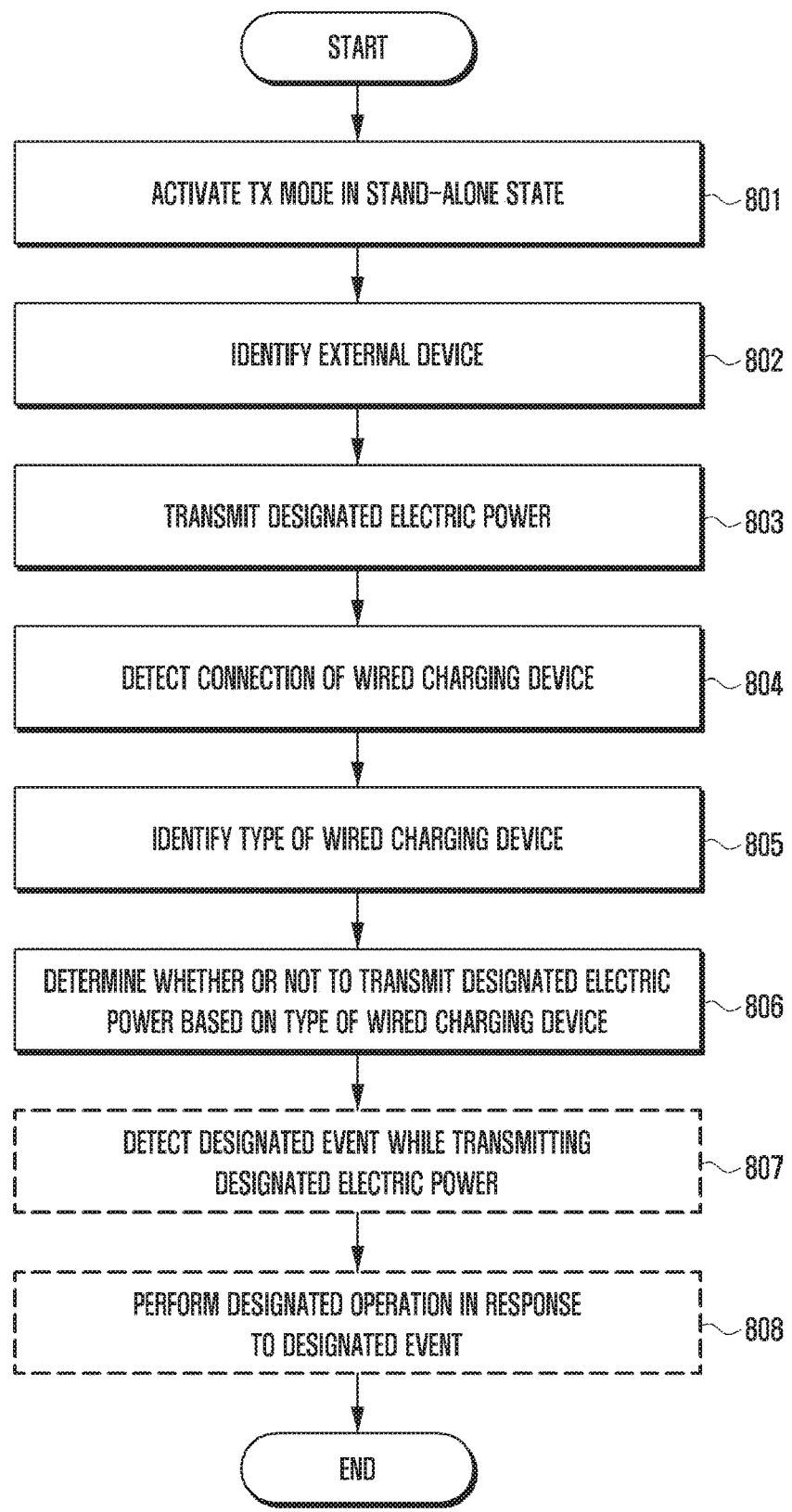
FIG. 8 is a flowchart illustrating the operation of an electronic device according to an embodiment of the disclosure.

FIG. 8 is a flowchart illustrating the operation of an electronic device according to an embodiment of the disclosure.

Figure 10:
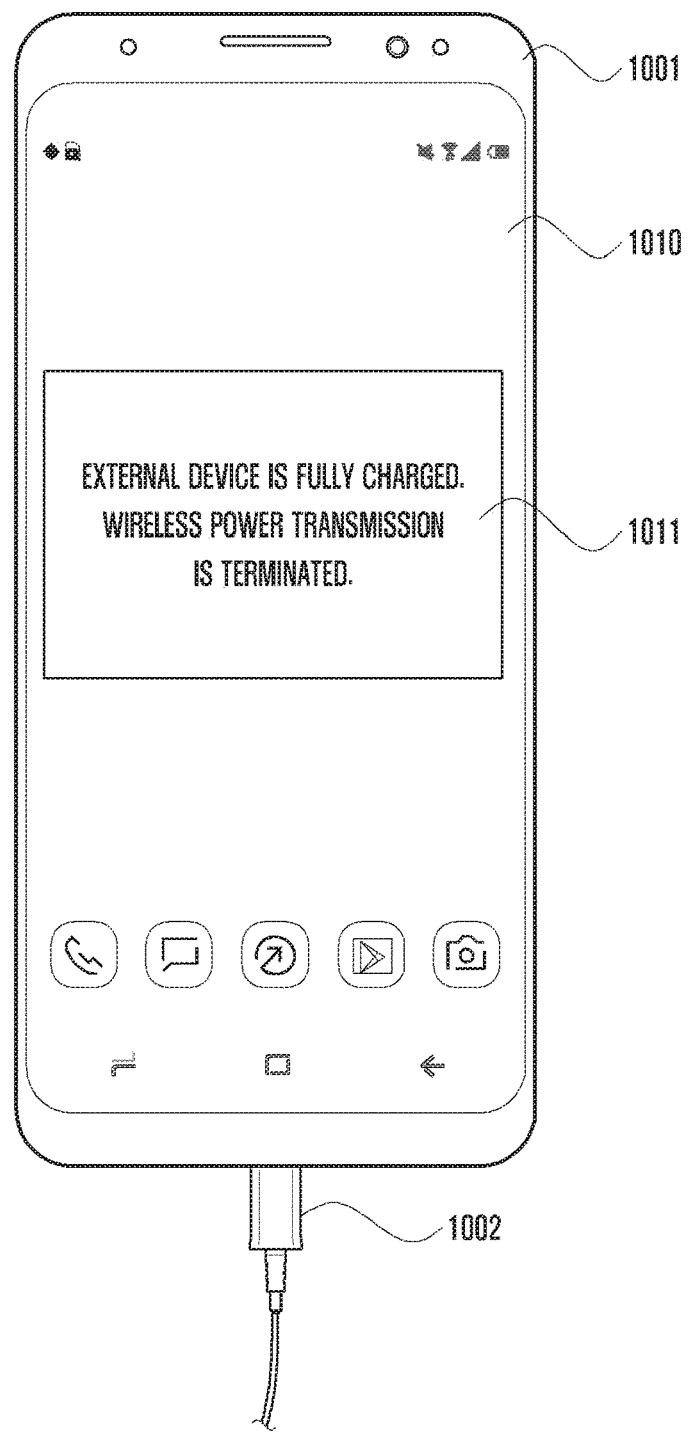
FIG. 10 illustrates an example of a user interface for notifying of deactivation of a wireless power Tx mode, based on full charging of an external device according to an embodiment of the disclosure.

FIG. 9 illustrates an example of a user interface indicating that the battery is preferentially charged according to an embodiment of the disclosure. FIG. 10 illustrates an example of a user interface indicating deactivation of a wireless power Tx mode, based on full charging of an external device according to an embodiment of the disclosure.

In operation 801, an electronic device (e.g., the electronic device 501 in FIG. 5) according to an embodiment may activate a wireless power Tx mode, based on a user input, in a stand-alone state. For example, the user input may include a user's touch input through a display or manipulation of physical buttons provided on the outer side of a housing (e.g., the housing 405 in FIG. 4). For example, the stand-alone state may denote the state in which the electronic device 501 is not connected to a wired charging device (e.g., the first external device 502 in FIG. 5) (hereinafter, referred to as "wired charging device 502").

In operation 802, if the wireless power Tx mode is activated, the electronic device 501 according to an embodiment may identify an external device (e.g., the second external device 503 in FIG. 5) according to designated standards (e.g., the WPC standards). For example, the electronic device 501 may perform in-band communication with the external device 503, and may exchange information used for wireless power transmission with the external device 503. According to an embodiment, the electronic device 501 may determine a designated electric power to be transmitted to the external device 503 from the electronic device 501 by performing an identification and configuration step according to the WPC standards or a separate non-standard communication method. For example, the electronic device 501 may perform the identification and configuration step in the WPC standards or non-standard communication method, thereby identifying that the external device 503 is a wearable device, and may determine a second designated electric power (e.g., 5V/3.75 W) corresponding to the wearable device. As another example, the electronic device 501 may perform the identification and configuration step in the WPC standards, thereby identifying that the external device 503 is a smart phone, and may determine a first designated electric power (e.g., 7.5 V/7.5 W) corresponding to the smart phone.

In operation 803, the electronic device 501 according to an embodiment may transmit a designated electric power used for the external device 503 using electric power of a battery (e.g., the battery 510 in FIG. 5). For example, if the external device 503 is a device that can be wirelessly charged by a relatively low electric power, such as a wearable device, the electronic device 501 may transmit a second designated electric power (e.g., 5V/3.75 W) corresponding to the wearable device. As another example, if the external device 503 is a device that can be wirelessly charged by a relatively high power, such as a smart phone, the electronic device 501 may transmit a first designated electric power (e.g., 7.5 V/7.5 W) corresponding to the smart phone.

In operations 804 and 805, the electronic device 501 according to an embodiment may detect a connection of the wired charging device 502, and if the connection of the wired charging device 502 is detected, the electronic device 501 may identify the type of the wired charging device 502. For example, the electronic device 501 may identify whether or not the connected wired charging device 502 supports fast charging (e.g., AFC, QC, or PD) (based on 9V/15 W). As another example, the electronic device 501 may identify whether or not the connected wired charging device 502 is a 5V standard travel adapter (TA) or USB (SDP) device, which does not support fast charging.

In operation 806, if the external device 503 is a device that is wirelessly charged with a relatively high power, such as a smart phone, the electronic device 501 may determine whether or not to transmit wireless power, based on whether or not the connected wired charging device 502 supports fast charging (e.g., AFC, QC, or PD) (based on 9V/15 W). For example, if the connected wired charging device 502 supports fast charging (e.g., AFC, QC, or PD) (based on 9V/15 W), the electronic device 501 may maintain wireless power transmission. In this case, the electronic device 501 may preferentially generate a first designated electric power (e.g., 7.5V/7.5 W) using the external electric power, thereby transmitting the generated first designated electric power (e.g., 7.5V/7.5 W) to the smart phone, which is the external device 503, and may provide the remaining electric power of 7.5 W to the battery 510.

As another example, if the connected wired charging device 703 is a 5V standard travel adapter (TA) or USB, which does not support fast charging, the electronic device 501 may determine whether or not to transmit wireless power, or may adjust transmission period thereof, based on the remaining capacity of the battery 510, thereby transmitting wireless power.

According to an embodiment, as the operation of determining whether or not to transmit wireless power or adjusting transmission period thereof, the electronic device 501 may alternately perform an operation of charging the battery 510 and an operation of transmitting the wireless power. For example, the electronic device 501 may alternately perform an operation of charging the battery 510 during a first designated time and an operation of transmitting the first designated electric power, based on the external electric power supplied from the wired charging device 703, during a second designated time. According to an embodiment, the first designated time and the second designated time may be the same.

According to another embodiment, the electronic device 501 may adjust the first designated time and the second designated time, based on the remaining capacity of the battery 510. For example, if the remaining capacity of the battery 510 is high (e.g., 70% or more), the electronic device 501 may configure the second designated time to be longer than the first designated time. Accordingly, the operation of transmitting the first designated electric power may take more time. As another example, if the remaining capacity of the battery 510 is low (e.g., less than 50%), the electronic device 501 may configure the first designated time to be longer than the second designated time. Accordingly, the operation of charging the battery 510 may take more time.

According to another embodiment, if the wired charging device 703 is a 5V standard travel adapter (TA) or USB, which does not support fast charging, the electronic device 501 may identify the initial remaining battery capacity (e.g., 48%) at the time at which the wired charging device 703 is initially connected, and may adjust the first designated time and the second designated time such that the initial remaining battery capacity (e.g., 48%) is not lowered while alternately performing the operation of charging the battery 510 and the operation of transmitting wireless power. That is, if it is determined that the remaining battery capacity will become lower than the initial remaining battery capacity (e.g., 48%) due to the transmission of wireless power, the electronic device 501 may reduce the currently configured second designated time, and may increase the currently configured first designated time. Accordingly, the electronic device 501 may maintain the minimum value of remaining capacity of the battery 510 to be the initial remaining battery capacity (e.g., 48%), or may increase the same even if the first designated electric power is transmitted.

According to various embodiments, if the connected wired charging device 703 does not support fast charging, the electronic device 501 may identify the remaining capacity of the battery 510, and may compare the remaining capacity of the battery 510 with a designated value. For example, the designated value may be configured based on user input. For example, the designated value may be 50%, and the electronic device 501 may determine whether or not the remaining capacity of the battery 510 exceeds 50%. If the remaining capacity of the battery 510 is greater than or equal to a designated value (e.g., 50%), the electronic device

501 may maintain the transmission of the first designated electric power. On the other hand, if the remaining capacity of the battery 510 is less than a designated value (e.g., 50%), the electronic device 501 may stop transmitting the first designated electric power, and may charge the battery 510 using the external electric power supplied from the wired charging device. According to an embodiment, in the case where the electronic device 501 stops transmitting the first designated electric power and charges the battery 510 using the external electric power supplied from the wired charging device, the electronic device 501 may display a designated notification through a display (e.g., the display device 160 in FIG. 1). For example, as shown in FIG. 9, if the connected wired charging device 902 (e.g., the first external device 502 in FIG. 5) does not support fast charging, and if the remaining capacity of the battery 510 is less than a designated value (e.g., 50%), the electronic device 501 (e.g., the electronic device 101 in FIG. 1) may display a message 911 indicating that the electronic device 501 is preferentially charging the battery until the remaining battery capacity reaches a designated value. According to various embodiments, the message illustrated in FIG. 9 is only an example, and may be variously changed based on the following scenarios.

According to an embodiment, if the battery 510 is charged such that the remaining capacity of the battery 510 reaches the designated value (e.g., 50%) or more, the electronic device 501 may transmit the first designated electric power through a wireless interface.

According to various embodiments, if the connected wired charging device 703 does not support fast charging, and if the remaining capacity of the battery 510 is less than a designated value (e.g., 50%), the electronic device 501 may adjust a period to transmit wireless power. For example, the electronic device 501 may alternately perform an operation of charging the battery 510 and an operation of transmitting wireless power. For example, if the wired charging device 703 does not support fast charging, and if the remaining capacity of the battery 510 is less than a designated value (e.g., 50%), the electronic device 501 may alternately perform the operation of charging the battery 510 during a first designated time and an operation of transmitting the first designated electric power, based on the external electric power supplied from the wired charging device 703, during a second designated time. According to an embodiment, the first designated time and the second designated time may be the same. According to various embodiments, the first designated time and the second designated time may be configured to be different from each other, based on user input.

According to various embodiments, the electronic device 501 may alternately perform the operation of charging the battery 510 and the operation of transmitting wireless power, thereby charging the battery 510 and a battery of the external electronic device 702.

In operation 806, if the external device 503 is a device that is wirelessly charged by a relatively low electric power, such as a wearable device, the electronic device 501 according to an embodiment may maintain the wireless power transmission, regardless of whether or not the connected wired charging device 502 supports fast charging. For example, if the external device 503 is a wearable device, and if the connected wired charging device 502 supports fast charging (e.g., AFC, QC, or PD) (based on 9V/15 W), the electronic device 501 may switch to a normal charging mode to preferentially generate a second designated electric power (e.g., 5V/3.75 W) using the external electric power, to transmit the generated second designated electric power to the wearable device, and to supply the remaining electric power of 5V/6.25 W to the battery 510. For example, if the connected wired charging device 603 supports fast charging, the electronic device 601 may charge the battery with fast charging power (e.g., 9V/15 W), and if the Tx mode is activated, the electronic device 601 may switch the charging power for the battery from the fast charging power (e.g., 9V/15 W) to normal charging power (e.g., 5V/10 W), may transmit part (e.g., 5V/3.75 W) of the switched normal charging power (e.g., 5V/10 W), as wireless power, to the wearable device 602, and may charge the battery using the remaining electric power (e.g., 5V/6.25 W).

According to an embodiment, if the connected wired charging device 603 is a device that does not support fast charging, such as a 5V standard travel adapter (TA) (e.g., 10 W power) or a USB device {e.g., a standard downstream port (SDP) (e.g., 5 W power) or a charging downstream port (CDP) (e.g., 7.5 W power)}, the electronic device 601 may transmit a second designated electric power (e.g., 5V/3.75 W) to the wearable device 602, and may supply the system or charge the battery 510 with the remaining electric power.

In operations 807 and 808, the electronic device 501 according to an embodiment may detect the occurrence of a designated event while transmitting a designated electric power, based on the determination that wireless power is to be transmitted, and may perform a designated operation in response to the designated event. According to an embodiment, the designated event may include detachment of the wired charging device 502, deactivation of the wireless power Tx mode, full charging of the external device 503, or connection of the external device 503 to the wired charging device 502. According to various embodiments, the electronic device 501 may selectively perform operation 807 and operation 808.

According to an embodiment, if the wired charging device 502 is detached in the state in which the wired charging device 502 is connected to the electronic device 501 and in which the wireless power Tx mode is active, the electronic device 501 may maintain the operation of transmitting a designated electric power to the external device 503, and may stop the operation of charging the battery 510.

According to an embodiment, if the wireless power Tx mode is deactivated based on user input in the state in which the wired charging device 502 is connected to the electronic device 501 and in which the wireless power Tx mode is active, the electronic device 501 may stop the operation of transmitting a designated electric power to the external device 503. For example, if the wired charging device 502 is connected to the electronic device 501, the electronic device 501 may charge the battery 510 using external electric power. As another example, if the connected wired charging device 502 supports fast charging (e.g., AFC, QC, or PD) (based on 9V/15 W), the electronic device 501 may switch the charging electric power for the battery 510 from 5V/10 W to 9V/15 W.

According to an embodiment, if the external device 503 is fully charged in the state in which the wired charging device 502 is connected to the electronic device 501 and in which the wireless power Tx mode is active, the electronic device 501 may stop the operation of transmitting a designated electric power to the external device 503. For example, the electronic device 501 may receive a designated signal indicating that the external device 503 has been fully charged from the external device 503 receiving the wireless power, and may deactivate the wireless power Tx mode in response to the designated signal. For example, if the wired charging device 502 is connected to the electronic device 501, the electronic device 501 may charge the battery 510 using external electric power. As another example, if the connected wired charging device 502 supports fast charging (e.g., AFC, QC, or PD) (based on 9V/15 W), the electronic device 501 may switch the charging electric power for the battery 510 from 5V/10 W to 9V/15 W.

According to an embodiment, if the electronic device 501 detects that the external device 503 is connected to the wired charging device 502, the electronic device 501 may stop transmitting a designated electric power to the external device 503. For example, the electronic device 501 may receive a designated signal indicating that the wired charging device 502 is connected to the external device 503 from the external device 503 receiving the wireless power, and may deactivate the wireless power Tx mode in response to the designated signal. For example, if the wired charging device 502 is connected after deactivating the wireless power Tx mode, the electronic device 501 may charge the battery 510 using external electric power. As another example, if the connected wired charging device 502 supports fast charging (e.g., AFC, QC, or PD) (based on 9V/15 W), the electronic device 501 may switch the charging electric power for the battery 510 from 7.5 W to 9V/15 W. According to an embodiment, if the electronic device 501 detects that the external device 503 is connected to the wired charging device, the electronic device 501 may output a notification indicating that the external device 503 has been fully charged so that wireless power transmission ends.

Referring to FIG. 10, according to an embodiment, the notification may be a user interface related to wireless power transmission. For example, if the electronic device 1001 (e.g., the electronic device 101 in FIG. 1) detects that an external device (e.g., the second electronic device 302 in FIG. 3) is connected to a wired charging device (e.g., the external power source 304 in FIG. 3), the electronic device 1001 may control the display 1010 (e.g., the display device 160 in FIG. 1) so as to display a user interface related to wireless power transmission. According to an embodiment, the user interface may include a pop-up message 1011 "External device has been fully charged and wireless power transmission has ended." If the wireless power transmission ends, the electronic device 1001 may charge the battery 510 using external electric power from the wired charging device 1002.

Figure 11:
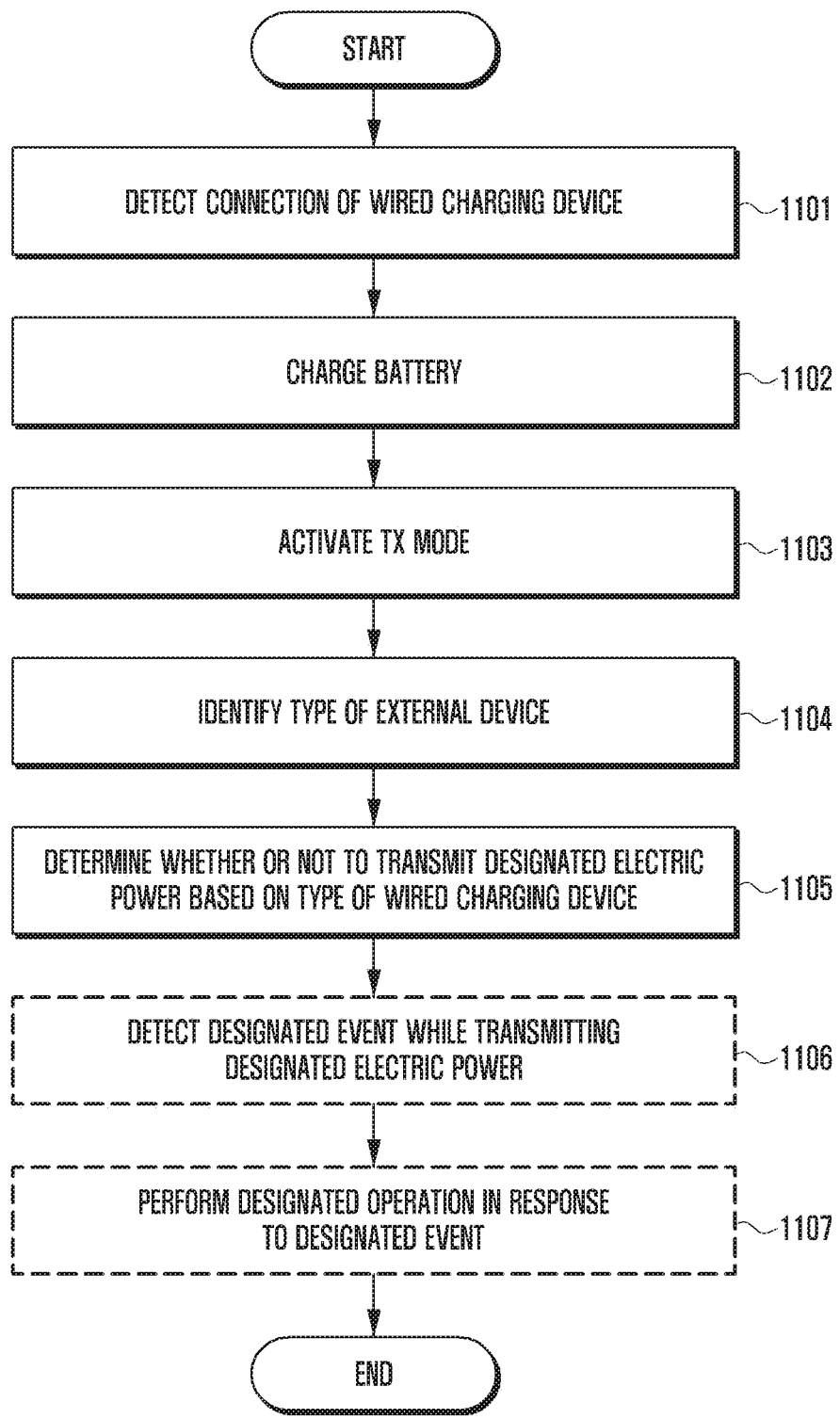
FIG. 11 is a flowchart illustrating the operation of an electronic device according to an embodiment of the disclosure.

FIG. 11 is a flowchart illustrating the operation of an electronic device 501 according to an embodiment of the disclosure.

Referring to FIG. 11, in operations 1101 and 1102, an electronic device (e.g., the electronic device 501 in FIG. 5) according to an embodiment may detect a connection of a wired charging device (e.g., the first external device 502 in FIG. 5), and may charge a battery (e.g., the battery 510 in FIG. 5) using external electric power from the wired charging device 502. The electronic device 501 may determine whether or not the connected wired charging device 502 supports fast charging (e.g., AFC, QC, or PD) (based on 9V/15 W). As another example, the electronic device 501 may identify whether the connected wired charging device 502 is a 5V standard travel adapter (TA) or USB (SDP), which does not support fast charging.

In operation 1103, the electronic device 501 according to an embodiment may activate a wireless power Tx mode, based on user input. For example, the user input may include a user's touch input through a display or manipulation of physical buttons provided on the outer side of the housing (e.g., the housing 405 in FIG. 4).

In operation 1104, if the wireless power Tx mode is activated, the electronic device 501 according to an embodiment may identify an external device (e.g., the second external device 503 in FIG. 5) according to designated standards (e.g., WPC standards). The electronic device 501 may perform in-band communication with the external device 503, and may exchange information used for wireless power transmission with the external device 503. According to an embodiment, the electronic device 501 may determine a designated electric power to be transmitted to the external device 503 from the electronic device 501 by performing an identification and configuration step according to the WPC standards or a non-standard method. For example, the electronic device 501 may perform the identification and configuration step in the WPC standards or non-standard communication method, thereby identifying that the external device 503 is a wearable device, and may determine a second designated electric power (e.g., 5V/3.75 W) corresponding to the wearable device. As another example, the electronic device 501 may perform the identification and configuration step in the WPC standards, thereby identifying that the external device 503 is a smart phone, and may determine a first designated electric power (e.g., 7.5V/7.5 W) corresponding to the smart phone.

In operation 1105, if the external device 503 is a device that is wirelessly charged with a relatively high electric power, such as a smart phone, the electronic device 501 according to an embodiment may determine whether or not to transmit wireless power, based on whether or not the connected wired charging device 502 supports fast charging (e.g., AFC, QC, or PD) (based on 9V/15 W). For example, if the connected wired charging device 502 supports fast charging (e.g., AFC, QC, or PD) (based on 9V/15 W), the electronic device 501 may transmit wireless power. In this case, the electronic device 501 may preferentially generate a first designated electric power (e.g., 7.5V/7.5 W) using the external electric power, thereby transmitting the generated first designated electric power (e.g., 7.5V/7.5 W) to the smart phone, which is the external device 503, and may supply the remaining electric power of 7.5 W to the battery 510.

As another example, if the connected wired charging device 703 is a 5V standard travel adapter (TA) or USB, which does not support fast charging, the electronic device 501 may determine whether or not to transmit wireless power, or may adjust transmission period thereof, based on the remaining capacity of the battery 510, thereby transmitting wireless power.

According to an embodiment, as the operation of determining whether or not to transmit wireless power or adjusting transmission period thereof, the electronic device 501 may alternately perform an operation of charging the battery 510 and an operation of transmitting the wireless power. For example, the electronic device 501 may alternately perform an operation of charging the battery 510 during a first designated time and an operation of transmitting the first designated electric power, based on the external electric power supplied from the wired charging device 703, during a second designated time. According to an embodiment, the first designated time and the second designated time may be the same.

According to another embodiment, the electronic device 501 may adjust the first designated time and the second designated time, based on the remaining capacity of the battery 510. For example, if the remaining capacity of the battery 510 is high (e.g., 70% or more), the electronic device 501 may configure the second designated time to be longer than the first designated time. Accordingly, the operation of transmitting the first designated electric power may take more time. As another example, if the remaining capacity of the battery 510 is low (e.g., less than 50%), the electronic device 501 may configure the first designated time to be longer than the second designated time. Accordingly, the operation of charging the battery 510 may take more time.

According to another embodiment, if the wired charging device 703 is a 5V standard travel adapter (TA) or USB, which does not support fast charging, the electronic device 501 may identify the initial remaining battery capacity (e.g., 48%) at the time at which the wired charging device 703 is initially connected, and may adjust the first designated time and the second designated time such that the initial remaining battery capacity (e.g., 48%) is not lowered while alternately performing the operation of charging the battery 510 and the operation of transmitting wireless power. That is, if it is determined that the remaining battery capacity will become lower than the initial remaining battery capacity (e.g., 48%) due to the transmission of wireless power, the electronic device 501 may reduce the currently configured second designated time, and may increase the currently configured first designated time. Accordingly, the electronic device 501 may maintain the minimum value of remaining capacity of the battery 510 to be the initial remaining battery capacity (e.g., 48%), or may increase the same even if the first designated electric power is transmitted.

According to various embodiments, if the connected wired charging device 703 does not support fast charging, the electronic device 501 may identify the remaining capacity of the battery 510, and may compare the remaining capacity of the battery 510 with a designated value. For example, the designated value may be configured based on user input. For example, the designated value may be 50%, and the electronic device 501 may determine whether or not the remaining capacity of the battery 510 exceeds 50%. If the remaining capacity of the battery 510 is greater than or equal to a designated value (e.g., 50%), the electronic device 501 may transmit the first designated electric power. On the other hand, if the remaining capacity of the battery 510 is less than a designated value (e.g., 50%), the electronic device 501 may charge the battery 510 using the external electric power supplied from the wired charging device, instead of transmitting wireless power. According to an embodiment, in the case where the electronic device 501 charges the battery 510 using the external electric power supplied from the wired charging device without transmitting wireless power, the electronic device 501 may display a designated notification through a display (e.g., the display device 160 in FIG. 1). For example, the electronic device 501 may display a message 911 indicating that the electronic device 501 is preferentially charging the battery until the remaining battery capacity reaches a designated value, as shown in FIG. 9. According to various embodiments, the message illustrated in FIG. 9 is only an example, and may be variously changed based on the following scenarios.

According to an embodiment, if the battery 510 is charged such that the remaining capacity of the battery 510 reaches the designated value (e.g., 50%) or more, the electronic device 701 may transmit the first designated electric power through a wireless interface.

According to various embodiments, if the connected wired charging device 703 does not support fast charging, and if the remaining capacity of the battery 510 is less than a designated value (e.g., 50%), the electronic device 501 may adjust a period to transmit wireless power. For example, the electronic device 501 may alternately perform an operation of charging the battery 510 and an operation of transmitting wireless power. For example, if the wired charging device 703 does not support fast charging, and if the remaining capacity of the battery 510 is less than a designated value (e.g., 50%), the electronic device 501 may alternately perform the operation of charging the battery 510 during a first designated time and an operation of transmitting the first designated electric power, based on the external electric power supplied from the wired charging device 703, during a second designated time. According to an embodiment, the first designated time and the second designated time may be the same. According to various embodiments, the first designated time and the second designated time may be configured to be different from each other, based on user input.

According to various embodiments, the electronic device 501 may alternately perform the operation of charging the battery 510 and the operation of transmitting wireless power, thereby charging the battery 510 and a battery of an external electronic device (e.g., the external electronic device 702 in FIG. 7A or 7B).

In operation 1105, if the external device 503 is a device that is wirelessly charged with a relatively low electric power, such as a wearable device, the electronic device 501 according to an embodiment may transmit wireless power, regardless of whether or not the connected wired charging device 502 supports fast charging. For example, if the external device 503 is a wearable device, and if the connected wired charging device 502 supports fast charging (e.g., AFC, QC, or PD) (based on 9V/15 W), the electronic device 501 may switch to a normal charging mode to preferentially generate a second designated electric power (e.g., 5V/3.75 W) using the external electric power, to transmit the generated second designated electric power to the wearable device, and to supply the remaining electric power of 5V/6.25 W to the battery 510. For example, if the connected wired charging device 603 supports fast charging, the electronic device 601 may charge the battery with fast charging power (e.g., 9V/15 W), and if the Tx mode is activated, the electronic device 601 may switch the charging power for the battery from the fast charging power (e.g., 9V/15 W) to normal charging power (e.g., 5V/10 W), may transmit part (e.g., 5V/3.75 W) of the switched normal charging power (e.g., 5V/10 W), as wireless power, to the wearable device 602, and may charge the battery using the remaining electric power (e.g., 5V/6.25 W).

According to an embodiment, if the connected wired charging device 603 is a device that does not support fast charging, such as a travel adapter (TA) with a 5V standard (e.g., 10 W power) or a USB device {e.g., a standard downstream port (SDP) (e.g., 5 W power) or a charging downstream port (CDP) (e.g., 7.5 W power)}, the electronic device 601 may transmit a second designated electric power (e.g., 5V/3.75 W) to the wearable device 602, and may supply the system or charge the battery 510 with the remaining electric power.

In operations 1106 and 1107, the electronic device 501 according to an embodiment may detect the occurrence of a designated event while transmitting a designated electric power, based on the determination that wireless power is to be transmitted, and may perform a designated operation in response to the designated event. According to an embodiment, the designated event may include detachment of the wired charging device 502, deactivation of the wireless power Tx mode, full charging of the external device 503, or connection of the external device 503 to the wired charging device 502. Referring to FIG. 8, according to various embodiments, operations 1106 and 1107 may be the same as or similar to operations 807 and 808. Thus, a description of operations 1106 and 1107 in this document refers to the description of operations 807 and 808 in FIG. 8. According to various embodiments, the electronic device 501 may selectively perform operation 1106 and operation 1107.

Figure 12:
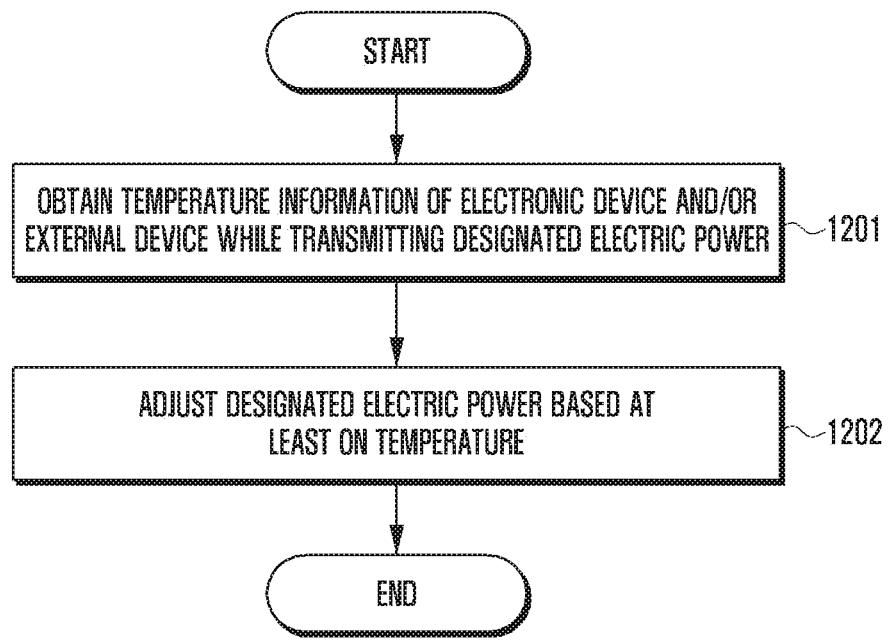
FIG. 12 is a flowchart illustrating an operation of adjusting charging power by an electronic device, based on temperature information, according to an embodiment of the disclosure.

FIG. 12 is a flowchart illustrating the operation of adjusting charging power by an electronic device, based on temperature information, according to an embodiment of the disclosure.

Referring to FIG. 12, in operation 1201, an electronic device (e.g., the electronic device 501 in FIG. 5) according to an embodiment may obtain temperature information of an electronic device 501 and/or an external device (e.g., the second electronic device 503 in FIG. 5) while the wireless power Tx mode is active and a designated electric power is transmitted. For example, the electronic device 501 may include a temperature sensor (e.g., a thermistor) (e.g., the sensor module 176 in FIG. 1), and the temperature information of the electronic device 501 may be obtained using the temperature sensor. According to another embodiment, the external device 503 may also include a temperature sensor that is the same as or similar to the temperature sensor of the electronic device 501, and the electronic device 501 may obtain temperature information from the external device 503. For example, the electronic device 501 may obtain temperature information of the external device 503 from the external device 503 using in-band communication or out-band communication.

In operation 1202, the electronic device 501 according to an embodiment may adjust a designated electric power wirelessly transmitted, based at least on the temperature information.

According to an embodiment, the electronic device 501 may maintain activation of the wireless power Tx mode even if heat is emitted during the transmission of the wireless power. For example, while the electronic device 501 is connected to the wired charging device 502 and transmits wireless power, the electronic device 501 may maintain activation of the wireless power Tx mode even if the temperature of the electronic device 501 increases.

According to another embodiment, the electronic device 501 may differentially adjust the wireless power according to the temperature levels of the electronic device 501. For example, the electronic device 501 may adjust the wireless power to a relatively low value if the temperature of the electronic device 501 and/or the external device 503 is relatively high, and the electronic device 501 may adjust the wireless power to a relatively high value if the temperature of the electronic device 501 and/or the external device 503 is relatively low.

According to another embodiment, if a first temperature of the electronic device 501 and a second temperature of the external device 503 are equal to or greater than a designated value, the electronic device 501 may deactivate the wireless power Tx mode, or may adjust the wireless power value. According to an embodiment, the electronic device 501 may determine whether or not to adjust the wireless power value or whether or not to activate the wireless power Tx mode in consideration of only one of the first temperature of the electronic device 501 and the second temperature of the external device 503.

According to another embodiment, the electronic device 501 may configure a first designated temperature intended to stop wired charging, and may stop charging if the temperature of the electronic device 501 exceeds the first designated temperature. In addition, the electronic device 501 may configure a second designated temperature intended to stop wireless charging (or to deactivate the wireless power Tx mode), and may stop charging if the temperature of the electronic device 501 exceeds the second designated temperature. According to an embodiment, the second designated temperature for stopping the wireless charging (or deactivating the wireless power Tx mode) may be configured to be higher than the first designated temperature for stopping wired charging.

Figure 13:
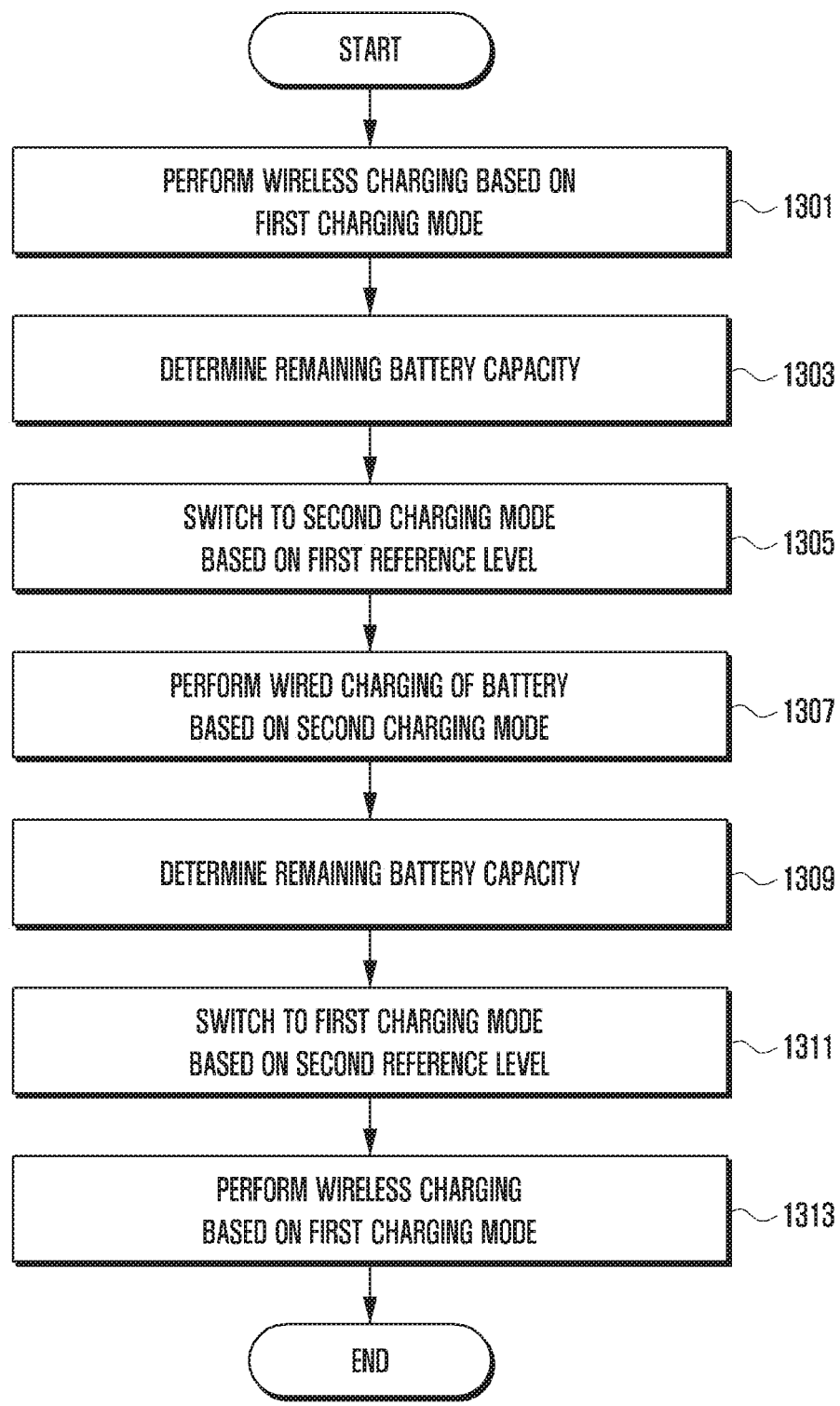
FIG. 13 is a flowchart illustrating a method of operating an electronic device according to an embodiment of the disclosure.

FIG. 13 is a flowchart illustrating a method of operating an electronic device 101 according to an embodiment of the disclosure.

Referring to FIG. 13, in operation 1301, the processor 120 of the electronic device 101 may perform wireless charging (or wireless power transmission), based on a first charging mode. According to an embodiment, the processor 120, as shown in FIG. 6B or 7B, may supply (or transmit or share) a designated electric power to (or with) an external device (e.g., the wearable device 602 or another electronic device 702) (hereinafter, referred to as a "second external device") using a coil (e.g., the coil 319 in FIG. 3 or the coil 525-1 in FIG. 5) while a wired charging device 603 or 703 {or an external power source (e.g., TA)} (hereinafter, referred to as a "first external device") is in connection (hereinafter, referred to as "wireless power transmission" or "wireless charging"). For example, the processor 120 may activate a wireless power Tx mode (e.g., Tx mode), based on user input, and if the wireless power Tx mode is activated, may wirelessly supply electric power to the second external device using electric power of a battery (e.g., the battery 510 in FIG. 5). According to an embodiment, as shown in FIG. 6B or 7B, the first charging mode may include a mode for providing wireless charging (e.g., a wireless power transmission function) by supplying wireless power to a second external device (e.g., the wearable device 602 or another electronic device 702) using electric power of the battery 510 while the first external device 603 or 703 is connected to the electronic device 101. According to an embodiment, if the wireless power Tx mode is activated while the first external device is connected, or if the first external device is connected while the wireless power Tx mode is active in a stand-alone state, the processor 120 may provide wireless charging, based on the first charging mode. For example, the processor 120 may block a wired charging path leading to the second external device in a charging circuit (e.g., the PMIC 320 in FIG. 3 or the charging circuit 530 in FIG. 5) of the electronic device 101 in order to avoid bypassing of the input voltage (Vin) of the first external device to the second external device. For example, the processor 120 may control a switch of the wired charging path (e.g., the first switch 532 in FIG. 5) so as to be turned off, thereby cutting off the voltage supply to the second external device and the battery 510, in order to prevent the electric power of the first external device from being supplied to the second external device, based on the first charging mode. According to an embodiment, the processor 120 may boost (or configure) a voltage of the battery 510 (e.g., about 5V) to (or as) a voltage (e.g., about 7.5V) optimized for use in wireless power sharing through a charging circuit, and may provide the same in order for the second external device to perform stable wireless charging.

In operation 1303, the processor 120 may determine a remaining battery capacity {or the state of charge (SOC) or the amount of charging} of the battery 510 of the electronic device 101 while providing the wireless charging. According to an embodiment, the processor 120 may identify the remaining battery capacity (SOC) in decimal units while providing wireless charging. According to an embodiment, the processor 120 may display the remaining battery capacity (e.g., SOC) through a designated UI in an area (e.g., an indicator area) of a display (e.g., the display device 160 in FIG. 1). According to an embodiment, the UI related to the remaining battery capacity, which is displayed through the display device 160, may be displayed based on the integer part thereof, excluding the decimal part from the remaining battery capacity.

In operation 1305, the processor 120 may switch to a second charging mode, based on the first reference level. According to an embodiment, the second charging mode, as shown in FIG. 6B or 7B, may include a mode in which the battery 510 of the electronic device 101 is charged using external electric power of the first external device 603 or 703 while stopping transmitting wireless power to the second external device in the state in which the first external device 603 or 703 is connected to the electronic device 101. According to an embodiment, if the remaining battery capacity reaches the first reference level while providing wireless power to the first external device, based on the first charging mode, in the state in which the wireless power Tx mode is activated during the connection of the first external device or in which the first external device is connected while the wireless power Tx mode is active in a stand-alone state, the processor 120 may switch from the first charging mode to the second charging mode for charging the battery 510 using the external electric power of the first external device. According to an embodiment, the processor 120 may control a switch of the wired charging path (e.g., the first switch 532 in FIG. 5) so as to be turned on in a charging circuit (e.g., the PMIC 320 in FIG. 3 or the charging circuit 530 in FIG. 5) of the electronic device 101, based on the second charging mode, thereby providing the electric power from the first external device to the battery 510. According to an embodiment, the processor 120 may maintain the wireless charging connection (e.g., a ping connection state) with the second external device when switching to the second charging mode. For example, the processor 120 may release the blocking of the wired charging path, thereby providing wired charging, and may maintain the wireless connection with the second external device by minimizing the electric power provided to the second external device, instead of completely stopping the wireless charging with respect to the second external device. For example, the processor 120 may maintain the wireless connection with the second external device by continuously providing a designated electric power (e.g., the minimum electric power for maintaining the connection) to the second external device. According to an embodiment, the first reference level may include, for example, a first specific value (e.g., "1") below a decimal point (e.g., a decimal part) of the remaining battery capacity for switching from the first charging mode to the second charging mode. For example, the first reference level may include a reference value for initiating a wired charging operation for the battery 510 in the wireless charging operation for the second external device. According to an embodiment, if the remaining battery capacity is identified in percentiles, the processor 120 may determine to start a wired charging operation if a decimal part of the remaining battery capacity becomes every M.1% (M is a natural number of 99 or less).

In operation 1307, the processor 120 may perform wired charging, based on the second charging mode. According to an embodiment, as shown in FIG. 6B or 7B, the processor 120 may supply a designated electric power to the battery 510 while the first external device is connected (hereinafter, referred to as "wired charging"). For example, the processor 120 may perform control such that the battery 510 is charged using the external electric power of the first external device while activating a wireless power Tx mode (e.g., Tx mode). According to an embodiment, the processor 120 may minimize the external electric power provided to the second external device during the wired charging, thereby maintaining the wireless connection between the electronic device 101 and the second external device. For example, the processor 120 may maintain the wireless charging connection with the second external device even while the wired charging of the battery 510 is performed, thereby eliminating the inconvenience of a reconnection operation for wireless charging in repeating the wired charging/wireless charging.

In operation 1309, the processor 120 may determine the remaining battery capacity of the battery 510 of the electronic device 101 while providing wired charging. According to an embodiment, the processor 120 may identify the remaining battery capacity (SOC) of the electronic device 101 in decimal units while providing wired charging.

In operation 1311, the processor 120 may switch to the first charging mode, based on a second reference level. According to an embodiment, if the remaining battery capacity reaches a second reference level while providing wired charging to the battery 510, based on the second charging mode, in the state in which the first external device is connected, the processor 120 may switch from the second charging mode to the first charging mode for supplying wireless power to the second external device using the electric power of the battery 510. For example, the processor 120 may block a wired charging path leading to the second external device in a charging circuit (e.g., the PMIC 320 in FIG. 3 or the charging circuit 530 in FIG. 5) of the electronic device 101 in order to avoid bypassing of the input voltage of the first external device to the second external device. According to an embodiment, the second reference level may include, for example, a second specific value (e.g., "8") below a decimal point (e.g., a decimal part) of the remaining battery capacity for switching from the second charging mode to the first charging mode. For example, the second reference level may include a reference value for initiating the wireless charging operation for the second external device in the wired charging operation for the battery 510. According to an embodiment, if the remaining battery capacity is identified in percentiles, the processor 120 may determine to start a wireless charging operation (or a wireless power transmission operation) if a decimal part of the remaining battery capacity becomes every M.8% (M is a natural number of 99 or less). According to an embodiment, the second reference level may be configured such that the remaining battery capacity of the battery 510 by wired charging is "integer part increment {e.g., about 1*n % (n is a natural number of about 99 or less)}+decimal part increment {e.g., about 0.1*m % (m is a natural number of about 9 or less)".

In operation 1313, the processor 120 may perform wireless charging, based on the first charging mode. For example, the processor 120 may perform the operation corresponding to operation 1301, and may repeat operations subsequent to operation 1301.

According to an embodiment, the electronic device 101 may alternately perform wired charging for charging the battery 510 of the electronic device 101 and wireless charging for supplying wireless power to the second external device (e.g., the external device in FIG. 6B or 7B) (e.g., the wearable device 602 or the smart phone 702) in the state in which a first external device (e.g., the wired charging device 603 or 703 in FIG. 6B or 7B) (or a wired charging device) is connected to the electronic device 101, thereby eliminating instability and/or power loss of wireless charging of the second external device due to bypass of the external electric power of the first external device.

According to an embodiment, the electronic device 101, as shown in FIG. 13, may supply wireless power until the remaining battery capacity in the percentile provided to the user through a UI is not changed, based on the decimal part of the remaining battery capacity of the electronic device 101, when executing a wireless power sharing function based on the first charging mode, thereby charging the second external device. According to an embodiment, the electronic device 101 may display the remaining battery capacity (e.g., the remaining battery capacity) in an area of the display device 160 using a designated UI, and the UI related to the displayed remaining battery capacity may be expressed as an integer part thereof, excluding a decimal part from the remaining battery capacity.

According to an embodiment, as shown in FIG. 13, the electronic device 101 may stop the wireless charging operation and perform the wired charging operation when executing a function of charging the battery 510, based on the second charging mode, and the electronic device 101 may maintain the wireless connection with the second external device during the wired charging by minimizing the external electric power provided to the second external device, instead of completely stopping the wireless charging between the electronic device 101 and the second external device. According to an embodiment, the electronic device 101 may stop the wired charging for the battery 510 to then start the wireless charging for the second external device at the time, for example, at which the remaining battery capacity of the battery 510 reaches, for example, "integer part increment (e.g., 1*n %)+decimal part increment (e.g., 0.1*m %)" or more.

According to an embodiment, the electronic device 101 may repeat the operations shown in FIG. 13, thereby increasing the remaining battery capacity of the battery 510 through wired charging and also sharing wireless power with the second external device. According to an embodiment, the electronic device 101 may alternately perform the wired charging operation related to charging of the battery 510 and the wireless charging operation related to sharing of wireless power with the second external device, and the sequence (e.g., priority) of the wired charging operation and the wireless charging operation as shown in FIG. 13 may vary. According to an embodiment, the operations shown in FIG. 13, for example, switching between the wireless power transmission (wireless charging) operation based on the first charging mode and the wired charging operation based on the second charging mode may be performed repeatedly or periodically until designated conditions are satisfied, and if the designated conditions are satisfied, may be terminated. For example, if the remaining battery capacity of the battery 510 is lowered below a designated level, if the battery 510 is fully charged, or if the wireless power receiving device (e.g., the second external device) is fully charged, the electronic device 101 may terminate the switching operation.

Figure 14:
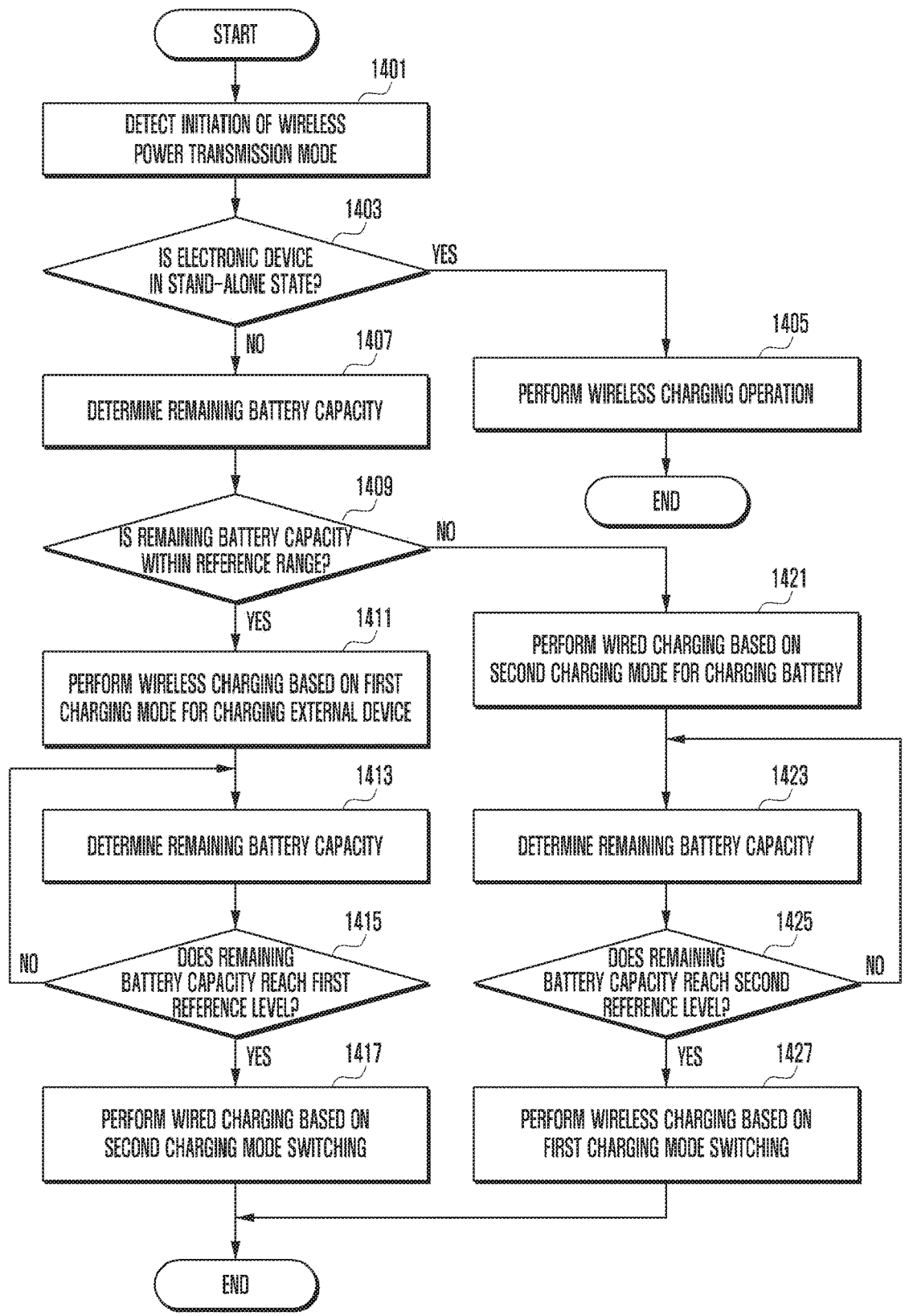
FIG. 14 is a flowchart illustrating a method of operating an electronic device according to an embodiment of the disclosure.

FIG. 14 is a flowchart illustrating a method of operating an electronic device 101 according to an embodiment of the disclosure.

Referring to FIG. 14, in operation 1401, the processor 120 of the electronic device 101 may detect initiation of a wireless power Tx mode (e.g., Tx mode). According to an embodiment, the initiation of the wireless power Tx mode may be activated, for example, based on user input. According to an embodiment, the user input may include a user's touch input through a display (e.g., the display device 160 in FIG. 1), manipulation of physical buttons provided on the outer side of a housing (e.g., the housing 405 in FIG. 4), or an approach of an external device (e.g., the wearable device 602 in FIG. 6B or another electronic device 702 in FIG. 7B) to the electronic device 101. For example, the user may select an object (e.g., an icon in an inactive state) for activating the wireless power Tx mode, which is disposed at a designated location in a settings menu or a home screen, and the processor 120, based on the selection of the object, may determine the initiation of the wireless power Tx mode. According to an embodiment, the processor 120 may switch the object in the inactive state to an active state, and may display the same, based on the selection of the object.

In operation 1403, the processor 120 may determine whether or not the electronic device 101 is in a stand-alone state. According to an embodiment, the stand-alone state may denote the state in which the electronic device 101 is not connected to the wired charging device. For example, the processor 120 may determine whether or not the wired charging device is connected to the electronic device 101, based on the initiation of the wireless power Tx mode.

If it is determined that the electronic device 101 is in the stand-alone state in operation 1403 (e.g., "YES" in operation 1403), the processor 120 may perform a wireless charging operation in operation 1405. According to an embodiment, if the wireless power Tx mode is activated in the stand-alone state, the processor 120 may generate a designated electric power using the electric power of the battery 510, and may transmit the designated electric power to an external device through a coil (e.g., the coil 525-1 in FIG. 5) (e.g., wireless power transmission). According to an embodiment, for example, if the remaining battery capacity of the battery 510 is lowered below a designated level, or if the wireless power receiving device (e.g., the second external device) is fully charged during the wireless charging operation, the processor 120 may stop the wireless charging operation.

If it is determined that the electronic device 101 is not in the stand-alone state operation 1403 (e.g., "NO" in operation 1403), for example, if the wired charging device is in the connected state with the electronic device 101, the processor 120 may determine a remaining battery capacity (e.g., SOC) of the battery 510 in operation 1407. According to an embodiment, the processor 120 may identify the remaining battery capacity in decimal units. According to an embodiment, the processor 120 may display the remaining battery capacity (e.g., remaining battery capacity) through a designated UI in an area (e.g., an indicator area) of the display device 160. According to an embodiment, the UI related to the remaining battery capacity, which is displayed through the display 160, may be expressed as an integer part of the remaining battery capacity, excluding a decimal part therefrom. According to an embodiment, the remaining battery capacity may be displayed as a positive integer (or a natural number) in percentiles.

In operation 1409, the processor 120 may determine whether or not the remaining battery capacity is within a designated reference range, based on the determined remaining battery capacity. According to an embodiment, the reference range may include, for example, a range value for determining an initiation mode of the wireless power Tx mode. For example, the processor 120 may determine whether or not to start the reference range-based wireless power Tx mode, based on the first charging mode or the second charging mode. According to an embodiment, the reference range may include, for example, at least a specific value within a range greater than a first reference level (e.g., a reference value for initiating a wired charging operation) and less than or equal to a second reference level (e.g., a reference value for initiating a wireless charging operation). According to an embodiment, the first reference level may include a first specific value (e.g., "1") {e.g., M.1% (M is a natural number of 99 or less)} below a decimal point (e.g., a decimal part) of the remaining battery capacity for switching from the first charging mode to the second charging mode. According to an embodiment, the second reference level may include a second specific value (e.g., "8") {e.g., M.8% (M is a natural number of 99 or less)} below a decimal point (e.g., a decimal part) of the remaining battery capacity for switching from the second charging mode to the first charging mode. According to an embodiment, the second reference level may be configured such that the remaining battery capacity of the battery 510 by wired charging is "integer part increment (e.g., about 1*n %)+decimal part increment (e.g., about 0.1*m %)". According to an embodiment, the reference range may include a range of "2 to 8" greater than the first reference level and less than or equal to the second reference level, and if the remaining battery capacity (e.g., the value of the decimal part) is included in any one of "2 to 8", the processor 120 may determine that the remaining battery capacity is within the reference range.

If the remaining battery capacity is within the reference range in operation 1409 (e.g., "YES" in operation 1409), the processor 120 may perform wireless charging, based on the first charging mode for charging the external device in operation 1411. According to an embodiment, if the remaining battery capacity is within the reference range, the processor 120 may provide wireless charging, based on the first charging mode, at the time at which the wireless power Tx mode is initiated.

In operation 1413, the processor 120 may determine a remaining battery capacity of the battery 510 while providing wireless charging. According to an embodiment, the processor 120 may identify the remaining battery capacity (SOC) in decimal units while providing wireless charging.

In operation 1415, the processor 120 may determine whether or not the remaining battery capacity reaches a first reference level, based on the determined remaining battery capacity. For example, the processor 120 may monitor whether or not a specific value below the decimal point of the remaining battery capacity reaches "1" of the first reference level.

If the remaining battery capacity does not reach the first reference level in operation 1415 (e.g., "NO" in operation 1415), the processor 120 may proceed to operation 1413, thereby performing operation 1413 and operations subsequent thereto.

If the remaining battery capacity reaches the first reference level in operation 1415 (e.g., "YES" in operation 1415), the processor 120 may perform wired charging, based on switching to the second charging mode in operation 1417. According to an embodiment, the processor 120 may stop transmitting wireless power to an external device, and may charge the battery 510 of the electronic device 101 using the external electric power of a wired charging device in the state in which the wired charging device is connected to the electronic device 101. According to an embodiment, if the remaining battery capacity reaches the first reference level while providing wireless charging to the external device, based on the first charging mode, the processor 120 may switch from the first charging mode to the second charging mode for charging the battery 510 using the external electric power of the wired charging device. According to an embodiment, the processor 120 may maintain the wireless charging connection (e.g., a ping connection) with an external device when switching to the second charging mode. According to an embodiment, for example, if the battery 510 of the electronic device 101 is fully charged while performing the wired charging operation, the processor 120 may stop the wired charging operation.

If the remaining battery capacity is not within the reference range in operation 1409 (e.g., "NO" in operation 1409), the processor 120 may perform wired charging, based on the second charging mode for charging the battery 510 in operation 1421. According to an embodiment, if the remaining battery capacity is not within the reference range, the processor 120 may provide wired charging, based on the second charging mode, at the time at which the wireless power Tx mode is initiated.

In operation 1423, the processor 120 may determine a remaining battery capacity of the battery 510 while providing wired charging. According to an embodiment, the processor 120 may identify the remaining battery capacity (SOC) in decimal units while providing wired charging.

In operation 1425, the processor 120 may determine whether or not the remaining battery capacity reaches a second reference level, based on the determined remaining battery capacity. For example, the processor 120 may monitor whether or not a specific value below the decimal point of the remaining battery capacity reaches "8" of the second reference level.

If the remaining battery capacity does not reach the second reference level in operation 1425 (e.g., "NO" in operation 1425), the processor 120 may proceed to operation 1423, thereby performing operation 1423 and operations subsequent thereto.

If the remaining battery capacity reaches the second reference level in operation 1425 (e.g., "YES" in operation 1425), the processor 120 may perform wireless charging, based on switching to the first charging mode, in operation 1427. According to an embodiment, the processor 120 may stop charging the battery 510, and may supply a designated wireless power to an external device using the external electric power of the wired charging device in the state in which the wired charging device is connected to the electronic device 101. According to an embodiment, if the remaining battery capacity reaches the second reference level while providing wired charging, based on the second charging mode, the processor 120 may switch from the second charging mode to the first charging mode for supplying wireless power to an external device using the external electric power of the wired charging device. According to an embodiment, since the wireless charging connection (e.g., a ping connection) with the external device is maintained when switching to the first charging mode, the processor 120 may immediately perform wireless charging without a separate operation for connection with the external device. According to an embodiment, for example, if the remaining battery capacity of the electronic device 101 is lowered below a designated level, or if the wireless power receiving device (e.g., the external device) is fully charged during the wireless charging operation, the processor 120 may terminate the wireless charging operation.

According to an embodiment, the processor 120 may perform a different charging operation, based at least on a condition in which the battery 510 of the electronic device 101 and/or the wireless power receiving device (e.g., an external device) is fully charged. For example, if at least one element (e.g., the battery 510 or the wireless power receiving device) is fully charged, the processor 120 may stop the switching operation. According to an embodiment, the processor 120 may switch the charging operation between the first charging mode and the second charging mode until at least one element is fully charged, and to this end, the processor 120 may check the remaining battery capacity repeatedly or periodically. According to an embodiment, the operations shown in FIG. 14, for example, the switching between the wireless power transmission (wireless charging) operation and the wired charging operation may be performed repeatedly or periodically until designated conditions are satisfied, and if the designated conditions are satisfied, may be terminated. For example, if the remaining battery capacity of the electronic device 101 is lowered below a designated level, if the battery 510 of the electronic device 110 is fully charged, or if the wireless power receiving device (e.g., the second external device) is fully charged, the electronic device 101 may terminate the switching operation.

Figure 15:
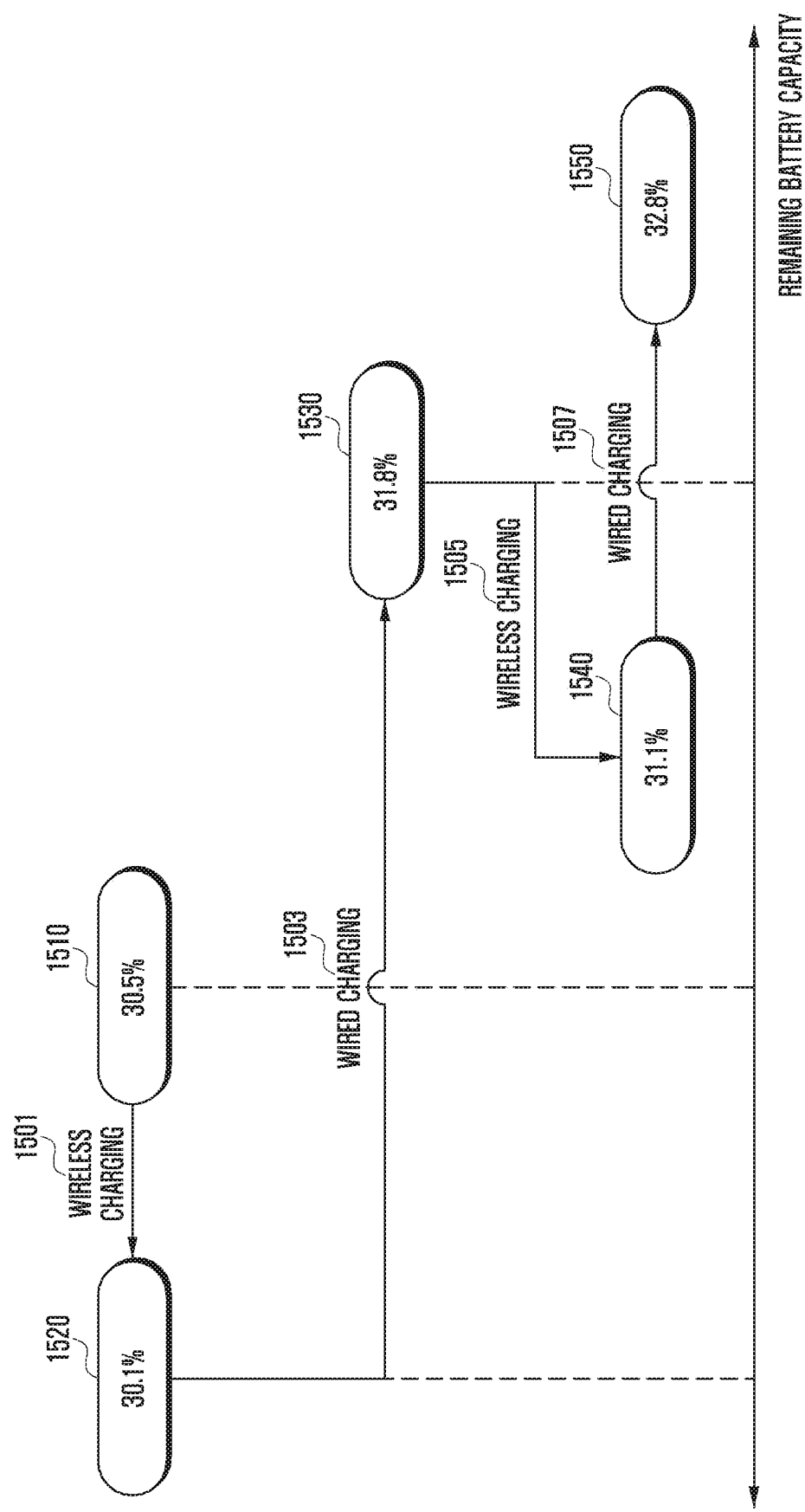
FIG. 15 is a diagram illustrating an example of an operation scenario of performing wireless charging and wired charging in an electronic device according to an embodiment of the disclosure.

FIG. 15 is a diagram illustrating an example of an operation scenario of performing wireless charging and wired charging in an electronic device 151 according to an embodiment of the disclosure.

As shown in FIG. 15, FIG. 15 may illustrate an example of an operation of alternately performing a wireless charging operation (e.g., a wireless power transmission operation for charging an external device) and a wired charging operation (e.g., an operation of charging the battery 510 of the electronic device 151), based on the remaining battery capacity of the battery 510 of the electronic device 151, in the state in which a wired charging device is connected to the electronic device 151. According to an embodiment, a block 1510, a block 1520, a block 1530, a block 1540, and a block 1550 in FIG. 15 may denote, for example, remaining battery capacities (e.g., the remaining battery capacity) depending on the charging state of the battery 510 (e.g., the degree of progression according to the charging time) based on a time axis.

Referring to FIG. 15, if the remaining battery capacity is within a designated reference range as shown in the example of the block 1510 (e.g., 30.5%) (e.g., the value of a decimal part below a decimal point is greater than a first reference level and is less than or equal to a second reference level) when initiating a wireless power Tx mode (e.g., Tx mode), the electronic device 151 may perform a wireless charging operation in operation 1501. For example, in the case where a user wirelessly charges an external device (e.g., a smart watch or another electronic device) using the electronic device 101 while the electronic device 101 is wiredly charged, the electronic device 101 may detect the external device at the remaining battery capacity of, for example, 30.5% so that the wireless power Tx mode may be activated. According to an embodiment, the electronic device 101 may start wireless charging, based on the remaining battery capacity of 30.5%, may block the wired charging path to the battery 510, based on wireless charging, and may provide wireless charging power to the external device until the remaining battery capacity reaches 30.1% as shown in the example of block 1520.

According to an embodiment, if the remaining battery capacity reaches the first reference level as shown in block 1520 (e.g., 30.1%), the electronic device 101 may perform a wired charging operation in operation 1503. For example, if the remaining battery capacity reaches the first reference level while providing wireless charging, the electronic device 101 may stop the wireless charging operation, and may then perform a wired charging operation. According to an embodiment, the electronic device 101 may continue to execute the wired charging operation according to operation 1503 until the time at which the remaining battery capacity reaches the second reference level (e.g., 31.8% in the block 1530). For example, the electronic device 101 may stop the wired charging operation, and may then start a wireless charging operation again at the time at which, for example, the remaining battery capacity of the battery 510 by the wired charging reaches "percentile increment (e.g., 1*n %)+decimal part increment (e.g., 0.1*m %)" or more (e.g., 31.8% in the block 1530 increased from 30.1% in the block 1520 by 1.7%).

According to an embodiment, if the battery 510 is charged to 31.8% in the block 1530 through the wired charging, the electronic device 101 may stop the wired charging operation by blocking the wired charging path again in operation 1505, and may resume the wireless charging operation, thereby providing wireless power to the external device until the remaining battery capacity reaches 31.1% (e.g., the first reference level) in the block 1540. According to an embodiment, if the remaining battery capacity reaches the first reference level as shown in block 1540 (e.g., 31.1%), the electronic device 101 may perform a wired charging operation in operation 1507. For example, if the remaining battery capacity reaches the first reference level while providing the wireless charging, the electronic device 101 may stop the wireless charging operation, and may perform the wired charging operation. According to an embodiment, the electronic device 101 may continue the wired charging operation according to operation 1507 until the time at which the remaining battery capacity reaches a second reference level (e.g., 32.8% in the block 1550). For example, the electronic device 101 may continue the wired charging until the time at which the remaining battery capacity of the battery 510 by the wired charging reaches "percentile increment (e.g., 1*n %)+decimal part increment (e.g., 0.1*m %)" or more (e.g., 32.8% in the block 1550 increased from 31.1% in the block 1540 by 1.7%). According to an embodiment, the processor 120 may perform a different charging operation, based at least on a condition in which the battery 510 of the electronic device 101 and/or the wireless power receiving device (e.g., an external device) is fully charged. For example, if at least one element (e.g., the battery 510 or the wireless power receiving device) is fully charged, the processor 120 may stop the switching operation. According to an embodiment, the processor 120 may switch the charging operation between the first charging mode and the second charging mode until at least one element is fully charged, and to this end, the processor 120 may check the remaining battery capacity repeatedly or periodically.

As shown in FIG. 15, the electronic device 101 may repeat the wireless charging operation and the wired charging operation as shown in FIG. 15 to alternately charge the battery 510 and the external device. According to an embodiment, the user is also able to stably charge an external device through wireless power sharing without experiencing a situation in which the remaining battery capacity of the electronic device 101 drops, for example, from 30% to 29%.

Figure 16A:
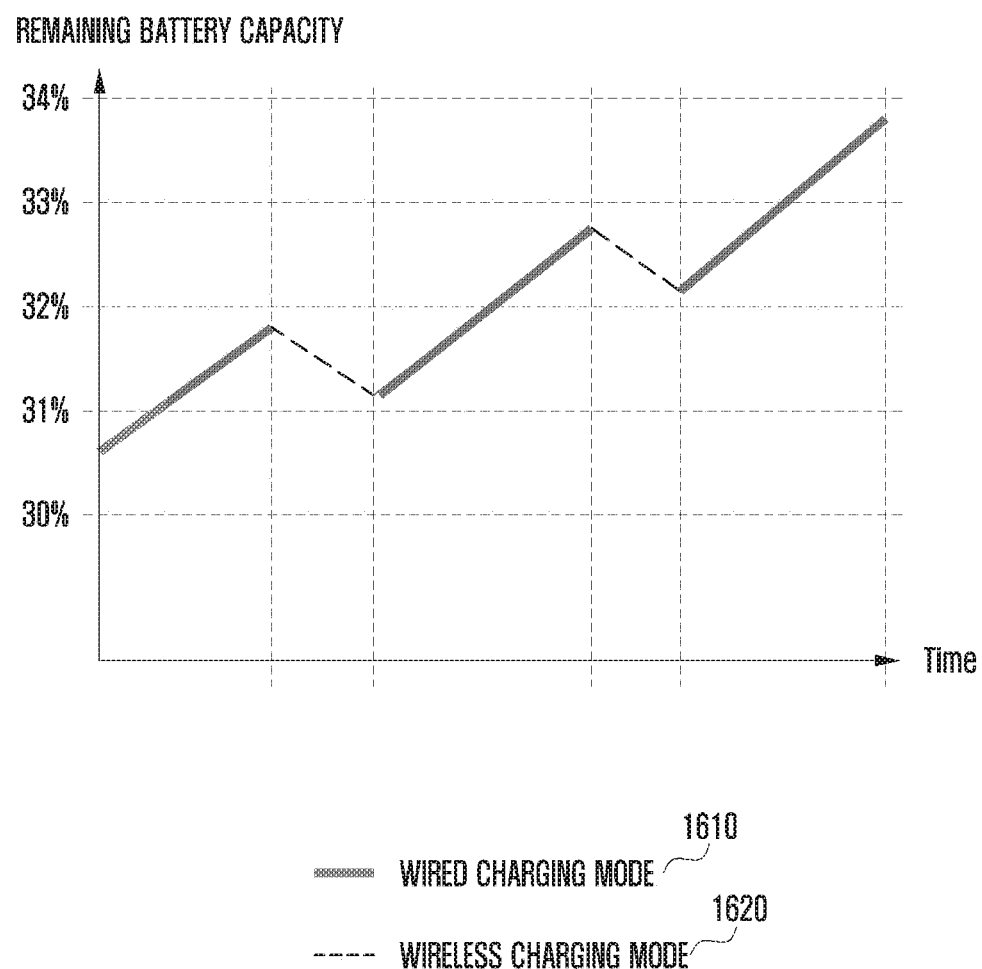
FIG. 16A illustrates an example of a charging operation graph in wired charging and wireless charging according to an embodiment of the disclosure.
Figure 16B:
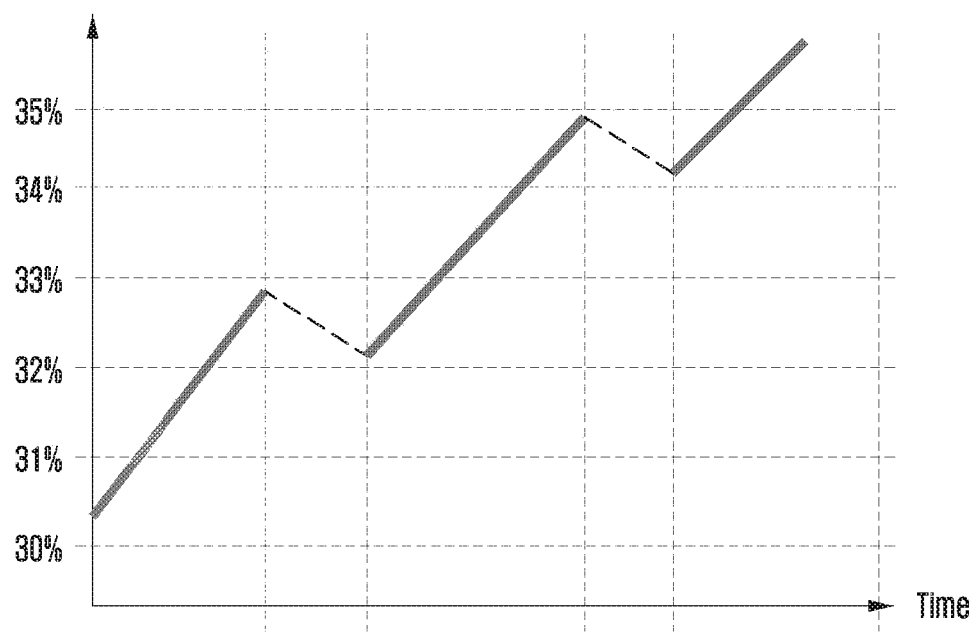
FIG. 16B illustrates an example of a charging operation graph in wired charging and wireless charging according to an embodiment of the disclosure.

FIG. 16A illustrates an example of a charging operation graph in wired charging and wireless charging according to an embodiment of the disclosure, and FIG. 16B illustrates an example of a charging operation graph in wired charging and wireless charging according to an embodiment of the disclosure.

According to an embodiment, the electronic device 101 may separate and perform a wired charging operation in relation to the charging of the battery 510 and a wireless charging operation in relation to wireless power transmission to an external device, based on the remaining battery capacity.

According to an embodiment, reference levels (e.g., a first reference level and a second reference level) for a wired charging period and a wireless charging period of the electronic device 101 may be variously determined (or configured) in consideration of the priority of a wired charging function for the battery 510 and a wireless charging function for the external device. According to an embodiment, the electronic device 101 may separate the wired charging period and the wireless charging period, based on the remaining battery capacity, and may adaptively change and operate the wired charging period and the wireless charging period, based on the priority.

Referring to FIG. 16A, according to an embodiment, in the case where the wireless charging function for the external device has a higher priority, the electronic device 101, may proceed with the wired charging of the battery 510 by "integer part increment (1%)+decimal part increment (0.n %)" (e.g., an increment of about 1.9%) of the remaining battery capacity, and may then wirelessly charge the external device by a decrement of about 0.8% to 0.9% of the remaining battery capacity of the battery 510. In this case, a fast swap function may speed up the charging of the external device.

Referring to FIG. 16B, according to an embodiment, in the case where the wired charging function for the battery 510 has a higher priority, the electronic device 101, as shown in FIG. 16B, may proceed with the wired charging of the battery 510 by "integer part increment (2%)+decimal part increment (0.n %)" (e.g., an increment of about 4.9%) of the remaining battery capacity, and may then wirelessly charge the external device by a decrement of about 0.8% to 0.9% of the remaining battery capacity of the battery 510. In this case, a relatively slow swap function may speed up the charging of the battery 510.

For example, comparing an increment graph 1610 of the battery 510 in the wired charging mode in FIG. 16A with an increment graph 1630 of the battery 510 in the wired charging mode in FIG. 16B, the charging speed (e.g., an increment) of the battery 510 per hour may be higher in FIG. 16B (e.g., about 1.9% increment in FIG. 16A and about 4.9% increment in FIG. 16B). According to an embodiment, comparing a decrement graph 1620 of the battery 510 in the wireless charging mode in FIG. 16A with a decrement graph 1640 of the battery 510 in the wireless charging mode in FIG. 16B, a discharging speed of the battery 510 per hour (e.g., a decrement) (e.g., about 0.8-0.9% decrement in FIGS. 16A and 16B) may make no difference therebetween, based on the same level configuration (e.g., about 0.8-0.9% decrement), regardless of the priority of a wired charging function or a wired charging function. According to an embodiment, in the case where the discharging speed (e.g., a decrement) of the battery 510 per hour is configured as different levels (e.g., a decrement of about 0.8 to 0.9% and a decrement of about 0.6 to 0.7%) according to the priority of a wireless charging function or a wired charging function, the discharging speed per hour in each period may differ.

Figure 17:
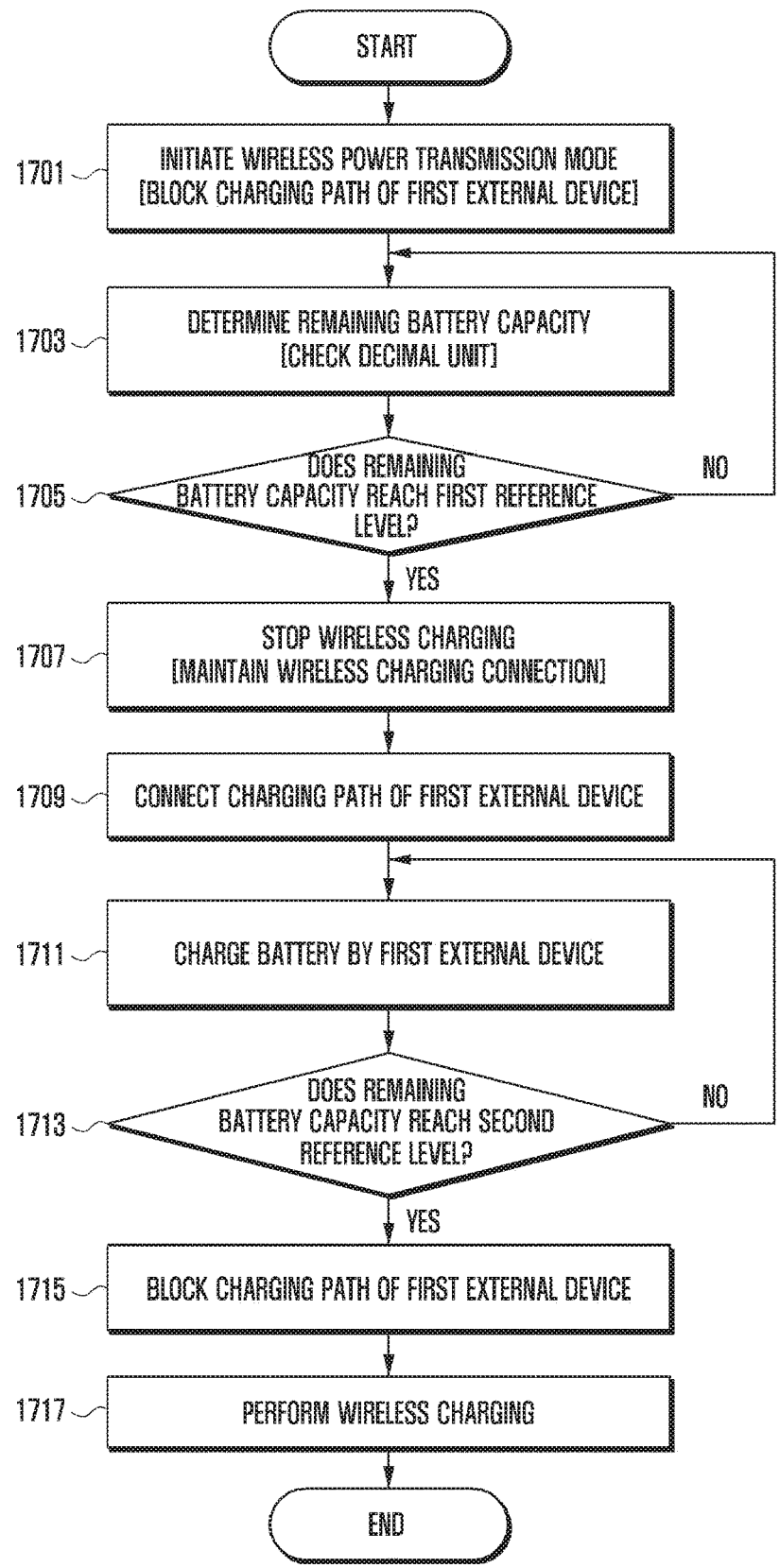
FIG. 17 is a flowchart illustrating a method of operating an electronic device according to an embodiment of the disclosure.

FIG. 17 is a flowchart illustrating a method of operating an electronic device 101 according to an embodiment of the disclosure.

Referring to FIG. 17, in operation 1701, the processor 120 of the electronic device 101 may initiate a wireless power Tx mode (e.g., a Tx mode). According to an embodiment, the processor 120, as shown in FIG. 6B or 7B, may supply (or transmit or share) a designated electric power to (or with) an external device (e.g., the wearable device 602 or another electronic device 702) (hereinafter, referred to as a "second external device") using a coil (e.g., the coil 319 in FIG. 3 or the coil 525-1 in FIG. 5) while a wired charging device 603 or 703 {or a wired charging device (e.g., a TA)} (hereinafter, referred to as a "first external device") is in connection (hereinafter, referred to as "wireless power transmission" or "wireless charging"). For example, the processor 120 may wirelessly supply electric power to the second external device using electric power of a battery (e.g., the battery 510 in FIG. 5). According to an embodiment, the processor 120 may block a wired charging path from the first external device to the second external device in a charging circuit (e.g., the PMIC 320 in FIG. 3 or the charging circuit 530 in FIG. 5) of the electronic device 101 in order to avoid bypassing of the input voltage (Vin) of the first external device to the second external device. For example, in order to prevent the electric power of the first external device from being supplied to the second external device, the processor 120 may control a switch of the wired charging path (e.g., the first switch 532 in FIG. 5) so as to be turned off, thereby blocking the wired charging path between the first external device and the electronic device 101, and may control a switch of the wireless charging path (e.g., the second switch 534 in FIG. 5) so as to be turned on, thereby wirelessly supplying a designated power to the second external device, based on the electric power of the battery 510. According to an embodiment, the processor 120 may configure a voltage of the battery 510 (e.g., about 5V) to a voltage (e.g., about 7.5V) optimized for use in wireless power sharing through a charging circuit, and may provide the same in order for the second external device to perform stable wireless charging.

In operation 1703, the processor 120 may determine a remaining battery capacity (e.g., SOC) of the battery 510 of the electronic device 101 while providing the wireless charging. According to an embodiment, the processor 120 may check the remaining battery capacity in decimal units while providing wireless charging.

In operation 1705, the processor 120 may determine whether or not the remaining battery capacity reaches a first reference level, based on the remaining battery capacity. According to an embodiment, the processor 120 may monitor a decimal part of the remaining capacity of the battery 510 while providing wireless charging, and, based on the monitoring result, may determine whether or not the decimal part of the remaining capacity of the battery 510 reaches a designated value (e.g., a first reference level). For example, the processor 120 may determine whether or not a specific value below the decimal point of the remaining battery capacity reaches "1" of the first reference level.

If the remaining battery capacity does not reach the first reference level in operation 1705 (e.g., "NO" in operation 1705), the processor 120 may proceed to operation 1703, thereby repeatedly or periodically performing operation 1703 and operations subsequent thereto.

If the remaining battery capacity reaches the first reference level in operation 1705 (e.g., "YES" in operation 1705), the processor 120 may stop the wireless power transmission operation in operation 1707. According to an embodiment, the processor 120 may stop transmitting wireless power to the second external device in the state in which the first external device is connected to the electronic device 101. According to an embodiment, the processor 120 may stop transmitting wireless power to the second external device using the electric power of the battery 510. According to an embodiment, the processor 120 may control a charging circuit (e.g., the PMIC 320 in FIG. 3 or the charging circuit 530 in FIG. 5) of the electronic device 101 so as to maintain the switch of the wireless charging path (e.g., the second switch 534 in FIG. 5) to be turned on, thereby maintaining the wireless charging connection (e.g., a ping connection) with the second external device by transmitting a minimum power (e.g., about 1V, about 2V, or about 3V) to the second external device. According to another embodiment, the processor 120 may block the wireless charging path from the charging circuit (e.g., the PMIC 320 in FIG. 3 or the charging circuit 530 in FIG. 5) in the electronic device 101 to the second external device in order to prevent the electric power of the battery 510 from being supplied to the second external device. For example, the processor 120 may turn off a switch of the wireless charging path (e.g., the second switch 534 in FIG. 5) to prevent the electric power of the battery 510 from being supplied to the second external device, thereby blocking the wireless charging path between the second external device and the electronic device 101.

In operation 1709, the processor 120 may connect a charging path of the first external device. According to an embodiment, if the remaining battery capacity reaches the first reference level while providing wireless charging to the second external device, based on the first charging mode, the processor 120 may perform control such that a switch of the wired charging path (e.g., the first switch 532 in FIG. 5) from the first external device to the battery 510 in the charging circuit (e.g., the PMIC 320 in FIG. 3 or the charging circuit 530 in FIG. 5) of the electronic device 101 is turned on.

In operation 1711, the processor 120 may charge the battery 510 by the first external device. According to an embodiment, as shown in FIG. 6B or 7B, the processor 120 may supply a designated electric power to the battery 510 while the first external device is connected (hereinafter, referred to as "wired charging"). According to an embodiment, the processor 120 may initiate a wired charging operation for the battery 510 while maintaining a wireless charging connection (e.g., a ping connection) with the second external device. According to an embodiment, the processor 120 may stop transmitting wireless power to the second external device, and may charge the battery 510 of the electronic device 101 using the external electric power of the first external device in the state in which the first external device is connected to the electronic device 101. In operation 1713, the processor 120 may determine whether or not the remaining battery capacity reaches a second reference level while providing the wired charging (e.g., while charging the battery 510 using the external electric power of the first external device). According to an embodiment, the processor 120 may check the remaining battery capacity (e.g., SOC) of the battery 510 in decimal units while providing wired charging, and may determine whether or not the remaining battery capacity reaches the second reference level. According to an embodiment, the processor 120 may monitor a decimal part of the remaining capacity of the battery 510 while providing wired charging, and, based on the monitoring result, may determine whether or not the decimal part of the remaining capacity of the battery 510 reaches a designated value (e.g., the second reference level). For example, the processor 120 may determine whether or not a specific value below the decimal point of the remaining battery capacity reaches "8" of the second reference level.

If the remaining battery capacity does not reach the second reference level in operation 1713 (e.g., "NO" in operation 1713), the processor 120 may proceed to operation 1711, thereby repeatedly or periodically performing operation 1711 and operations subsequent thereto.

If the remaining battery capacity reaches the second reference level in operation 1713 (e.g., "YES" in operation 1713), the processor 120 may block the charging path of the first external device in operation 1715. For example, the processor 120 may wirelessly supply electric power to the second external device using the electric power of the battery 510. According to an embodiment, the processor 120 may block a wired charging path from the first external device to the second external device in a charging circuit (e.g., the PMIC 320 in FIG. 3 or the charging circuit 530 in FIG. 5) of the electronic device 101 in order to avoid bypassing of the input voltage (Vin) of the first external device to the second external device. For example, the processor 120 may turn off a switch of the wired charging path (e.g., the first switch 532 in FIG. 5) to prevent the electric power of the first external device from being supplied to the second external device.

In operation 1717, the processor 120 may block the wired charging path between the first external device and the electronic device 101, and may maintain the switch of the wireless charging path (e.g., the second switch 534 in FIG. 5) to be turned on, thereby performing wireless charging of supplying a designated electric power to the second external device, based on electric power of the battery 510.

According to an embodiment, the operations shown in FIG. 17, for example, the switching between the wireless power transmission (wireless charging) operation and the wired charging operation may be performed repeatedly or periodically until designated conditions are satisfied, and if the designated conditions are satisfied, may be terminated. For example, if the remaining battery capacity of the battery 510 is lowered below a designated level, if the battery 510 is fully charged, or if the wireless power receiving device is fully charged, the electronic device 101 may terminate the switching operation.

Figure 18:
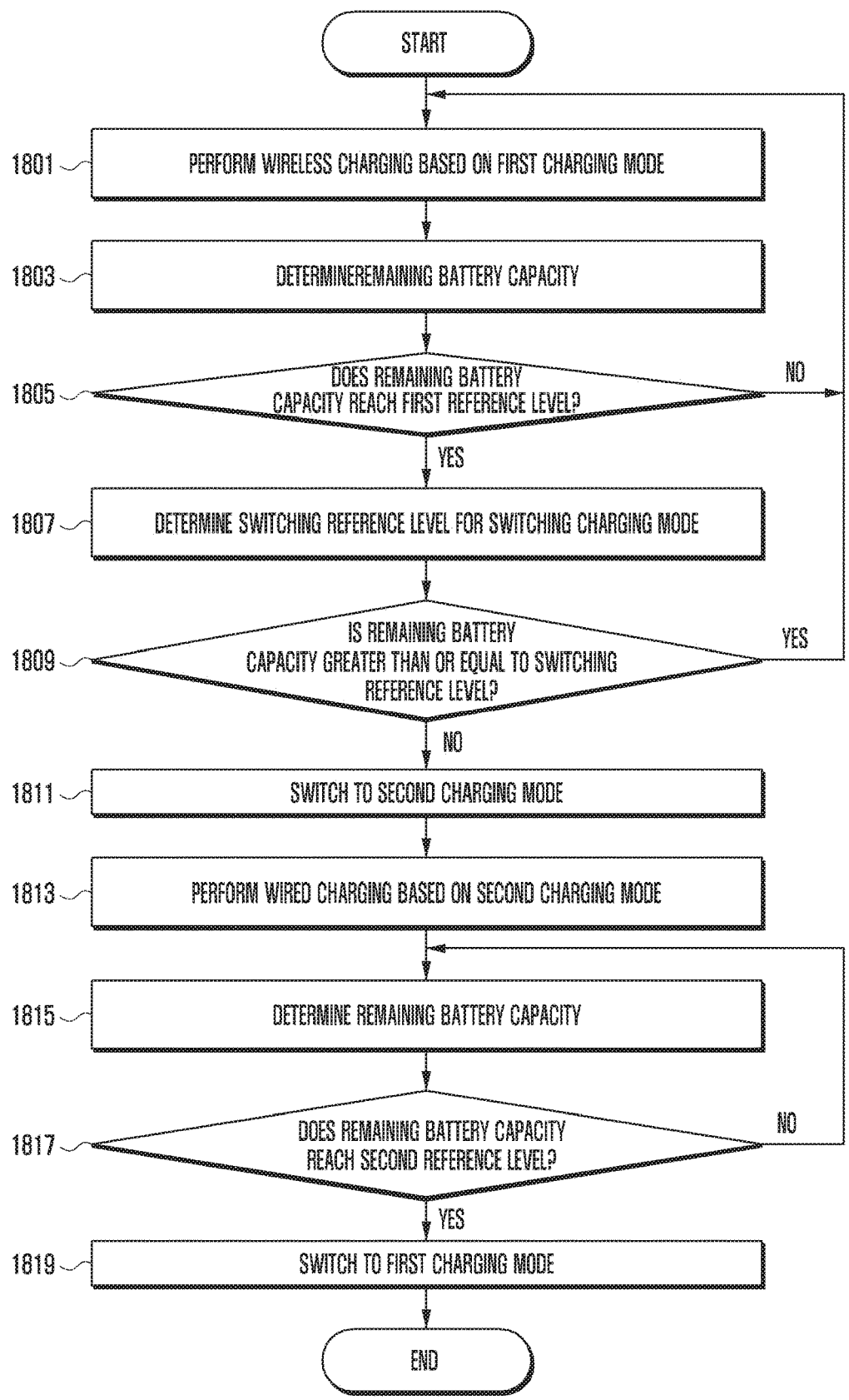
FIG. 18 is a flowchart illustrating a method of operating an electronic device according to an embodiment of the disclosure.

FIG. 18 is a flowchart illustrating a method of operating an electronic device 101 according to an embodiment of the disclosure.

Referring to FIG. 18, in operation 1801, the processor 120 of the electronic device 101 may perform wireless charging, based on a first charging mode. According to an embodiment, the processor 120, as shown in FIG. 6B or 7B, may supply (or transmit or share) a designated electric power to (or with) a second external device (e.g., the wearable device 602 or another electronic device 702) using a coil (e.g., the coil 319 in FIG. 3 or the coil 525-1 in FIG. 5) while a first external device (e.g., the wired charging device 603 or 703) is connected (hereinafter, referred to as "wireless power transmission" or "wireless charging"). For example, the processor 120 may perform a wireless charging operation of supplying wireless power to the second external device using electric power of the battery 510.

In operation 1803, the processor 120 may determine a remaining battery capacity (e.g., SOC) of the battery 510 of the electronic device 101 while providing the wireless charging. According to an embodiment, the processor 120 may check the remaining battery capacity in decimal units while providing wireless charging.

In operation 1805, the processor 120 may determine whether or not the remaining battery capacity reaches a first reference level, based on the remaining battery capacity. For example, the processor 120 may determine whether or not a specific value below the decimal point of the remaining battery capacity reaches "1" of the first reference level.

If the remaining battery capacity does not reach the first reference level in operation 1805 (e.g., "NO" in operation 1805), the processor 120 may proceed to operation 1801, thereby repeatedly or periodically performing operation 1801 and operations subsequent thereto.

If the remaining battery capacity reaches the first reference level in operation 1805 (e.g., "YES" in operation 1805), the processor 120 may determine a switching reference level for switching the charging mode in operation 1807. According to an embodiment, the switching reference level may include, for example, a reference value for switching from the first charging mode to the second charging mode. For example, the switching reference level may include a remaining battery capacity for determining, if the remaining battery capacity reaches the first reference level, whether or not to maintain the wireless charging according to the first charging mode or whether or not to switch to the wired charging according to the second charging mode, based on the remaining battery capacity. According to an embodiment, the switching reference level may be configured as a designated value of the remaining capacity of the battery 510 (e.g., the SOC of N % or more) (for example, 50%, 55%, 60%, 75% or more).

In operation 1809, the processor 120 may determine whether or not the remaining battery capacity is greater than or equal to the switching reference level. For example, the processor 120 may compare the remaining battery capacity with a designated switching reference level, and may identify whether or not the remaining battery capacity is greater than or equal to the designated switching reference level.

If the remaining battery capacity is greater than or equal to the switching reference level in operation 1809 (e.g., "YES" in operation 1809), the processor 120 may proceed to operation 1801, thereby performing operation 1801 and operations subsequent thereto. For example, even in the case where the remaining battery capacity reaches the first reference level, if the remaining battery capacity is greater than or equal to the switching reference level, the processor 120 may maintain the wireless charging mode. For example, if the remaining capacity of the battery 510 is greater than or equal to a designated value, the processor 120 may ignore the first reference level, and may maintain the wireless charging.

If the remaining battery capacity is less than the switching reference level in operation 1809 (e.g., "NO" in operation 1809), the processor 120 may switch to the second charging mode in operation 1811.

In operation 1813, the processor 120 may perform wired charging based on the second charging mode. According to an embodiment, the processor 120 may stop transmitting wireless power to the second external device, and may charge the battery 510 by supplying a designated electric power thereto using the external electric power of the first external device in the state in which the first external device is connected to the electronic device 101. According to an embodiment, the processor 120 may maintain the wireless charging connection (e.g., a ping connection) with the second external device when switching to the second charging mode.

In operation 1815, the processor 120 may determine a remaining battery capacity (e.g., SOC) of the battery 510 of the electronic device 101 while providing wired charging. According to an embodiment, the processor 120 may identify the remaining battery capacity in decimal units while providing wired charging.

In operation 1817, the processor 120 may determine whether or not the remaining battery capacity reaches a second reference level, based on the remaining battery capacity. For example, the processor 120 may monitor whether or not a specific value below the decimal point of the remaining battery capacity reaches "8" of the second reference level.

If the remaining battery capacity does not reach the second reference level in operation 1817 (e.g., "NO" in operation 1817), the processor 120 may proceed to operation 1815, thereby performing operation 1815 and operations subsequent thereto.

If the remaining battery capacity reaches the second reference level in operation 1817 (e.g., "YES" in operation 1817), the processor 120 may switch to the first charging mode in operation 1819. According to an embodiment, the processor 120 may stop the wired charging for the battery 510, and may perform the wireless charging for the second external device, based on the switching to the first charging mode. According to an embodiment, the processor 120 may perform control so as to stop the operation of charging the battery 510 and so as to supply a designated wireless power to the second external device using the external electric power of the first external device in the state in which the first external device is connected to the electronic device 101. According to an embodiment, since the wireless charging connection (e.g., a ping connection) with the second external device is maintained when switching to the first charging mode, the processor 120 may immediately perform wireless charging without a separate operation for connection with the second external device.

According to an embodiment, the operations shown in FIG. 18, for example, the switching between the wireless power transmission (wireless charging) operation and the wired charging operation may be performed repeatedly or periodically until designated conditions are satisfied, and if the designated conditions are satisfied, may be terminated. For example, if the remaining battery capacity of the battery 510 is lowered below a designated level, if the battery 510 is fully charged, or if the wireless power receiving device is fully charged, the electronic device 101 may terminate the switching operation.

FIG. 19 is a flowchart illustrating a method of operating an electronic device 101 according to an embodiment of the disclosure.

FIG. 20 illustrates an example of adaptively configuring a reference level, based on a remaining battery capacity in an electronic device 101 according to an embodiment of the disclosure.

According to an embodiment, the wireless power Tx mode may be divided into a plurality of operation modes, and a reference level provided to each of the plurality of modes may be adaptively adjusted (or configured), based on a performed operation mode. According to an embodiment, reference levels (e.g., a first reference level and a second reference level) for the wired charging period and the wireless charging period of the electronic device 101 may be variously determined (or configured) in consideration of the priority of a wired charging function for the battery 510 and a wireless charging function for the external device, based on a designated value of the remaining capacity of the battery 510 of the electronic device 101.

Referring to FIG. 19, in operation 1901, the processor 120 of the electronic device 101 may share wireless power with an external device. For example, the processor 120 may initiate a wireless power Tx mode (e.g., a Tx mode), based on user input.

In operation 1903, the processor 120 may determine a remaining battery capacity (e.g., the SOC). According to an embodiment, the processor 120 may identify the remaining battery capacity in decimal units.

In operation 1905, the processor 120 may determine a configuration level related to configuration of the reference level, based on the remaining battery capacity. According to an embodiment, the processor 120 may determine the configuration level to which the determined remaining battery capacity belongs, based on a plurality of configuration levels (e.g., a first configuration level and second configuration level). According to an embodiment, FIG. 20 shows an example of configuration levels for respective remaining battery capacity.

Referring to FIG. 20, for example, the configuration levels may include a first configuration level 2010 (e.g., about 25%) and a second configuration level 2020 (e.g., about 75%). According to an embodiment, the first configuration level 2010 may include a reference value {e.g., a designated remaining capacity of the battery 510 (e.g., about 25% or less)} for determining wired charging (e.g., the second charging mode) to be a priority mode 2003, and the second reference level 2020 may include a reference value {e.g., a designated remaining capacity of the battery 510 (e.g., about 75% or more)} for determining wireless charging (e.g., the first charging mode) to be a priority mode 2005. According to an embodiment, if the remaining battery capacity is between the first configuration level 2010 and the second configuration level 2020 (e.g., greater than 25% and less than 75%), the processor 120 may determine a normal mode 2001 in which wired charging and wireless charging are alternately performed based on a reference level that is configured as default. According to an embodiment, the processor 120 may determine whether or not the remaining battery capacity is less than or equal to the first configuration level, based on the remaining battery capacity. According to an embodiment, if the remaining battery capacity is less than or equal to the first configuration level, the processor 120 may perform operation 1911, and if the remaining battery capacity exceeds the first configuration level, the processor 120 may determine whether or not the remaining battery capacity is greater than or equal to the second configuration level. According to an embodiment, if the remaining battery capacity is greater than or equal to the second configuration level, the processor 120 may perform operation 1921, and if the remaining battery capacity is less than the second configuration level (e.g., if the remaining battery capacity is between the first configuration level and the second configuration level or is greater than the first configuration level and less than the second configuration level), the processor 120 may perform operation 1931.

If the remaining battery capacity is less than or equal to the first configuration level 2010 in operation 1905 (e.g., "less than or equal to the first configuration level" in operation 1905), the processor 120 may determine a first priority mode in operation 1911. According to an embodiment, if the remaining battery capacity is less than or equal to the first configuration level 2010 {e.g., a designated remaining capacity of the battery 510 (e.g., about 25% or more)} for determining wired charging (e.g., the second charging mode) to be a priority mode, the processor 120 may determine a first priority mode in which the wired charging has a higher priority.

In operation 1913, the processor 120 may configure a reference level related to the first priority mode, based on the determination of the first priority mode. According to an embodiment, if the priority of a wired charging function of the battery 510 is higher, the processor 120 may configure an increment in the wired charging of the battery 510 to be relatively large. For example, the processor 120 may be configured to charge the battery by a first designated increment in the remaining battery capacity, and may then perform wireless charging, thereby charging an external device by a first designated decrement in the remaining battery capacity of the battery 510. In this case, the charging speed of the battery 510 may be increased.

If the remaining battery capacity greater than or equal to the second configuration level 2020 in operation 1905 (e.g., "greater than or equal to the second configuration level" in operation 1905), the processor 120 may determine a second priority mode in operation 1921. According to an embodiment, if the remaining battery capacity is greater than or equal to the second configuration level 2020 {e.g., a designated remaining capacity of the battery 510 (e.g., about 75%)} for determining wireless charging (e.g., the first charging mode) to be a priority mode, the processor 120 may determine a second priority mode in which the wireless charging has a higher priority.

In operation 1923, the processor 120 may configure a reference level related to the second priority mode, based on the determination of the second priority mode. According to an embodiment, if the priority of a wireless charging function of the external device is higher, the processor 120 may configure an increment in the wired charging of the battery 510 to be relatively small. For example, the processor 120 may be configured to charge the battery by a second designated increment in the remaining battery capacity, and may then perform wireless charging, thereby charging an external device by a second designated decrement (or a first designated decrement) in the remaining battery capacity of the battery 510. In this case, the charging speed of the external device may be increased through a fast swap function.

If the remaining battery capacity is between the first configuration levels and the second configuration level 2020 in operation 1905 (e.g., "a normal level" in operation 1905), the processor 120 may determine a normal mode in operation 1931. According to an embodiment, if the remaining battery capacity is between the first configuration level 2010 and the second configuration level 2020 (e.g., greater than 25% and less than 75%), the processor 120 may determine a normal mode in which wired charging and wireless charging are alternately performed based on a reference level that is configured as default (e.g., the level configured as default in the electronic device 101 without priority of a wired charging function or a wireless charging function).

In operation 1933, the processor 120 may configure a reference level related to the normal mode, based on the determination of the normal mode. According to an embodiment, the processor 120 may configure a reference level, based on basic configuration (e.g., a configuration value designated by a user or a default value of the electronic device 101) with respect to the wired charging function of the battery 510 and the wireless charging function of the external device.

As shown in FIGS. 19 and 20, according to an embodiment, the electronic device 101 may adaptively configure a reference level, based on the remaining battery capacity, thereby operating a wireless power Tx mode. For example, the electronic device 101 may operate by varying at least one of the first reference level or the second reference level, based on the designated configuration level of the remaining battery capacity. According to an embodiment, the electronic device 101 may be configured to: if the remaining battery capacity is less than or equal to 25%, operate in a mode for prioritizing charging of the battery 510 (the first priority mode); if the remaining battery capacity is greater than or equal to 75%, operate in a mode for prioritizing wireless power transmission (the second priority mode); and if the remaining battery capacity is between about 25% and 75%, perform a switching operation according to the level configured as default in the electronic device 101 without determining the priority. For example, if the remaining battery capacity is low, the electronic device 101 may increase the charging speed of the battery 510 by giving priority to wired charging through a relatively slow swap function, and if the remaining battery capacity is high, the electronic device 101 may reduce the charging speed of the battery and increase the charging speed of the external device by giving priority to wireless charging through a relatively fast swap function, as shown in FIGS. 16A and 16B.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a non-transitory machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents

What is claimed is:

1. An electronic device comprising:
    a battery;
    a coil; and
    at least one processor configured to:
        while the electronic device is not being supplied with power from an external power source via a wire, based on a remaining amount of power in the battery being below a threshold, disable a wireless power transmission function,
        while the remaining amount of power in the battery is below the threshold, identify that the electronic device is being supplied with power from the external power source via the wire while the electronic device is being supplied with power from the external power source via the wire and the remaining amount of power in the battery is below the threshold, receive a request for enabling the wireless power transmission function, and while the electronic device is being supplied with power from the external power source via the wire and the remaining amount of power in the battery is below the threshold, based on the request, enable the wireless power transmission function to wirelessly transmit power to an external device via the coil, wherein, while the electronic device is being supplied with power from the external power source via the wire, an amount of power wirelessly transmitting to the external device via the coil is controlled based on information corresponding to the remaining amount of power in the battery, the remaining amount of power in the battery being increased based on the battery being charged using power supplied from the external power source.

2. The electronic device of claim 1, further comprising:
a display,
wherein the at least one processor is configured to provide a user interface on the display for initiating the wireless power transmission function, and
wherein the request is received via the user interface.

3. The electronic device of claim 1, wherein the at least one processor is configured to:
determine whether to discontinue the wireless transmitting of power to the external device via the coil, and
discontinue the wireless transmitting of power to the external device via the coil being a determination to discontinue the wireless transmitting of power to the external device via the coil,
wherein, in a case of the external device being supplied with power from another external power source via another wire, the result of the determination is the determination to discontinue the wireless transmitting of power to the external device via the coil.

4. The electronic device of claim 1, wherein the at least one processor is configured to:
identify a type of the external device while wirelessly transmitting power to the external device via the coil,
determine an amount of power corresponding to the identified type of the external device, and
wirelessly transmit the determined amount of power to the external device via the coil.

5. The electronic device of claim 1, further comprising:
a display,
wherein the at least one processor is configured to:
display a notification on the display about discontinuing wireless transmission of power to the external device when the wireless transmitting of power to the external device via the coil is discontinued.

6. The electronic device of claim 2,
wherein the user interface is provided on the display based on the remaining amount of power in the battery being above or equal to the threshold, and
wherein the user interface is discontinued from being provided on the display based on the remaining amount of power in the battery being below the threshold.

7. The electronic device of claim 2, wherein the user interface is provided on the display regardless of whether the remaining amount of power in the battery is above, below, or equal to the threshold while the electronic device is being supplied power from the external power source via the wire.

8. The electronic device of claim 1,
wherein the battery is charged using a portion of power supplied from the external power source that is determined based on the remaining amount of power in the battery, and the wireless transmitting of power to the external device via the coil uses a remainder of the power supplied from the external power source.

9. The electronic device of claim 1, wherein the at least one processor is configured to:
wirelessly transmit power to the external device via the coil, based on the request without considering the remaining amount of power in the battery.

10. The electronic device of claim 1,
wherein the charging of the battery and the wireless transmitting of power to the external device via the coil are alternately performed,
wherein the battery is charged, using power supplied from the external power source via the wire, during a first designated period,
wherein power is wirelessly transmitted to the external device via the coil, using power supplied from the external power source via the wire, during a second designated period, and
wherein the at least one processor is configured to:
adjust the first designated period and the second designated period based on the remaining amount of power in the battery.

11. The electronic device of claim 10,
wherein the first designated period and the second designated period are adjusted such that a duration of first designated period is inversely related to the remaining amount of power in the battery, and a duration of second designated period is related to the remaining amount of power in the battery.

12. The electronic device of claim 10, wherein the at least one processor is configured to:
identify the remaining amount of power in the battery when the electronic device is initially supplied with power from the external power source via the wire, and
adjust the first designated period so as to wirelessly transmit power to the external device via the coil during the second designated period while maintaining the remaining amount of power in the battery.

13. The electronic device of claim 12,
wherein the at least one processor is configured to:
determine whether the external power source supplying power via the wire supports fast charging, and
wherein the second designated period is adjusted if the external power source supplying power via the wire does not support fast charging.

14. The electronic device of claim 10, wherein the at least one processor is configured to:
determine whether the remaining amount of power in the battery is below the threshold, and
adjust the first designated period so as to wirelessly transmit power to the external device via the coil during the second designated period without the remaining amount of power in the battery falling below the threshold.

15. The electronic device of claim 14,
wherein the at least one processor is configured to:
determine whether the external power source supplying power via the wire supports fast charging, and
wherein the second designated period is adjusted if the external power source supplying power via the wire does not support fast charging.

16. The electronic device of claim 10, wherein the at least one processor is configured to:

determine whether the remaining amount of power in the battery is below a designated value, and when it is determined that the remaining amount of power in the battery is below the designated value, adjust the first designated period so as to charge the battery using the power supplied from the external power source and adjust the second designated period so as to not wirelessly transmit power to the external device via the coil.

17. The electronic device of claim 16,
wherein the at least one processor is configured to:
determine whether the external power source supplying power via the wire supports fast charging, and
wherein the second designated period and the second designated period are adjusted if the external power source supplying power via the wire does not support fast charging.

18. The electronic device of claim 16, wherein the designated value is based on a user input.

19. The electronic device of claim 16, further comprising:
a display,
wherein, when it is determined that the remaining amount of power in the battery is below the designated value, the at least one processor is configured to display a notification on the display indicating that the battery is preferentially being charged until the remaining amount of power in the battery is at or above the designated value.

20. The electronic device of claim 1,
wherein the at least one processor is configured to:
determine whether the external power source supplying power via the wire supports fast charging,
determine whether the remaining amount of power in the battery is below a designated value, and
wherein the at least one processor is configured to, based on the request, charge the battery using the power supplied from the external power source during a first designated period and wirelessly transmit power to the external device via the coil during a second designated period, when it is determined that the external power source supplying power via the wire does not support fast charging and the remaining amount of power in the battery is below the designated value.

21. The electronic device of claim 3,
wherein the at least one processor is configured to:
receive information from the external device via the coil, and
wherein the determination whether to discontinue the wireless transmitting of power to the external device via the coil is based on the received information.

22. The electronic device of claim 3,
wherein the at least one processor is configured to:
receive information from the external device via at least one of near-field communication (NFC), Bluetooth, or Wi-Fi, and
wherein the determination whether to discontinue the wireless transmitting of power to the external device via the coil is based on the received information.

23. The electronic device of claim 4, wherein, while wirelessly transmitting power to the external device via the coil, the at least one processor is configured to:
wirelessly transmit first power corresponding to high power to the external device via the coil if the external device is capable of being wirelessly charged with the high power, and
wirelessly transmit second power, which corresponds to low power and is lower than the first power, to the external device via the coil if the external device is capable of being wirelessly charged with the low power.

24. The electronic device of claim 1, wherein the at least one processor is configured to:
identify whether a battery of the external device is fully charged while wirelessly transmitting power to the external device via the coil, and
discontinue the wireless transmitting of power to the external device via the coil based on identifying that the battery of the external device is fully charged.

25. The electronic device of claim 1, wherein the at least one processor is configured to:
identify whether a temperature of the external device is greater than a designated value while wirelessly transmitting power to the external device via the coil, and
discontinue the wireless transmitting of power to the external device based on identifying that the temperature of the external device is greater than the designated value.

* * * * *